US007624230B2

(12) United States Patent
Kamei et al.

(10) Patent No.: US 7,624,230 B2
(45) Date of Patent: Nov. 24, 2009

(54) INFORMATION PROCESSING APPARATUS, INFORMATION PROCESSING METHOD AND STORAGE SYSTEM USING CACHE TO REDUCE DYNAMIC SWITCHING OF MAPPING BETWEEN LOGICAL UNITS AND LOGICAL DEVICES

(75) Inventors: Hitoshi Kamei, Sagamihara (JP); Takaki Nakamura, Ebina (JP)

(73) Assignee: Hitachi, Ltd., Tokyo (JP)

( * ) Notice: Subject to any disclaimer, the term of this patent is extended or adjusted under 35 U.S.C. 154(b) by 436 days.

(21) Appl. No.: 11/593,976

(22) Filed: Nov. 6, 2006

(65) Prior Publication Data

US 2008/0071983 A1 Mar. 20, 2008

(30) Foreign Application Priority Data

Sep. 20, 2006 (JP) ............................ 2006-254113

(51) Int. Cl.
*G06F 12/00* (2006.01)

(52) U.S. Cl. ....................... 711/113; 711/156; 711/203; 711/206

(58) Field of Classification Search ................. 711/113, 711/156, 203, 206
See application file for complete search history.

(56) References Cited

U.S. PATENT DOCUMENTS 5,499,354 A * 3/1996 Aschoff et al. .............. 711/129
7,210,021 B2 * 4/2007 Sato et al. ................... 711/220
2005/0071560 A1 * 3/2005 Bolik ......................... 711/117
2005/0144384 A1 6/2005 Eguchi et al.
2006/0080502 A1 4/2006 Sakaki et al.

FOREIGN PATENT DOCUMENTS

JP 2005-209149 A 8/2005
JP 2006-107257 A 4/2006

* cited by examiner

*Primary Examiner*—Stephen C Elmore
(74) *Attorney, Agent, or Firm*—Sughrue Mion, PLLC

(57) ABSTRACT

An information processing system having a storage apparatus and a file sharing server. The storage apparatus comprises a plurality of storage devices for providing logical devices to store data; and a first processing unit for providing virtual logical units based on a mapping relation between the logical devices and the virtual logical units and being operative to switch the mapping relation dynamically according to an external request. The file sharing server comprises a cache memory including cache extents and a second processing unit controlled to provide the virtual logical units of the storage apparatus to a host system by using the cache extents, managing the mapping relation between the logical devices and the virtual logical units. The mapping between a logical unit and a logical device is dynamically switched as the logical devices store data provided from the host system according to external requests.

20 Claims, 34 Drawing Sheets

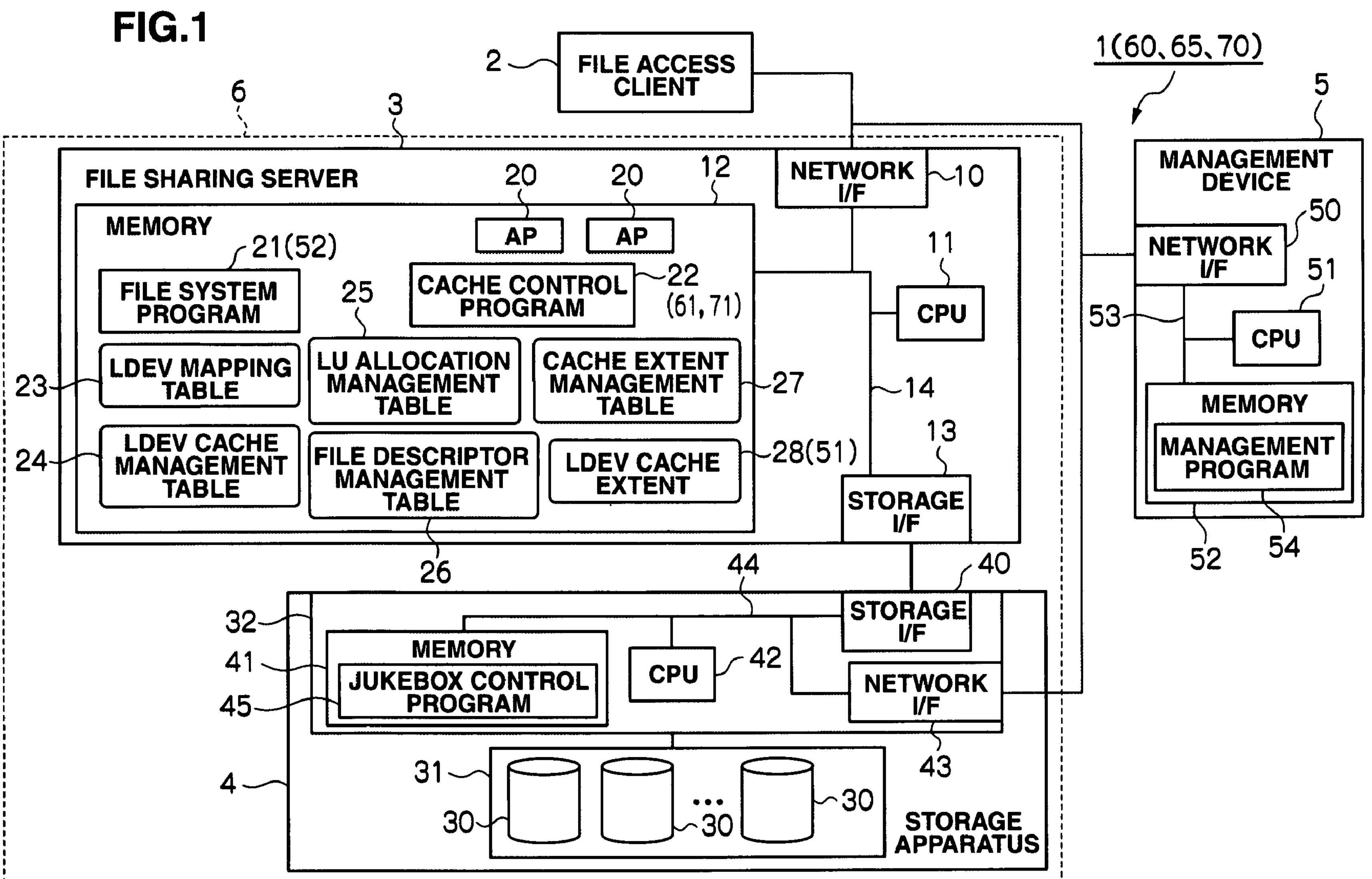
FIG.1
FILE ACCESS CLIENT
2
6
3
1(60, 65, 70)
5
MANAGEMENT DEVICE
NETWORK I/F
50
CPU
51
53
MEMORY
MANAGEMENT PROGRAM
52
54
FILE SHARING SERVER
MEMORY
20
20
AP
AP
12
NETWORK I/F
10
21(52)
FILE SYSTEM PROGRAM
25
CACHE CONTROL PROGRAM
22
(61, 71)
CPU
11
LDEV MAPPING TABLE
23
LU ALLOCATION MANAGEMENT TABLE
CACHE EXTENT MANAGEMENT TABLE
27
14
LDEV CACHE MANAGEMENT TABLE
24
FILE DESCRIPTOR MANAGEMENT TABLE
LDEV CACHE EXTENT
28(51)
13
STORAGE I/F
26
44
40
STORAGE I/F
32
MEMORY
41
JUKEBOX CONTROL PROGRAM
45
CPU
42
NETWORK I/F
43
4
31
30
30
30
30
STORAGE APPARATUS

LU1
LU2
LU3
47
FILE SYSTEM
FS1
FS2
FS3
FS4
46
LDEV1
LDEV2
LDEV3
LDEV4
30

FIG.4

| MOUNT PATH | LDEV NUMBER | ALLOCATION LU NUMBER | LDEV CACHE MANAGEMENT TABLE POINTER |
|---|---|---|---|
| /mnt/fs1 | 1 | 16 | 1 |
| /mnt/fs2 | 2 | - | 2 |
| /mnt/fs3 | 10 | 19 | 3 |
| ••• | ••• | ••• | ••• |

| FILE PATH | ON-MEMORY FLAG | SYNC FLAG | REFERENCE COUNTER | CACHE EXTENT ADDRESS |
|---|---|---|---|---|
| a.xbx | 0 | 0 | 0 | 0x0000 |
| aa/cc/b.d00 | 1 | 1 | 3 | 0xFFB2, 0xFF40 |
| ab/libtest.a | 1 | 0 | 5 | 0xFB00, 0xFAB0,••• |
| ••• | ••• | ••• | ••• | ••• |

| LU NUMBER | IN-USE FLAG |
|---|---|
| 15 | 0 |
| 16 | 1 |
| 19 | 1 |
| 21 | 0 |

| FILE DESCRIPTOR | LDEV CACHE MANAGEMENT TABLE RECORD POINTER | LDEV MAPPING TABLE RECORD POINTER | USED FLAG |
|---|---|---|---|
| 0 | 1 | 2 | 1 |
| 1 | 2 | 1 | 1 |
| 2 | - | - | 0 |
| ••• | ••• | ••• | ••• |

| CACHE EXTENT | IN-USE FLAG |
|---|---|
| 0xF000 | 1 |
| 0xF004 | 1 |
| ••• | ••• |
| 0xFFFF | 0 |

27A 27B 27

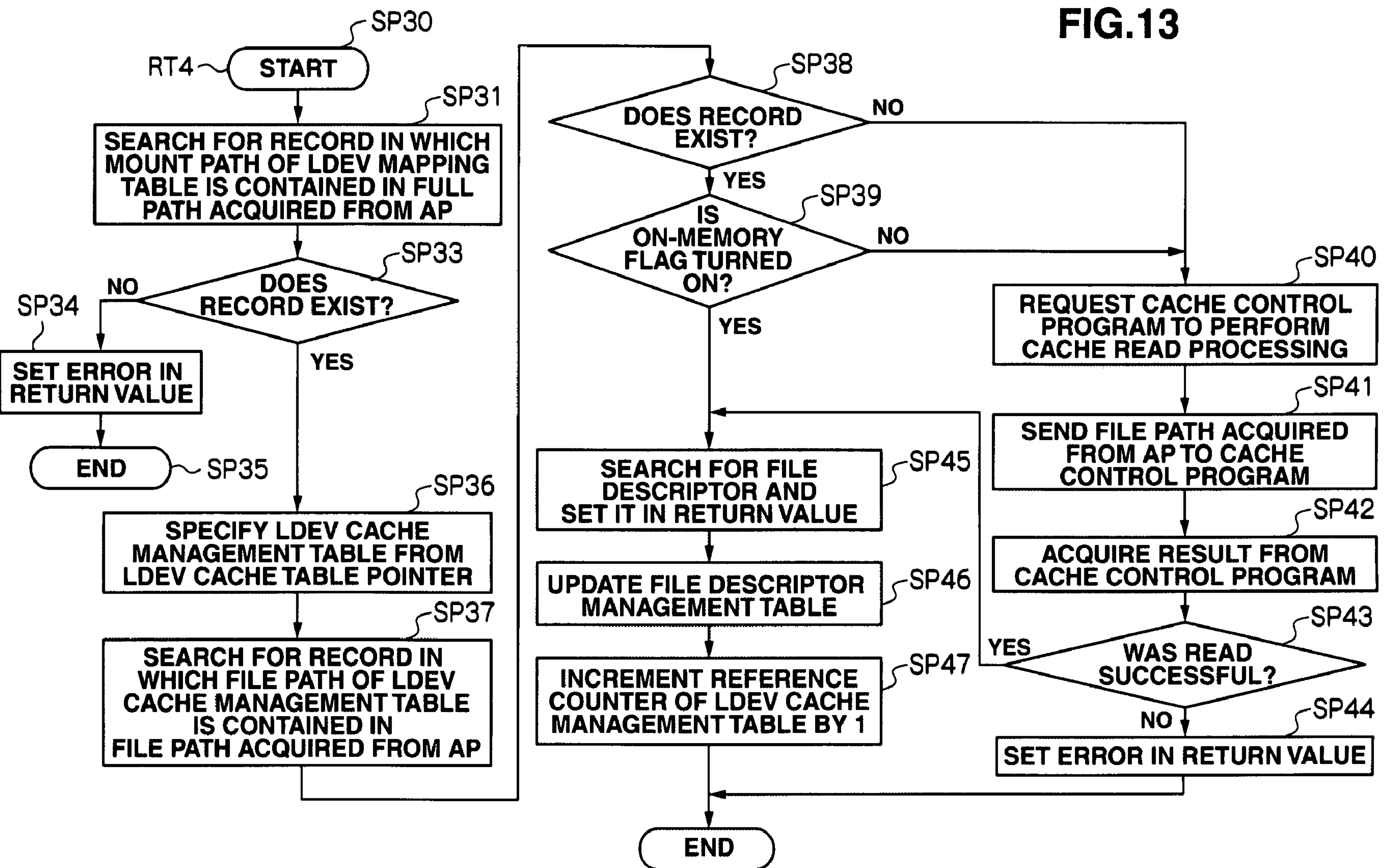
FIG.13
RT4
SP30
START
SP31
SEARCH FOR RECORD IN WHICH MOUNT PATH OF LDEV MAPPING TABLE IS CONTAINED IN FULL PATH ACQUIRED FROM AP
SP33
DOES RECORD EXIST?
YES
NO
SP34
SET ERROR IN RETURN VALUE
SP35
END
SP36
SPECIFY LDEV CACHE MANAGEMENT TABLE FROM LDEV CACHE TABLE POINTER
SP37
SEARCH FOR RECORD IN WHICH FILE PATH OF LDEV CACHE MANAGEMENT TABLE IS CONTAINED IN FILE PATH ACQUIRED FROM AP
SP38
DOES RECORD EXIST?
YES
NO
SP39
IS ON-MEMORY FLAG TURNED ON?
YES
NO
SP40
REQUEST CACHE CONTROL PROGRAM TO PERFORM CACHE READ PROCESSING
SP41
SEND FILE PATH ACQUIRED FROM AP TO CACHE CONTROL PROGRAM
SP42
ACQUIRE RESULT FROM CACHE CONTROL PROGRAM
SP43
WAS READ SUCCESSFUL?
YES
NO
SP44
SET ERROR IN RETURN VALUE
SP45
SEARCH FOR FILE DESCRIPTOR AND SET IT IN RETURN VALUE
SP46
UPDATE FILE DESCRIPTOR MANAGEMENT TABLE
SP47
INCREMENT REFERENCE COUNTER OF LDEV CACHE MANAGEMENT TABLE BY 1
END

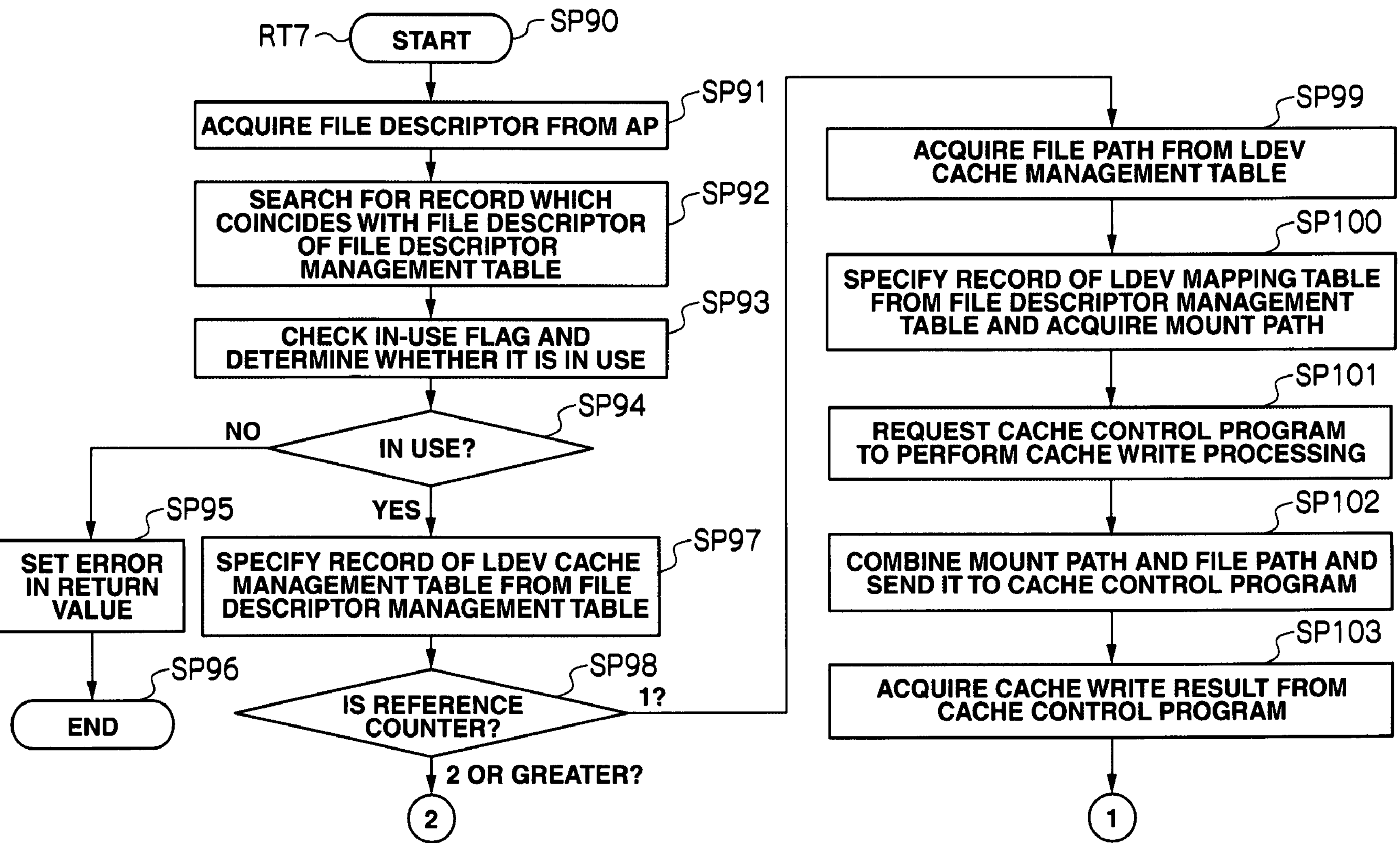
FIG.16
RT7
START
SP90
ACQUIRE FILE DESCRIPTOR FROM AP
SP91
SEARCH FOR RECORD WHICH COINCIDES WITH FILE DESCRIPTOR OF FILE DESCRIPTOR MANAGEMENT TABLE
SP92
CHECK IN-USE FLAG AND DETERMINE WHETHER IT IS IN USE
SP93
IN USE?
SP94
NO
YES
SET ERROR IN RETURN VALUE
SP95
END
SP96
SPECIFY RECORD OF LDEV CACHE MANAGEMENT TABLE FROM FILE DESCRIPTOR MANAGEMENT TABLE
SP97
IS REFERENCE COUNTER?
SP98
1?
2 OR GREATER?
2
ACQUIRE FILE PATH FROM LDEV CACHE MANAGEMENT TABLE
SP99
SPECIFY RECORD OF LDEV MAPPING TABLE FROM FILE DESCRIPTOR MANAGEMENT TABLE AND ACQUIRE MOUNT PATH
SP100
REQUEST CACHE CONTROL PROGRAM TO PERFORM CACHE WRITE PROCESSING
SP101
COMBINE MOUNT PATH AND FILE PATH AND SEND IT TO CACHE CONTROL PROGRAM
SP102
ACQUIRE CACHE WRITE RESULT FROM CACHE CONTROL PROGRAM
SP103
1

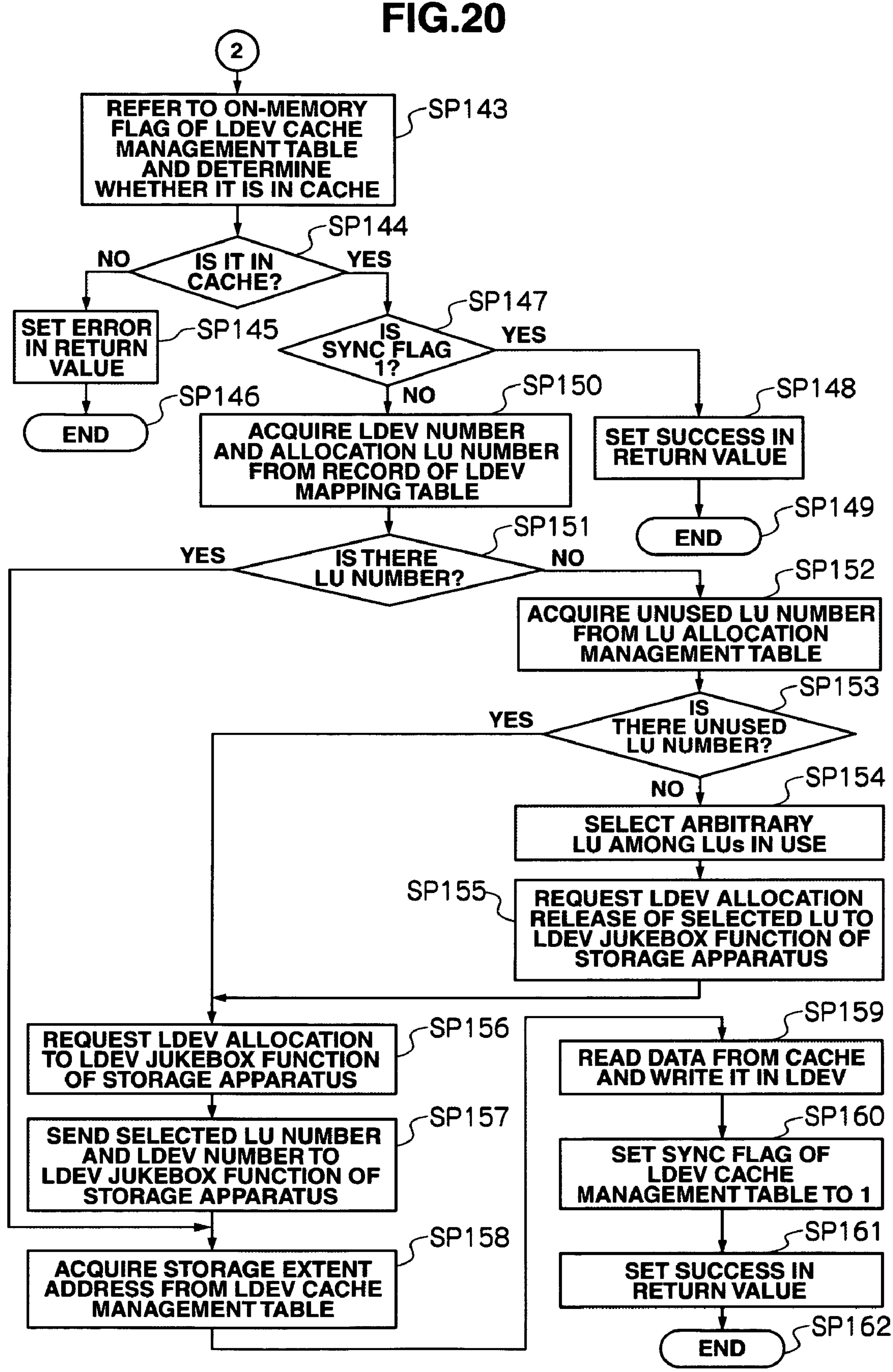
FIG.20
2
REFER TO ON-MEMORY FLAG OF LDEV CACHE MANAGEMENT TABLE AND DETERMINE WHETHER IT IS IN CACHE
SP143
IS IT IN CACHE?
SP144
NO
YES
SET ERROR IN RETURN VALUE
SP145
END
SP146
IS SYNC FLAG 1?
SP147
YES
NO
SET SUCCESS IN RETURN VALUE
SP148
END
SP149
ACQUIRE LDEV NUMBER AND ALLOCATION LU NUMBER FROM RECORD OF LDEV MAPPING TABLE
SP150
IS THERE LU NUMBER?
SP151
YES
NO
ACQUIRE UNUSED LU NUMBER FROM LU ALLOCATION MANAGEMENT TABLE
SP152
IS THERE UNUSED LU NUMBER?
SP153
YES
NO
SELECT ARBITRARY LU AMONG LUs IN USE
SP154
REQUEST LDEV ALLOCATION RELEASE OF SELECTED LU TO LDEV JUKEBOX FUNCTION OF STORAGE APPARATUS
SP155
REQUEST LDEV ALLOCATION TO LDEV JUKEBOX FUNCTION OF STORAGE APPARATUS
SP156
SEND SELECTED LU NUMBER AND LDEV NUMBER TO LDEV JUKEBOX FUNCTION OF STORAGE APPARATUS
SP157
ACQUIRE STORAGE EXTENT ADDRESS FROM LDEV CACHE MANAGEMENT TABLE
SP158
READ DATA FROM CACHE AND WRITE IT IN LDEV
SP159
SET SYNC FLAG OF LDEV CACHE MANAGEMENT TABLE TO 1
SP160
SET SUCCESS IN RETURN VALUE
SP161
END
SP162

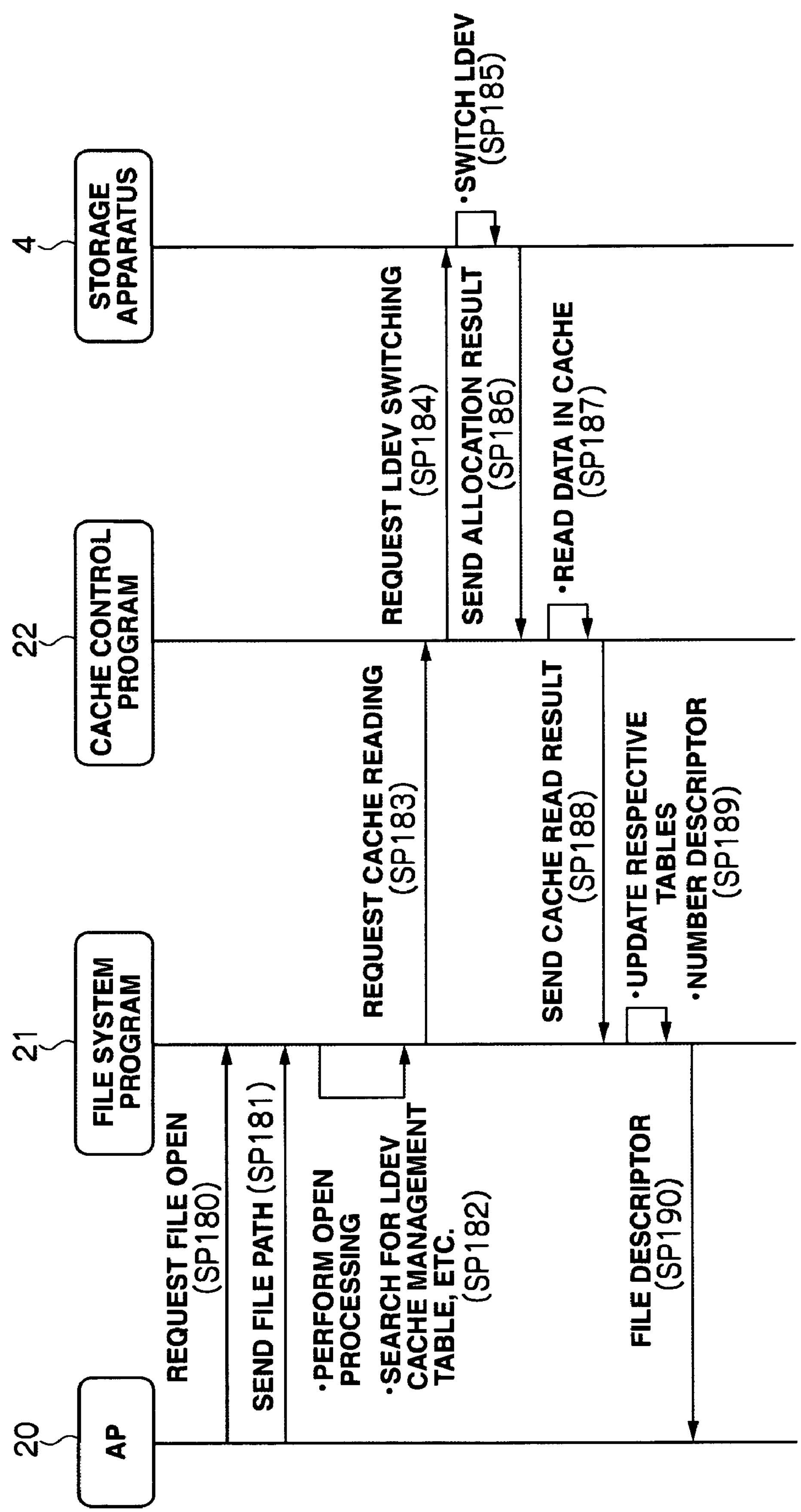
FIG.22
20
AP
21
FILE SYSTEM PROGRAM
22
CACHE CONTROL PROGRAM
4
STORAGE APPARATUS
REQUEST FILE OPEN (SP180)
SEND FILE PATH (SP181)
·PERFORM OPEN PROCESSING
·SEARCH FOR LDEV CACHE MANAGEMENT TABLE, ETC. (SP182)
REQUEST CACHE READING (SP183)
REQUEST LDEV SWITCHING (SP184)
·SWITCH LDEV (SP185)
SEND ALLOCATION RESULT (SP186)
·READ DATA IN CACHE (SP187)
SEND CACHE READ RESULT (SP188)
·UPDATE RESPECTIVE TABLES
·NUMBER DESCRIPTOR (SP189)
FILE DESCRIPTOR (SP190)

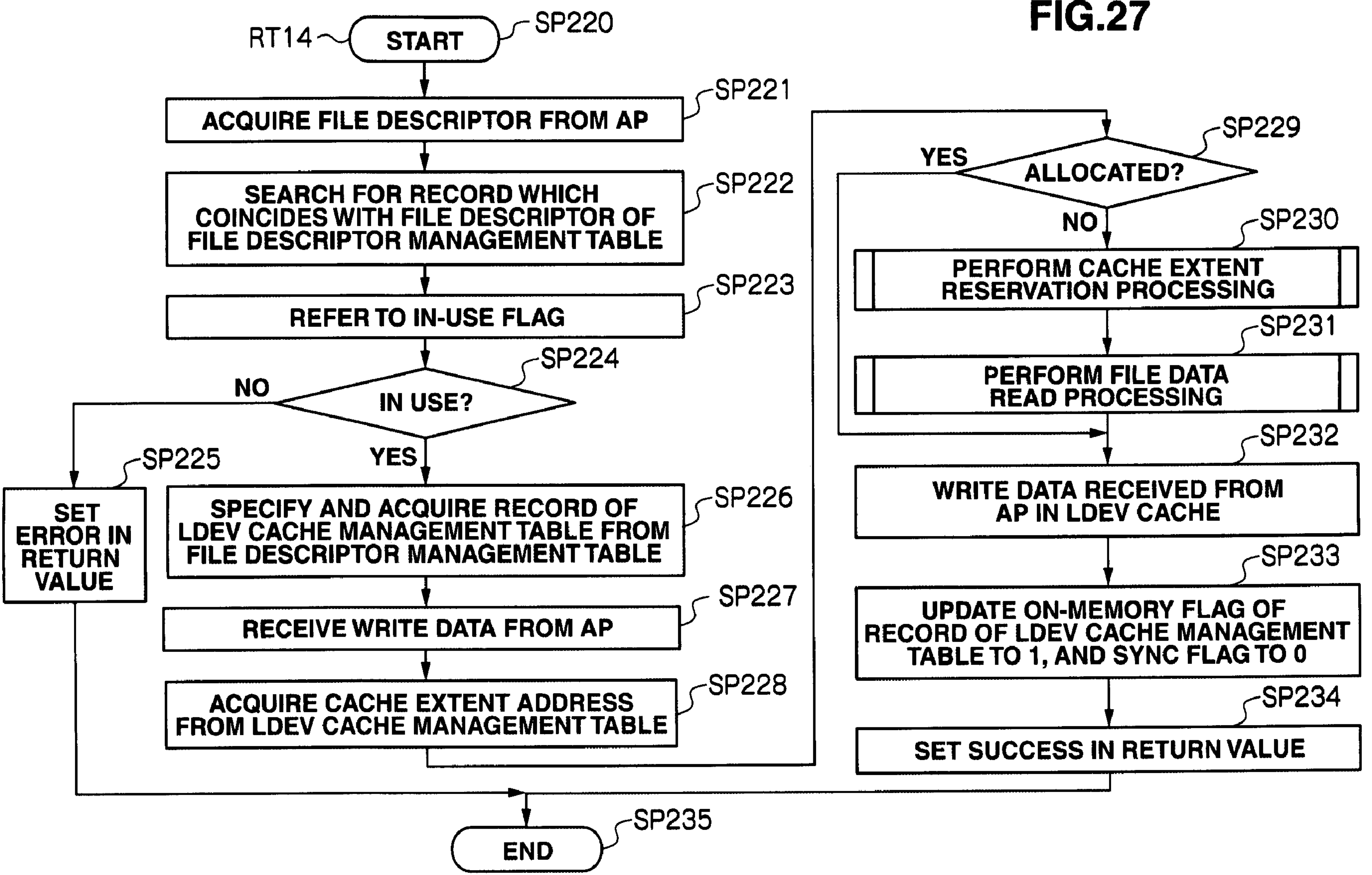
FIG.27
RT14
START
SP220
ACQUIRE FILE DESCRIPTOR FROM AP
SP221
SEARCH FOR RECORD WHICH COINCIDES WITH FILE DESCRIPTOR OF FILE DESCRIPTOR MANAGEMENT TABLE
SP222
REFER TO IN-USE FLAG
SP223
IN USE?
SP224
NO
YES
SET ERROR IN RETURN VALUE
SP225
SPECIFY AND ACQUIRE RECORD OF LDEV CACHE MANAGEMENT TABLE FROM FILE DESCRIPTOR MANAGEMENT TABLE
SP226
RECEIVE WRITE DATA FROM AP
SP227
ACQUIRE CACHE EXTENT ADDRESS FROM LDEV CACHE MANAGEMENT TABLE
SP228
ALLOCATED?
SP229
YES
NO
PERFORM CACHE EXTENT RESERVATION PROCESSING
SP230
PERFORM FILE DATA READ PROCESSING
SP231
WRITE DATA RECEIVED FROM AP IN LDEV CACHE
SP232
UPDATE ON-MEMORY FLAG OF RECORD OF LDEV CACHE MANAGEMENT TABLE TO 1, AND SYNC FLAG TO 0
SP233
SET SUCCESS IN RETURN VALUE
SP234
END
SP235

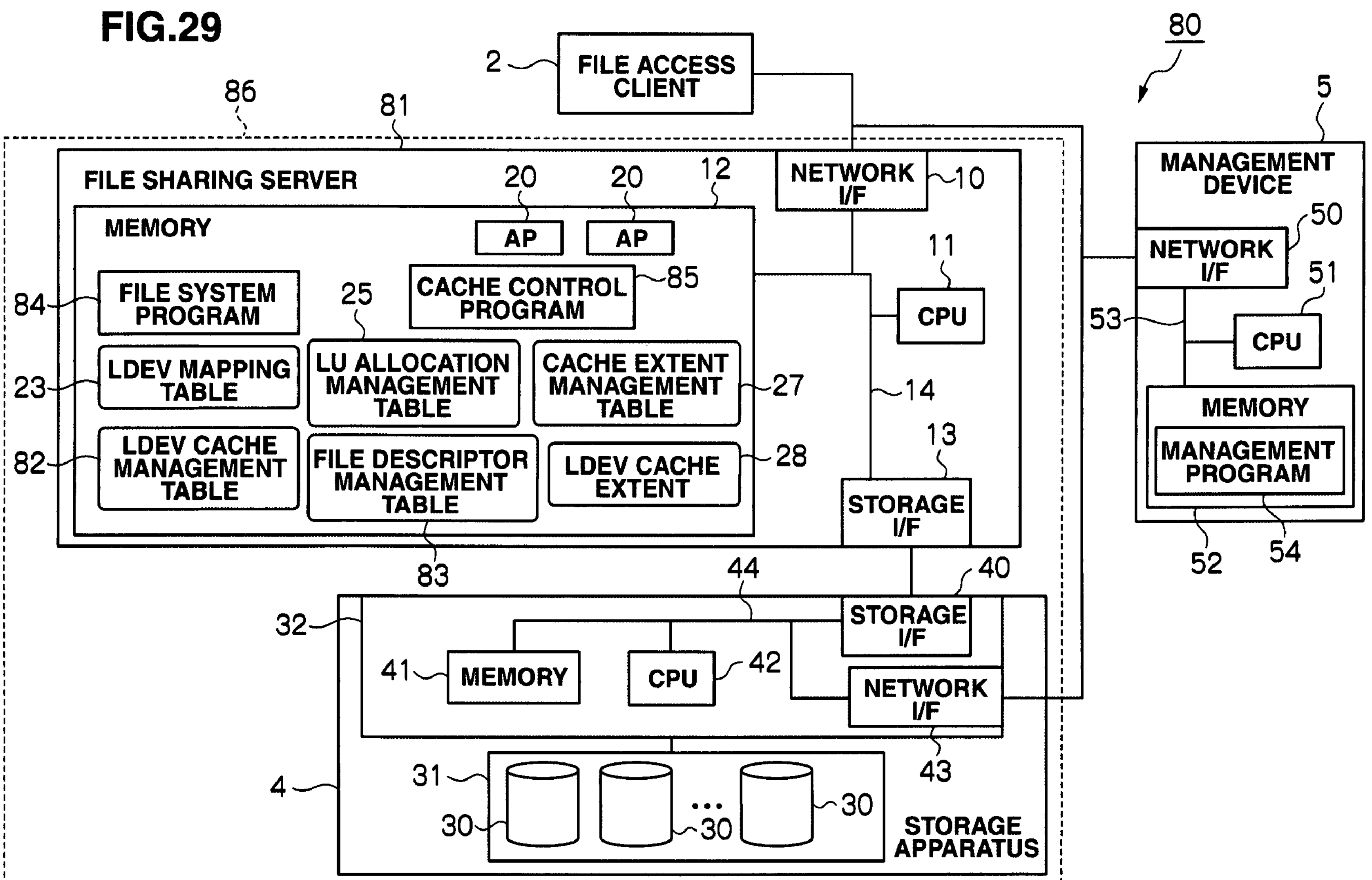
FIG.29
2
FILE ACCESS CLIENT
80
86
81
5
MANAGEMENT DEVICE
FILE SHARING SERVER
20
20
12
NETWORK I/F
10
MEMORY
AP
AP
50
NETWORK I/F
11
51
84
FILE SYSTEM PROGRAM
25
CACHE CONTROL PROGRAM
85
CPU
53
CPU
23
LDEV MAPPING TABLE
LU ALLOCATION MANAGEMENT TABLE
CACHE EXTENT MANAGEMENT TABLE
27
14
MEMORY
13
MANAGEMENT PROGRAM
82
LDEV CACHE MANAGEMENT TABLE
FILE DESCRIPTOR MANAGEMENT TABLE
LDEV CACHE EXTENT
28
STORAGE I/F
52
54
83
44
40
32
STORAGE I/F
41
MEMORY
CPU
42
NETWORK I/F
43
4
31
30
30
30
30
STORAGE APPARATUS

FIG.30

| BLOCK NUMBER | ON-MEMORY FLAG | Sync FLAG | REFERENCE COUNTER | CACHE ADDRESS |
|---|---|---|---|---|
| 0 | 0 | 0 | 0 | 0×0000 |
| 1 | 1 | 1 | 3 | 0xF224 |
| 2 | 1 | 0 | 5 | 0x2020 |
| ••• | ••• | ••• | ••• | ••• |

| FILE DESCRIPTOR | LDEV NUMBER | USED FLAG | INODE POINTER |
|---|---|---|---|
| 0 | 1 | 1 | 4 |
| 1 | 2 | 1 | 6 |
| 2 | - | 0 | 0 |
| ••• | ••• | ••• | ••• |

83A 83B 83C 83D

83

FILE DESCRIPTOR MANAGEMENT TABLE
RECORD 1
RECORD 2
83
inode
90A
90A
UID
GID
mode
...
BLOCK
UID
GID
mode
...
BLOCK
LDEV CACHE EXTENT
28
FILE SYSTEM
INODE TABLE
1
2
3
DATE BLOCK
31
33
35
36
37
FS1
AR1
AR2
LDEV1
FILE SYSTEM
30
31
32
33
34
35
36
36
37
FS
LDEV2

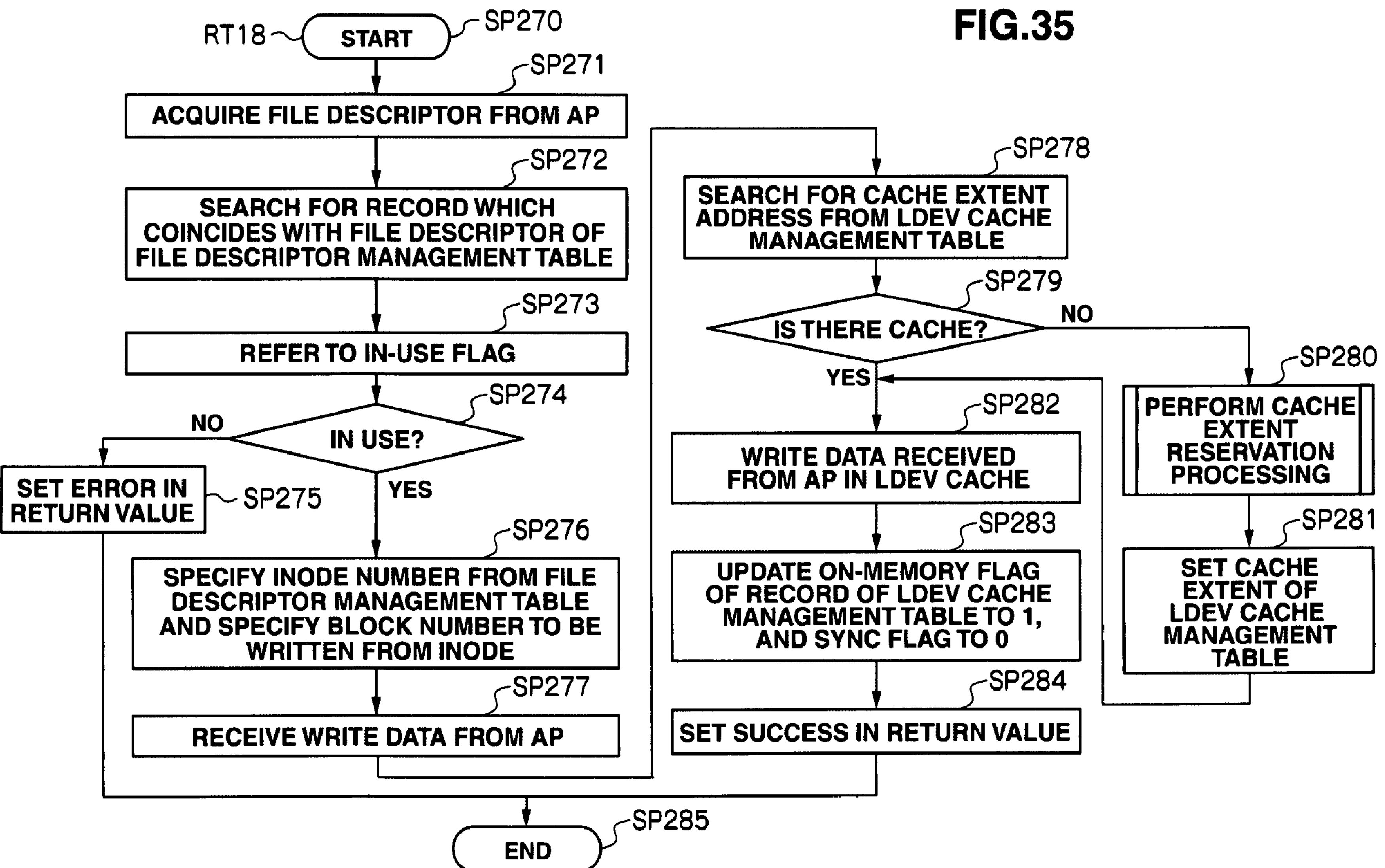
FIG.35
RT18
START
SP270
ACQUIRE FILE DESCRIPTOR FROM AP
SP271
SEARCH FOR RECORD WHICH COINCIDES WITH FILE DESCRIPTOR OF FILE DESCRIPTOR MANAGEMENT TABLE
SP272
REFER TO IN-USE FLAG
SP273
IN USE?
SP274
NO
YES
SET ERROR IN RETURN VALUE
SP275
SPECIFY INODE NUMBER FROM FILE DESCRIPTOR MANAGEMENT TABLE AND SPECIFY BLOCK NUMBER TO BE WRITTEN FROM INODE
SP276
RECEIVE WRITE DATA FROM AP
SP277
SEARCH FOR CACHE EXTENT ADDRESS FROM LDEV CACHE MANAGEMENT TABLE
SP278
IS THERE CACHE?
SP279
NO
YES
PERFORM CACHE EXTENT RESERVATION PROCESSING
SP280
SET CACHE EXTENT OF LDEV CACHE MANAGEMENT TABLE
SP281
WRITE DATA RECEIVED FROM AP IN LDEV CACHE
SP282
UPDATE ON-MEMORY FLAG OF RECORD OF LDEV CACHE MANAGEMENT TABLE TO 1, AND SYNC FLAG TO 0
SP283
SET SUCCESS IN RETURN VALUE
SP284
END
SP285

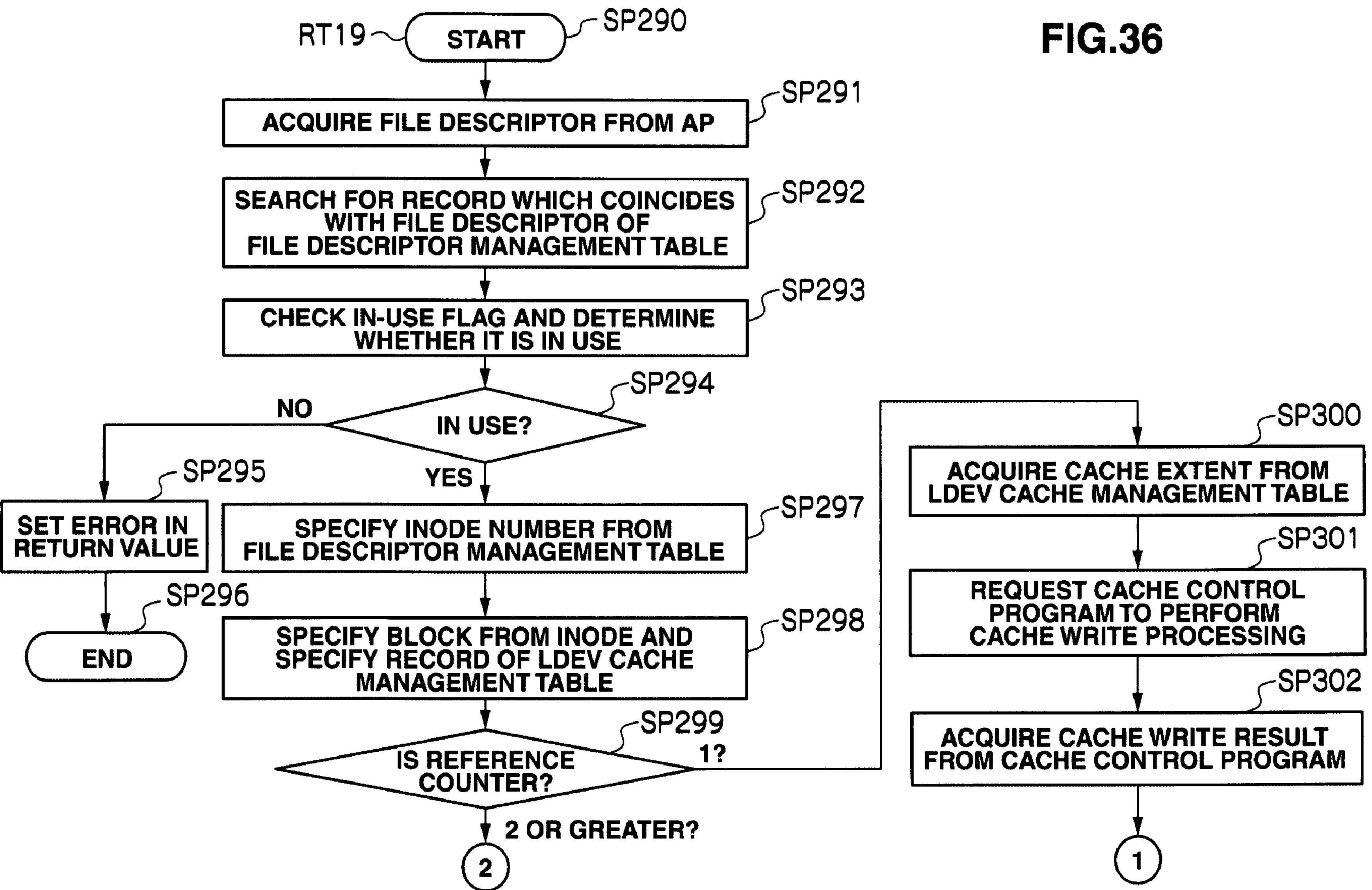
FIG.36
RT19
START
SP290
ACQUIRE FILE DESCRIPTOR FROM AP
SP291
SEARCH FOR RECORD WHICH COINCIDES WITH FILE DESCRIPTOR OF FILE DESCRIPTOR MANAGEMENT TABLE
SP292
CHECK IN-USE FLAG AND DETERMINE WHETHER IT IS IN USE
SP293
IN USE?
SP294
NO
YES
SET ERROR IN RETURN VALUE
SP295
END
SP296
SPECIFY INODE NUMBER FROM FILE DESCRIPTOR MANAGEMENT TABLE
SP297
SPECIFY BLOCK FROM INODE AND SPECIFY RECORD OF LDEV CACHE MANAGEMENT TABLE
SP298
IS REFERENCE COUNTER?
SP299
1?
2 OR GREATER?
2
ACQUIRE CACHE EXTENT FROM LDEV CACHE MANAGEMENT TABLE
SP300
REQUEST CACHE CONTROL PROGRAM TO PERFORM CACHE WRITE PROCESSING
SP301
ACQUIRE CACHE WRITE RESULT FROM CACHE CONTROL PROGRAM
SP302
1

RT20
START
SP310
RECEIVE PROCESSING REQUEST FROM FILE SYSTEM PROGRAM
SP311
RECEIVE LDEV NUMBER TO BE OPERATED AND BLOCK NUMBER
SP312
PERFORM CACHE READ PROCESSING?
SP313
NO
YES
SP334
REFER TO LDEV CACHE MANAGEMENT TABLE
SP314
REFER TO LDEV CACHE MANAGEMENT TABLE
SP335
IS THERE CACHE?
NO
YES
SP315
IS THERE CACHE?
YES
NO
SP336
SET ERROR IN RETURN VALUE
2
1
SP316
SET SUCCESS IN RETURN VALUE
SP337
END
SP317
END

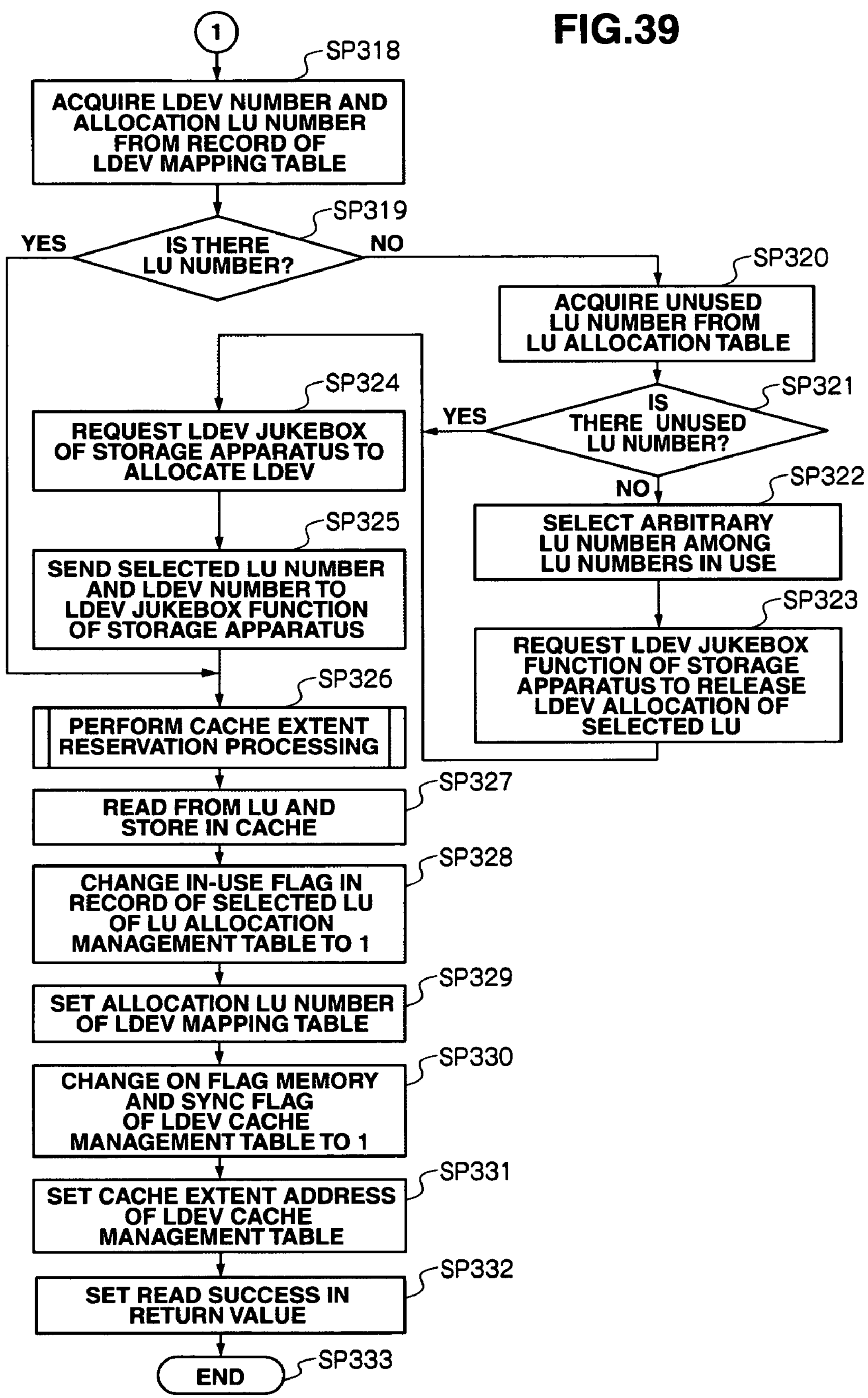
FIG.39
1
SP318
ACQUIRE LDEV NUMBER AND ALLOCATION LU NUMBER FROM RECORD OF LDEV MAPPING TABLE
SP319
IS THERE LU NUMBER?
YES
NO
SP320
ACQUIRE UNUSED LU NUMBER FROM LU ALLOCATION TABLE
SP321
IS THERE UNUSED LU NUMBER?
YES
NO
SP322
SELECT ARBITRARY LU NUMBER AMONG LU NUMBERS IN USE
SP323
REQUEST LDEV JUKEBOX FUNCTION OF STORAGE APPARATUS TO RELEASE LDEV ALLOCATION OF SELECTED LU
SP324
REQUEST LDEV JUKEBOX OF STORAGE APPARATUS TO ALLOCATE LDEV
SP325
SEND SELECTED LU NUMBER AND LDEV NUMBER TO LDEV JUKEBOX FUNCTION OF STORAGE APPARATUS
SP326
PERFORM CACHE EXTENT RESERVATION PROCESSING
SP327
READ FROM LU AND STORE IN CACHE
SP328
CHANGE IN-USE FLAG IN RECORD OF SELECTED LU OF LU ALLOCATION MANAGEMENT TABLE TO 1
SP329
SET ALLOCATION LU NUMBER OF LDEV MAPPING TABLE
SP330
CHANGE ON FLAG MEMORY AND SYNC FLAG OF LDEV CACHE MANAGEMENT TABLE TO 1
SP331
SET CACHE EXTENT ADDRESS OF LDEV CACHE MANAGEMENT TABLE
SP332
SET READ SUCCESS IN RETURN VALUE
SP333
END

INFORMATION PROCESSING APPARATUS, INFORMATION PROCESSING METHOD AND STORAGE SYSTEM USING CACHE TO REDUCE DYNAMIC SWITCHING OF MAPPING BETWEEN LOGICAL UNITS AND LOGICAL DEVICES

This application relates to and claims priority from Japanese Patent Application No. 2006-254113, filed on Sep. 20, 2006, the entire disclosure of which is incorporated herein by reference.

BACKGROUND

The present invention generally relates to an information processing apparatus, an information processing method and a storage system, and, in particular, can be suitably applied to a storage system comprising a storage apparatus equipped with a jukebox function.

Conventionally, known is a storage apparatus that is equipped with a function of presenting a logical unit (hereinafter referred to as a logical unit) as a virtual storage extent to a host system, and reading and writing corresponding data from and in a Logical DEVice (LDEV) allocated to the logical unit in compliance with a data I/O request given from the host system to the logical unit.

Further, in recent years, a storage apparatus equipped with a function referred to as a LDEV jukebox function for dynamically changing the allocation of the logical device to the logical unit according to a request from an application program loaded in the host system has been put into practical use (refer to Japanese Patent Laid-Open Publication No. 2005-20914 and Japanese Patent Laid-Open Publication No. 2006-107257). According to this kind of LDEV jukebox function, it is possible to handle logical devices in a quantity exceeding the number of logical units that can be managed by an OS (Operating System).

SUMMARY

Nevertheless, according to the LDEV jukebox function, it is not possible to perform data I/O processing to the logical device during the foregoing switch processing of the logical device. Thus, when a plurality of application programs respectively request a different logical device as the logical device to be allocated to the logical unit, there is a problem in that the foregoing switch processing of the logical device will occur frequently, resulting in an overhead, and cause causing the reading/writing performance of data in the storage apparatus to deteriorate temporarily.

In addition, according to the LDEV jukebox function, it is necessary to perform exclusive processing among the application programs so that the logical device allocated to the logical unit will not be switched while the application program of the host system is accessing the logical unit. As a result, there is a problem in that the burden on the host system will become significant.

The present invention was made in view of the foregoing problems. Thus, an object of this invention is to propose an information processing apparatus, an information processing method and a storage system capable of preventing the deterioration in the reading/writing performance of data in the storage apparatus, caused by the frequent occurrence of switch processing of the logical device.

In order to achieve the foregoing object, the present invention provides an information processing apparatus. This information processing apparatus comprises a storage apparatus having storage devices for providing logical devices to store data and a first processing unit providing virtual logical units based on a mapping relation between the logical devices and the virtual logical units and being operative to switch the mapping relation dynamically according to an external request. The information processing apparatus also comprises a file sharing server comprising a cache memory including cache extents and a second processing unit operative to provide the virtual logical units of the storage apparatus to a host system by using said cache extents, and manage the mapping relationships between the logical devices and the virtual logical units. The second processing unit is operative to request a certain file from the storage apparatus, read data of the certain file from the corresponding logical device in said storage apparatus and store said data in one of the cache extents of the cache memory, and perform data input/output (I/O) processing to data of said file stored in said cache extent according to a file access request given by said host system for accessing said file.

Thereby, according to this information processing apparatus, as long as data of the file exists in the storage device, access to such file will be made to the data in the storage device. Thus, it is possible to effectively prevent the frequent occurrence of switch processing of mapping of the logical unit and the logical device in the storage apparatus.

The present invention further provides an information processing method. This information processing method comprises a first step of creating a cache extent on the storage extent and providing it to a host system, requesting a storage apparatus to switch, as necessary, the mapping between the logical unit and a logical device in the storage apparatus that dynamically switches the mapping with the logical device storing data provided from the host system according to an external request, and reading data of a necessary file from the corresponding logical device in the storage apparatus and storing the data in the cache extent, and a second step of performing data I/O processing to data of the file stored in the cache according to a file access request given by the host system for accessing the file is for an information storage system having a storage apparatus and a file sharing server, the storage apparatus comprising storage devices for providing logical devices to store data, and a first processing unit providing virtual logical units based on a mapping relationship between the logical devices and the virtual logical units and being adapted to switch to the mapping relation dynamically according to an external request. The file sharing server comprises a cache memory including cache extents and a second processing unit operative to provide the virtual logical units of the storage apparatus to a host system by using the cache extents, and manage mapping relationships between the logical devices and the virtual logical units. The method comprises a first step of (1) requesting by said second processing unit a certain file from the storage apparatus; (2) reading data of a certain file from the corresponding logical device in said storage apparatus and storing said data in one of the cache extents of the cache memory; and (3) performing data I/O processing to data of said file stored in said cache extent according to a file access request given by said host system for accessing said file. The method further comprises a second step of dynamically switching by said first processing unit the mapping relationship between the logical devices and the virtual logical units according to an external request.

Thereby, according to this information processing method, as long as data of the file exists in the storage device, access to such file will be made to the data in the storage device. Thus, it is possible to effectively prevent the frequent occurrence of the switch processing of mapping of the logical unit and the logical device in the storage apparatus.

The present invention further provides a storage system. This storage system comprises a storage apparatus comprising storage devices for providing logical devices to store data and a first processing unit providing virtual logical units based on a mapping relationship between the logical devices and the virtual logical units and being operative to switch to the mapping relation dynamically according to an external request. The storage system further comprises a server system comprising a cache memory including cache extents and a second processing unit operative to provide the virtual logical units of the storage apparatus to a host system by using the cache extents, and manage mapping relationships between the logical devices and the virtual logical units. The server system is operative to request a certain file from the storage apparatus, read data of a necessary file from the corresponding logical device in said storage apparatus and store the data in one of the cache extents, and performing data I/O processing to data of the file stored in the cache extent according to a file access request given by the host system for accessing the file.

Thereby, according to this server system, as long as data of the file exists in the storage device, access to such file will be made to the data in the storage device. Thus, it is possible to effectively prevent the frequent occurrence of the switch processing of mapping of the logical unit and the logical device in the storage apparatus.

According to the present invention, it is possible to prevent the deterioration in the reading/writing performance of data in the storage apparatus caused by the frequent occurrence of switch processing of the logical device.

DESCRIPTION OF DRAWINGS

FIG. 1 is a block diagram showing the configuration of a computer system according to embodiments of the present invention;

FIG. 4 is a conceptual diagram showing an LDEV mapping table;

FIG. 5 is a conceptual diagram showing an LDEV cache management table;

FIG. 6 is a conceptual diagram showing an LU allocation management table;

FIG. 7 is a conceptual diagram showing a file descriptor management table;

FIG. 8 is a conceptual diagram showing a cache extent management table;

FIG. 13 is a flowchart explaining file open processing;

FIG. 16 is a flowchart explaining file close processing;

FIG. 20 is a flowchart explaining cache read/write processing;

FIG. 22 is a timing chart explaining the sequential flow of processing upon opening a file;

FIG. 27 is a flowchart explaining file write processing according to another embodiment of the present invention;

FIG. 29 is a block diagram showing the configuration of a computer system according to another embodiment of the present invention;

FIG. 30 is a conceptual diagram showing an LDEV cache management table according to another embodiment of the present invention;

FIG. 31 is a conceptual diagram showing a file descriptor management table according to another embodiment of the present invention;

FIG. 35 is a flowchart explaining file-write processing according to another embodiment of the present invention;

FIG. 36 is a flowchart explaining file close processing according to another embodiment of the present invention;

FIG. 39 is a flowchart explaining cache read/write processing according to another embodiment of the present invention.

DETAILED DESCRIPTION

Figure 2:
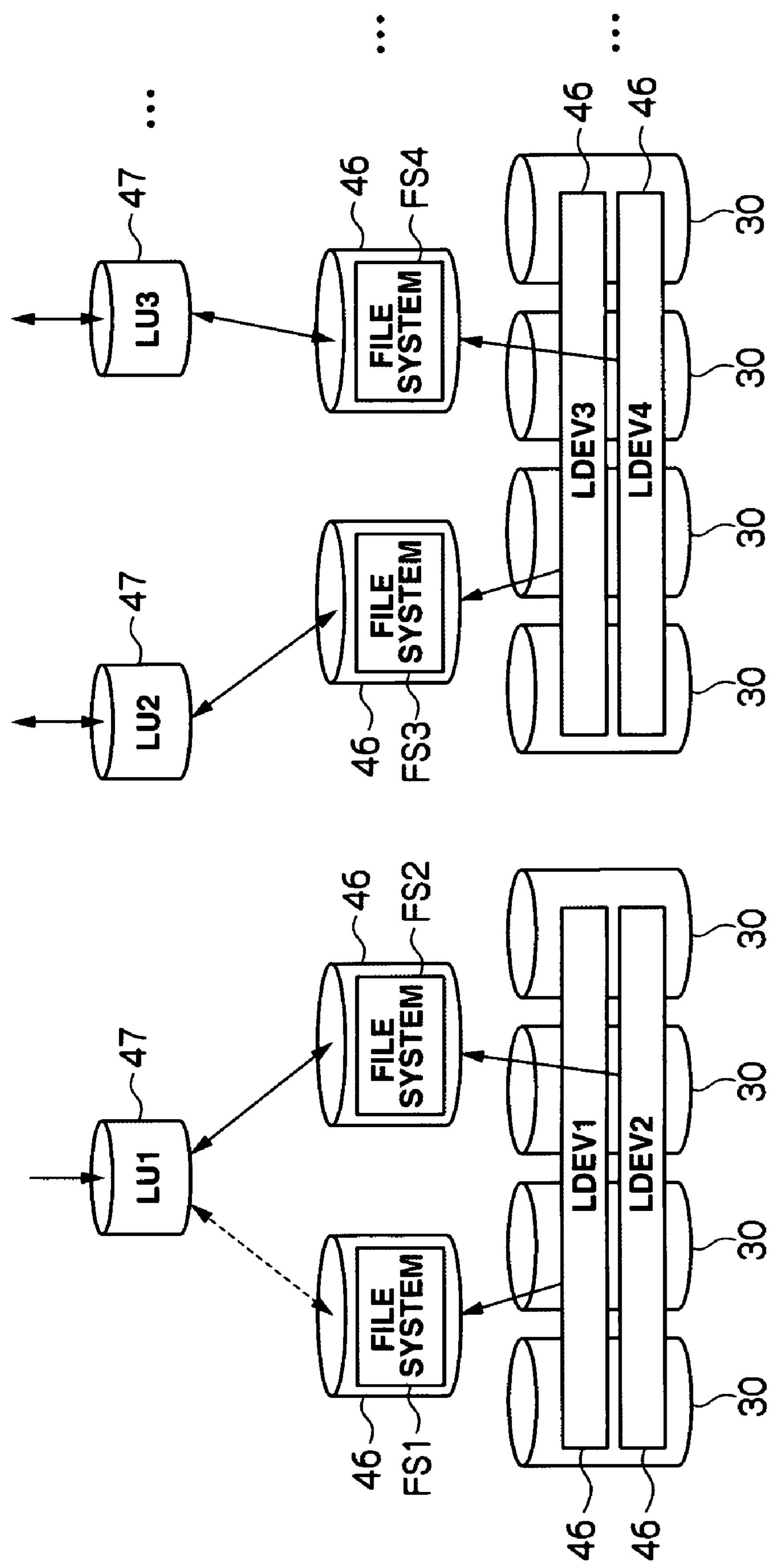
FIG. 2 is a conceptual diagram explaining the relationship of a logical device, a file system and a logical unit.

An embodiment of the present invention is now explained in detail with reference to the attached drawings.

(1) First Embodiment

(1-1) Configuration of Computer System in Present Embodiment

FIG. 1 shows an overall computer system 1 according to the present embodiment. The computer system 1 comprises a file access client 2 as a host system, a storage system 6 configured from a file sharing server 3 and a storage apparatus 4, and a management device 5. The file access client 2 is connected to the storage apparatus 4 via the file sharing server 3, and the file sharing server 3 and the storage apparatus 4 are connected to the management device 5.

The file access client 2 is a terminal to be used by a user for requesting a file access to the file sharing server 3, and is configured from a personal computer, a workstation, a mainframe or the like. The file access client 3 comprises information processing resources such as a CPU (Central Processing Unit) and a memory, as well as an information input device (not shown) such as a keyboard, a switch, a pointing device or a microphone, and an information output device (not shown) such as a monitor display or a speaker.

The file sharing server 3 is a server that provides services by receiving a file access request from the file access client 2, and is configured from a NFS (Network File System) server, a CIFS (Common Internet File System) server or the like. The file sharing server 3 comprises a network interface unit 10, a CPU 11, a memory 12 and a storage interface unit 13, and these are connected in a mutually communicable status via a bus 14.

The network interface unit 10, for instance, is configured from a network interface card such as a SCSI (Small Computer System Interface) card or a LAN (Local Area Network) interface card, and is used as a data I/O adapter for connecting the file access client 2 to the storage apparatus 4.

The CPU 11 is a processor that governs the operational control of the overall file sharing server 3, and executes various control processes based on various programs stored in the memory 12.

The memory 12 is primarily used for retaining various application programs 20, various control programs and various management tables. A file system program 21 and a cache control program 22, a LDEV mapping table 23, a LDEV cache management table 24, a logical unit allocation management table 25, a file descriptor management table 26, a cache extent management table 27 and so on described later are also retained in the memory 12. Further, as described later, an LDEV cache extent 28 for retaining file data read from the storage apparatus 4 is created in the memory 12.

The storage apparatus 4 is a large-capacity data storage equipped with an LDEV jukebox function for dynamically switching the mapping of a logical unit 47 (FIG. 2) as virtual storage devices to be provided to the file sharing server 3, and a logical device 46 (FIG. 2) as a logical storage device to be managed by the storage apparatus 4. The storage apparatus 4 comprises a disk device unit 31 configured from a plurality of disk devices 30, and a controller 32 for controlling the respective disk devices 30 in the disk device unit 31.

The respective disk devices 30, for instance, may be configured from an expensive disk such as a SCSI (Small Computer System Interface) disk, or an inexpensive disk such as a SATA (Serial AT Attachment) disk or an optical disk. The disk devices 30 are operated by the controller 32 according to a RAID (Redundant Array of Inexpensive Disks) system. Incidentally, in substitute for the disk device 30, a semiconductor memory such as a flash memory may also be used.

As shown in FIG. 2, one or more logical devices 46 (LDEV1, LDEV2, . . . ) are defined on a physical storage extent provided by one or more disk devices 30, and the logical devices 46 are mapped (allocated) to the logical units 47 (LU1, LU2, . . . ) configured in the storage apparatus 4. When a data I/O request designating the logical unit 47 is sent from the file access client 2, reading/writing processing of corresponding data is performed to the logical device 46 mapped to the logical unit 47.

The controller 32 is configured by a storage interface unit 40, a memory 41, a CPU 42 and a network interface unit 43 being connected via a bus 44.

The storage interface unit 40 functions as an interface during the sending and receiving of data to and from the file sharing server 3. Moreover, the memory 41 is used as a work memory of the CPU 42 in addition to being used for retaining various control programs including a control program 45 for providing the foregoing LDEV jukebox function (hereinafter referred to as a jukebox control program).

The CPU 42 is a processor that governs the operational control of the overall storage apparatus 4, and controls the storage interface unit 40, the network interface unit 43 and the disk device unit 31 based on various control programs stored in the memory 41.

The network interface unit 43, as with the network interface unit 10 of the file sharing server 3, is configured, for example, from a network interface card such as a SCSI card or a LAN interface card, and functions as an adapter for connecting the storage apparatus 4 to the management device 5.

The management device 5 is a terminal to be used by a system administrator for managing the file sharing server 3 and the storage apparatus 4, and is configured from a personal computer, a workstation, a mainframe or the like.

The management device 5 is configured by comprising a network interface unit 50, a CPU 51 and a memory 52 mutually connected via a bus 53, and is connected to the file sharing server 3 and the storage apparatus 4 through the network interface unit 50. The memory 52 stores various control programs such as a business program 54, and various processes of the overall management device 5 are executed by the CPU 51 executing these control programs.

(1-2) LDEV Switch Control Function in Present Embodiment

An LDEV switch control function according to the present embodiment adopted in the computer system 1 is now explained.

Figure 3:
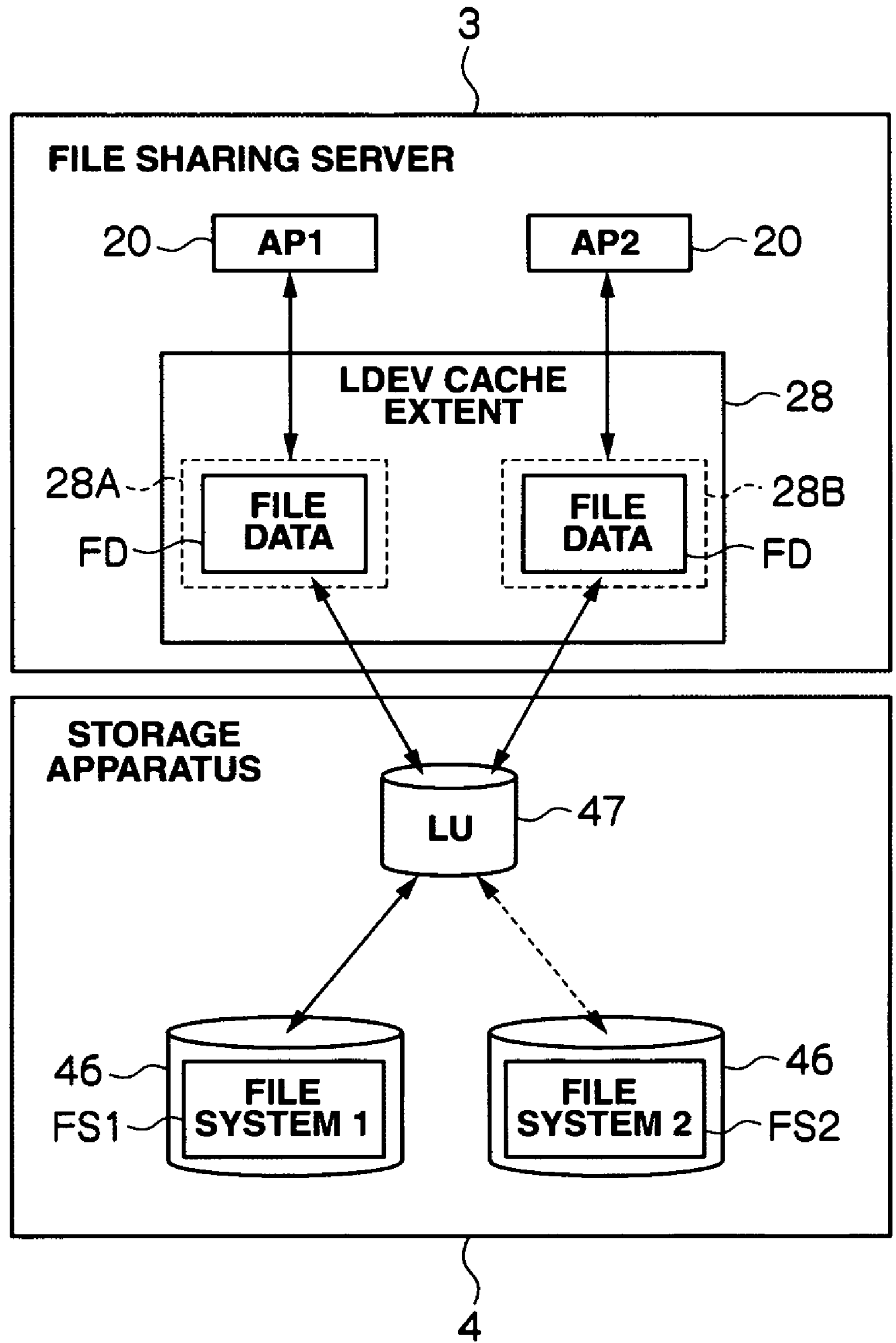
FIG. 3 is a conceptual diagram explaining the LDEV switch control function according to an embodiment of the present invention.

With the computer system 1, as shown in FIG. 3, when the application program 20 that operates in the file sharing server 3 accesses a file stored in the storage apparatus 4, the data of such file (file data) FD is read from the storage apparatus 4 to a storage extent 28 of a prescribed capacity created in the memory 12 of the file sharing server 3 (hereinafter referred to as a LDEV cache extent), and the subsequent access to such file is performed to the file data FD read into the LDEV cache extent 28. In other words, the file sharing server 3 is a file sharing server in which an extent of a part of the LDEV cache extent 28 is allocated for each application program 20 or for each file.

Thereby, with the computer system 1, since file access of the application program 20 (FIG. 2) is conducted to the LDEV cache extent 28 while file data exists in the LDEV cache extent 28, it is possible to avoid the switching of the logical device 46 to be mapped to the logical unit 47 according to the LDEV jukebox function in the storage apparatus 4. As a result, it is possible to reduce the number of switchings of the mappings of the logical device 46 to the logical unit 47 according to the LDEV jukebox function, and reduce the overhead relating to the switch processing of the logical device 46.

With the computer system 1, the file system program 21 (FIG. 1) dynamically manages the mappings of the logical device 46 to the logical unit 47. Thereby, with the computer system 1, the application program 20 of the file sharing server 3 is able to access a desired file with an access method that is the same as a standard file access without having to be aware of the switching of the mapping of the logical device 46 to the logical unit 47.

Specifically, with the computer system 1, while a certain application program 20 is accessing the logical device 46 mapped to the logical unit 47, the application program 20 is not required to personally perform exclusive processing so that another application program 20 does not change such mapping. In other words, when a plurality of application programs 20 access different logical devices 46 using the same logical unit 47, it is possible to use the LDEV jukebox function without having to make any special change in the application program 20.

As a means for providing this kind of LDEV switch control function, the memory 12 of the file sharing server 3, as shown in FIG. 1, stores an LDEV mapping table 23, a LDEV cache management table 24, a LU allocation management table 25, a file descriptor management table 26 and a cache extent management table 27.

The LDEV mapping table 23 is a table for managing a mount path for each file system FS (FIG. 2) mounted on the storage apparatus 4, and the mapping relationship between the logical device 46 and the logical unit 47, and, as shown in FIG. 4, is configured from a "mount path" column 23A, an "LDEV number" column 23B, an "allocation LU number" column 23C and an "LDEV cache management table pointer" column 23D.

Among the above, the "mount path" column 23A stores a path to the corresponding file system FS. That is, in the case of the present embodiment, one file system FS is created for each logical device 46, and the created file systems FS are mounted like a graft on a part of the file path managed by the file sharing server 3. The "mount path" column 23A of the LDEV mapping table 23 stores a path to the corresponding mounted file system FS (logical device 46).

Further, the "LDEV number" column 23B stores an identification number of the logical device 46 (hereinafter referred to as an LDEV number) storing data of the file system FS, and the "allocation LU number" column 23C stores an identification number of the logical unit 47 (hereinafter referred to as a LU number) mapped with such logical device 46 at such time. Nevertheless, when such logical device 46 is not mapped to the logical unit 47 at such time, prescribed information ("-") representing this is stored. Moreover, the "LDEV cache management table pointer" column 23D stores a pointer to an LDEV cache management table 24 described later corresponding to the file system FS.

Accordingly, in the example of FIG. 4, the mount path to a certain file system FS is "/mnt/fs1", data of such file system FS is stored in the logical device 46 having an LDEV number of "1", the logical device 46 is mapped to the logical unit 47 having a LU number of "16", and a pointer to the LDEV cache management table 24 created regarding the file system FS is "1".

Meanwhile, the LDEV cache management table 24 is a table for managing whether the respective files belonging to a certain file system FS have been read into the LDEV cache extent 28. In the present embodiment, since data of one file system FS is stored in one logical device 46 as described above (since one file system FS corresponds to one logical device 46), the LDEV cache management table 24 is created for each file system FS (logical device 46).

The LDEV cache management table 24, as shown in FIG. 5, is configured from a "file path" column 24A, an "ON memory flag" column 24B, a "Sync flag" column 24C, a "reference counter" column 24D and a "cache extent address" column 24E.

The "file path" column 24A stores a local path (file path) to a corresponding file. Therefore, by combining the mount path stored in the "mount path" column 23A of the LDEV mapping table 23 and the file path stored in the "file path" column 24A of the corresponding LDEV cache management table 24, the overall path (full path) to such file can be obtained from the route directory.

For instance, when the file system FS corresponding to the record in the first line of the LDEV mapping table 23 shown in FIG. 4 and the LDEV cache management table 24 shown in FIG. 5 are in correspondence, the full path to the file corresponding to the record in the second line of the LDEV cache management table 24 will be "/mnt/fs1/aa/cc/b.doc", which is a combination of the mount path "/mnt/fs1" stored in the corresponding "mount path" column ("mount path" column of first line) 23A of the LDEV mapping table 23, and the "aa/cc/b.doc" stored in the corresponding "file path" column ("file path" column of second line) 24A of the LDEV cache management table 24.

Further, the "ON memory flag" column 24B stores a flag representing whether data of the corresponding file is retained in the memory 12 of the file sharing server 3. For example, the case of FIG. 5 shows that data of a file corresponding to the record in the first line of the LDEV cache management table 24 does not currently exist in the memory 12 of the file sharing server 3, and, contrarily, shows that data of the respective files corresponding respectively to the records in the second and third lines of the LDEV cache management table 24 is retained in the memory 12 of the file sharing server 3.

Moreover, the "Sync flag" column 24C stores information representing whether data of such file read into the memory 12 of the file sharing server 3 and data stored in the corresponding logical device 46 in the storage apparatus 4 are in sync (that is, whether they coincide). Specifically, as described later, "1" is stored in the "Sync flag" column 24C (showing synchronization) at the stage data of such file is read into the LDEV cache extent 28 created in the memory 12 of the file sharing server 3, and "0" is stored in the "Sync flag" column 24C (showing asynchronization) at the stage data read into the LDEV cache extent 28 is updated.

In addition, the "reference counter" column 24D stores the number of application programs 20 referring to the file. Thus, in the example of FIG. 5, the file corresponding to the record in the first line is not being referred to by any application program 20, and the file corresponding to the record in the second line is being referred to by three application programs 20.

Further, the "cache extent address" column 24E stores an address of a storage extent (hereinafter referred to as a cache extent) 28A (FIG. 3) storing data of such file in the LDEV cache extent 28 created in the memory 12 of the file sharing server 3. In the case of the present embodiment, since the memory 12 is managed in block units of a prescribed size (for instance, 4 KB), the "cache extent address" column 24 will store an address of a block storing the data of such file. In this case, for instance, when the data volume of such file is great and the data of such file is stored across a plurality of blocks, the address of the respective blocks is stored in the "cache extent address" column 24E.

In the example of FIG. 5, since data of a file corresponding to the record in the first line 1 is retained in the memory 12, the address is set to "0x0000". Further, FIG. 5 shows that, with respect to data of a file corresponding to the record in the second line, the address retained in the memory 12 of the file sharing server 3 is stored across the two blocks of "0xFFB2" and "0xFF40".

Meanwhile, the logical unit allocation management table 25 is a table for managing the logical unit 47 to be used in the LDEV jukebox function, and, as shown in FIG. 6, is configured from a "LU number" column 25A and an "in-use flag" column 25B.

Among the above, the "LU number" column 25A stores a LU number of the logical unit 47 available in the LDEV jukebox function, and the "in-use flag" column 25B stores a flag representing whether such logical unit 47 is currently in use; that is, whether any logical device 46 is mapped to the logical unit 47.

Accordingly, in the example of FIG. 6, as the logical unit 47 available in the LDEV jukebox function, logical units 47 having a LU number of "15", "16", "19" or "21" exist. Among these logical units 47, the logical units 47 having a LU number of "15" and "21" do not currently have any logical device 46 mapped thereto, and the logical units 47 having a LU number of "16" and "19" currently have one of the logical devices 46 mapped thereto.

The file descriptor management table 26 is a table created with the file system program 21 (FIG. 1) when the application program 20 loaded in the file sharing server 3 is activated, and is used by the file system program 21 for managing a so-called file descriptor, which is an identification number allocated to the file upon the application program 20 opening the file.

The file descriptor management table 26, as shown in FIG. 7, is configured from a "file descriptor" column 26A, a "LDEV cache management table record pointer" column 26B, a "LDEV mapping table record pointer" column 26C and a "used flag" column 26D.

The "file descriptor" column 26A stores a file descriptor allocated when a corresponding file is opened, and the "LDEV cache management table record pointer" column 26B stores a pointer to a record in the LDEV cache management table 24 corresponding to such file.

Further, the "LDEV mapping table record pointer" column 26C stores a pointer to a record in the LDEV mapping table 23 corresponding to such file, and the "used flag" column 26D stores information representing whether the corresponding file is currently open. Specifically, "1" is stored in the "used flag" column 26D when the corresponding file is opened, and "0" is stored in the "used flag" column 26D when the file is not opened.

Accordingly, the example of FIG. 7 shows that the file having a file descriptor of "1" corresponds respectively to the "2$^{nd}$" record in the LDEV cache management table 24 and the "1$^{st}$" record of the LDEV mapping table 23, and the file is currently open.

Contrarily, the cache extent management table 27 is a table for managing the usage status of the memory 12 of the file sharing server 3 in block extent units, and, as shown in FIG. 8, is configured from a "cache extent" column 27A and an "in-use flag" column 27B.

The "cache extent" column 27A stores the address of the respective blocks existing in the LDEV cache extent 28 (FIG. 1) created in the memory 12, and the "in-use flag" column 27B stores information representing whether a corresponding block is currently in use (whether file data is stored in the block). Specifically, when the corresponding block is in use, "1" is stored in the "used flag" column 27B, and, when the block is not in use, "0" is stored in the "used flag" column 27B.

Accordingly, in the example of FIG. 8, the respective blocks having an address is "0xF000" and "0xF004" are currently in use, and the blocks having an address of "0xFFFF" is currently not in use.

Figure 9:
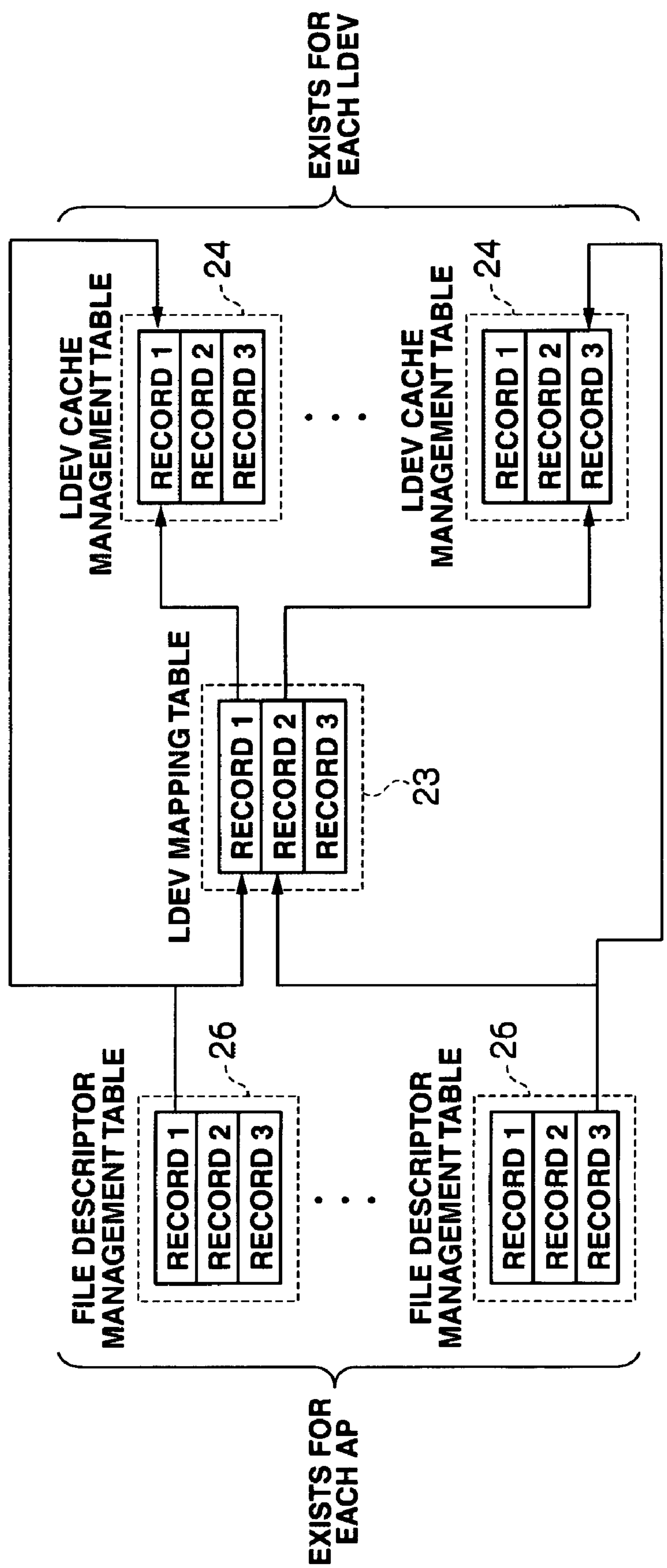
FIG. 9 is a conceptual diagram explaining the relationship of a file descriptor management table, an LDEV mapping table and an LDEV cache management table.

Incidentally, FIG. 9 shows the correlation of the file descriptor management table 26, the LDEV mapping table 23 and the LDEV cache management table 24.

As described above, the file descriptor management table 26 exists for each application program 20 loaded in the file sharing server 3, and the LDEV cache management table 24 exists for each logical device 46 (file system FS) provided in the storage apparatus 4. Further, only one LDEV mapping table 23 exists.

One record in the file descriptor management table 26, one record in the LDEV mapping table 23, and one record in the corresponding LDEV cache management table 24 are associated with a corresponding pointer in the file descriptor management table 26, and one record in the file descriptor management table 26 and one record in the corresponding LDEV cache management table 24 are associated with a pointer of the LDEV mapping table 24.

(1-3) Specific Processing Contents Concerning LDEV Switch Control Function

(1-3-1) Specific Processing Contents of CPU Based on Application Program

Figure 10:
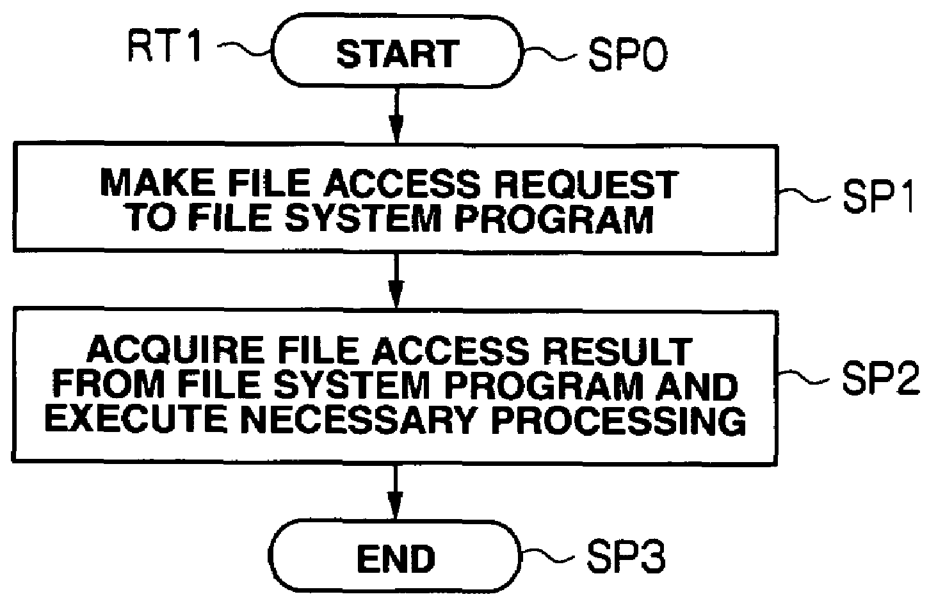
FIG. 10 is a flowchart explaining application program processing.

FIG. 10 is a flowchart showing the specific contents of the processing to be executed by the CPU 11 of the file sharing server 3 based on the application program 20 in relation to the LDEV switch control function according to the present embodiment.

When the CPU 11, for instance, receives a file access request specifying the target file from the file access client 2, it starts the application program processing shown in FIG. 10 (SP0), and foremost issues a file processing request (file open processing, file read processing, file write processing or file close processing) according to the file access request to the file system program 21 based on the application program 20 (SP1).

When the CPU 11 subsequently receives a processing result to the file processing request from the file system program 21, it executes necessary processing (i.e., transferring the data acquired based on the processing result to the host system) (SP2), and thereafter ends this application program processing (SP3).

(1-3-2) Specific Processing of CPU Based on File System Program

(1-3-2-1) Cache Extent Formation Processing

Figure 11:
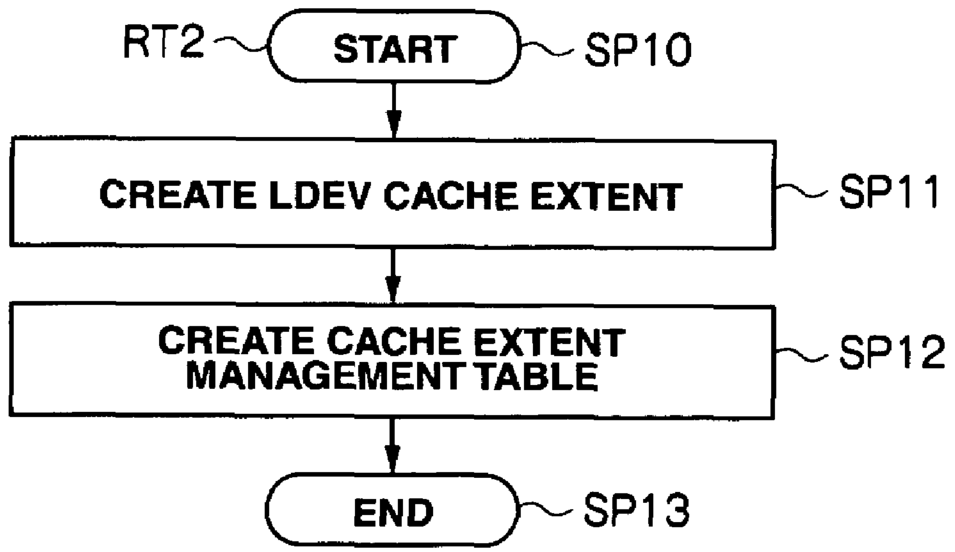
FIG. 11 is a flowchart explaining cache extent creation processing.

Meanwhile, FIG. 11 is a flowchart showing the processing contents of cache extent creation processing to be executed by the CPU 11 based on the file system program 21 upon the activation of the file sharing server 3.

When the file sharing server 3 is activated, the CPU 11 starts the cache extent creation processing shown in FIG. 11 (SP10), and foremost creates a LDEV cache extent 28 in the memory 12 for storing and retaining data of the file read from the storage apparatus 4 (SP11).

Subsequently, the CPU 11 creates a cache extent management table 27 (FIG. 8) for managing the usage status of the created LDEV cache extent 28 in block units (SP12). Specifically, the CPU 11 stores the address of the respective blocks contained in the LDEV cache extent 28 created at step SP11 in the "cache extent" column 27A (FIG. 8) of the cache extent management table 27, and creates a cache extent management table 27 in which "0" is stored in each of the corresponding "in-use flag" columns 27B (FIG. 8).

The CPU 11 thereafter ends this cache extent creation processing (SP13).

(1-3-2-2) File Access Processing

Figure 12:
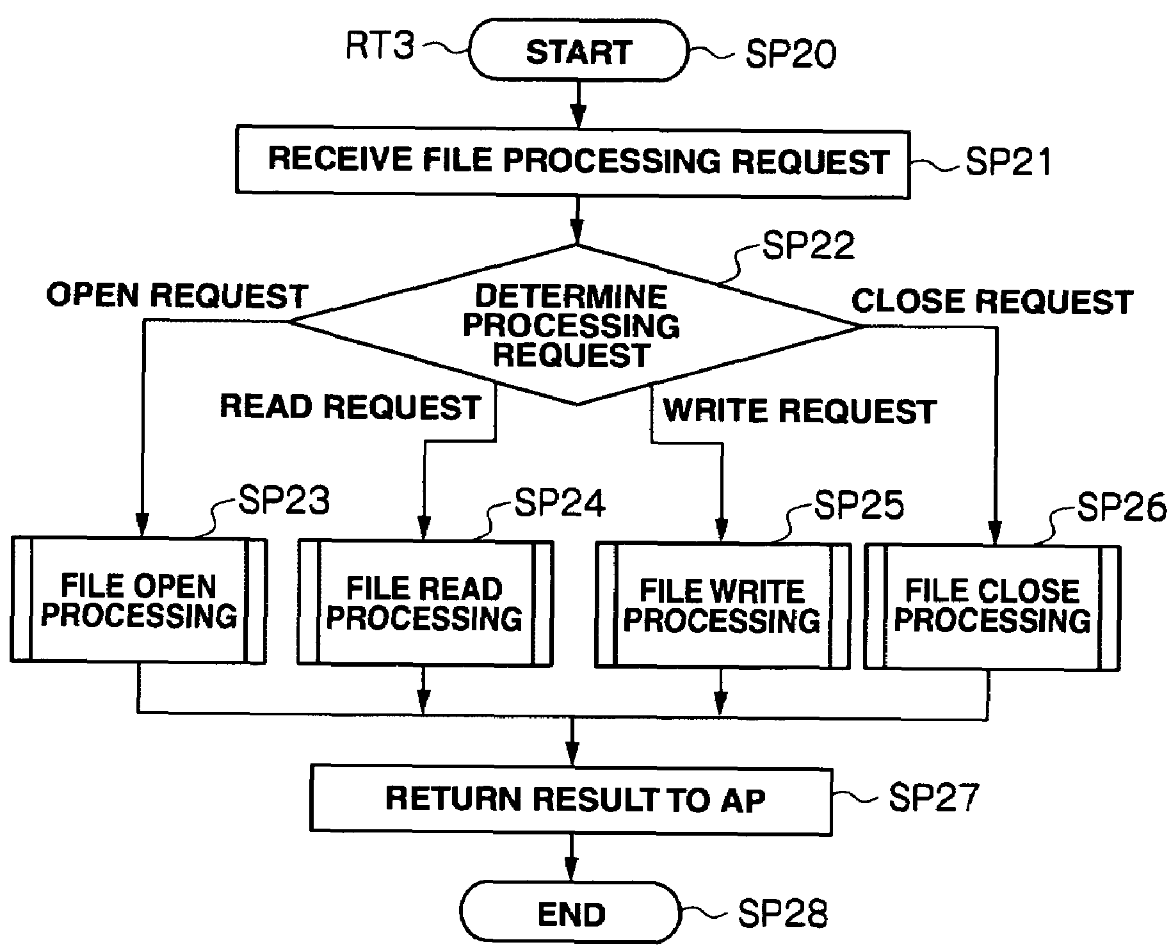
FIG. 12 is a flowchart explaining file access processing.

Meanwhile, FIG. 12 is a flowchart showing the specific contents of file access processing to be executed by the CPU 11 based on the file system program 21 according to the file processing request issued from the application program 20.

When the CPU 11 receives the file processing request (SP21), it starts the file access processing shown in FIG. 12 (SP20), and foremost determines whether the file processing request is a file open request, a file read request, a file write request or a file close request (SP22).

When the file processing request is a file open request, the CPU 11 executes file open processing for opening the designated file so that it can be used (SP23). When the file processing request is a file read request, the CPU 11 executes file read processing for reading data of the designated file (SP24).

Further, when the file processing request is a file write request, the CPU 11 executes file write processing for writing data of the file to be written in the logical device 46 designated in the storage apparatus 4 (SP25). When the file processing request is a file close request, the CPU 11 executes file close processing for closing the designated file (SP26).

Among the foregoing file open processing, file read processing, file write processing and file close processing, when the CPU 11 completes executing the processing according to the received file processing request, it returns the processing result to the application program 20, and thereafter ends this file access processing (SP28).

(1-3-2-3) File Open Processing

FIG. 13 is a flowchart showing the specific processing contents of file open processing at step SP23 of the file access processing.

When the CPU 11 proceeds to step SP23 of the file access processing, it starts the file open processing, and foremost refers to the "mount path" column 23A of the respective records of the LDEV mapping table 23 and searches for a record among such records that have a mount path that is the same as the mount path portion among the full paths up to a target file (hereinafter referred to as a target file) provided together with the file processing request (SP31).

Based on the foregoing search result, the CPU 11 thereafter determines whether such record exists in the LDEV mapping table 23 (SP33).

Here, to obtain a negative result in the foregoing determination means that the file processing request from the application program 20 is targeting a nonexistent file (i.e., file belonging to an unmounted file system). Thereby, the CPU 11 sends a response notice in which an error is set in the return value to the application program 20 (SP34), and thereafter ends this file open processing (SP35).

Contrarily, when the CPU 11 obtains a positive result in the determination at step SP33, it refers to the "LDEV cache management table pointer" column 23D (FIG. 4) of the record detected in the search at step SP31 in the LDEV mapping table 23, and specifies the LDEV cache management table 24 (FIG. 5) corresponding to the file system to which the target file belongs (SP36).

Further, the CPU 11 thereafter refers to the "mount path" column 24A of the respective records of the LDEV cache management table 24 (FIG. 5), and searches for a record among such records having a file path that is the same as the file path portion among the full paths up to the target file provided together with the file processing request from the application program 20 (SP37).

Based on the foregoing search result, the CPU 11 thereafter determines whether such record exists in the LDEV cache management table 24 (SP38).

Here, to obtain a positive result in the foregoing determination means that the target file is a file that has been accessed at least once.

Thereby, the CPU 11 refers to the "ON memory flag" column 24B of a record detected in the search at step SP37 in the LDEV cache management table 24, and determines whether "1" is stored in the "ON memory flag" column 24B; that is, whether the target file is read into the LDEV cache extent 28 of the file sharing server 3 (SP39).

When the CPU 11 obtains a positive result in the foregoing determination, it refers to the file descriptor management table 26 (FIG. 7), and numbers the file descriptors not being used at such time in the target file (SP45).

The CPU 11 thereafter registers necessary information concerning the target file in the file descriptor management table 26 (SP46). Specifically, the CPU 11 stores the numbered file descriptor in the "file descriptor" column 26A of the file descriptor management table 26, and stores the pointer to the LDEV cache management table 24 (FIG. 5) associated with such target file in the "LDEV cache management table record pointer" column 26B of the file descriptor management table 26. Further, the CPU 11 stores the pointer to the record associated with the LDEV cache management table 24 of the LDEV mapping table 23 (FIG. 4) in the "LDEV mapping table record pointer" column 26C of the file descriptor management table 26, and stores a flag (stores "1") in the "used flag" column 26D corresponding to the file descriptor management table 26.

Subsequently, the CPU 11 increments the numerical value stored in the "reference counter" column 24D of the record corresponding to the target file of the LDEV cache management table 24 by "1" (SP47), and thereafter ends this file open processing.

Contrarily, to obtain a negative result in the determination at step SP38 or step SP39 means that the target file is a file that has not yet been accessed even once (SP38: NO), or data of the target file has not been read into the LDEV cache extent 28 of the file sharing server 3 (SP39: NO). Thereby, the CPU 11 makes a request (hereinafter referred to a cache read processing request) to the cache control program 22 (FIG. 1) to execute cache read processing for reading data of the target file in the LDEV cache extent 28 (SP40).

In addition, the CPU 11, together with the file processing request, notifies the full path up to the target file given from the application program 20 to the cache control program 22 (SP41).

When the CPU 11 thereafter receives the processing result of the cache read processing request from the cache control program 22 (SP42), it determines whether the cache read processing was successful (SP43).

When the CPU 11 obtains a positive result in this determination, it thereafter executes the processing at step SP45 to step SP47 described above, and then ends this file open processing. Further, when the CPU 11 obtains a negative result in the determination at step SP43, it sends a response notice in which an error is sent in the return value to the application program 20 (SP44), and thereafter ends this file open processing.

(1-3-2-4) File Read Processing

Figure 14:
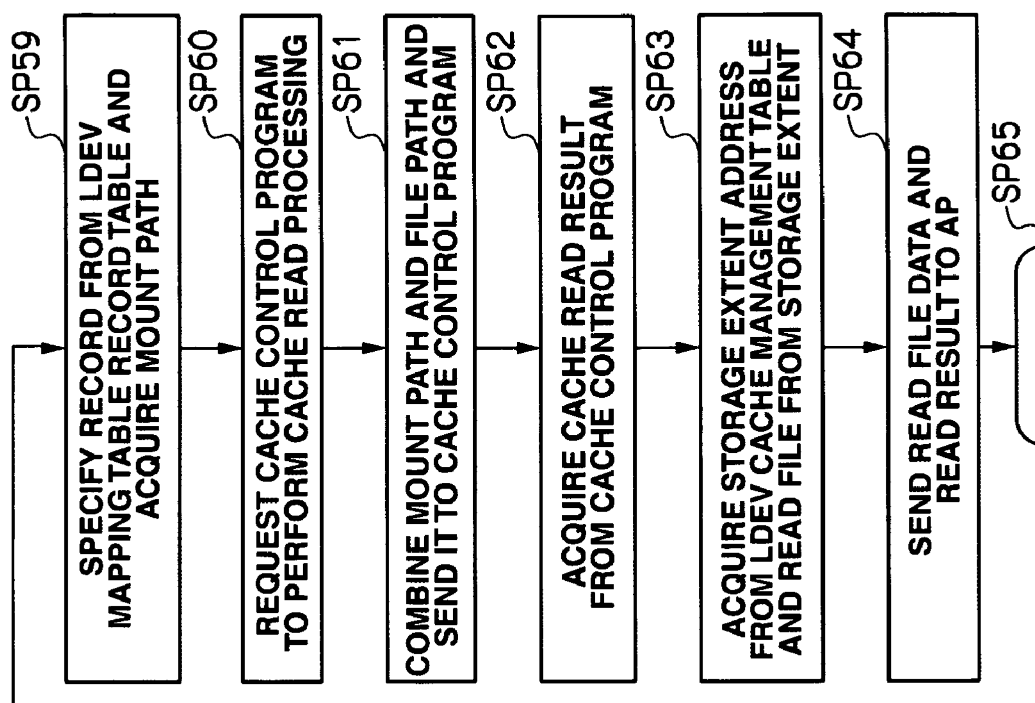
FIG. 14 is a flowchart explaining file read processing.

Meanwhile, FIG. 14 is a flowchart showing the specific processing contents of file read processing at step SP24 of the file access processing described above with reference to FIG. 12.

When the CPU 11 proceeds to step SP24 of the file access processing, it starts the file read processing, and foremost acquires a file descriptor given during the file open processing of the target file (refer to step SP45 of FIG. 13) from the application program 22 (SP50).

Subsequently, the CPU 11 searches for a record among the records registered in the file descriptor management table 26 in which the file descriptor stored in the "file descriptor" column 26A and the file descriptor acquired at step SP50 (SP52).

The CPU 11 thereafter refers to the corresponding "used flag" column 26D of the file descriptor management table 26 regarding the record detected in the search (SP53), and determines whether the file is in use (SP54).

Here, as described with reference to step SP46 of FIG. 13, when the file has been subject to file open processing, "1" is stored in the "used flag" column 26D of the file descriptor management table 26. Accordingly, to obtain a negative result in the foregoing determination means, for instance, that the file processing request from the application program 20 is targeting a file that has not yet been opened and is unauthorized. Thereby, the CPU 11 sends a response notice in which an error is set in the return value to the application program 20 (SP55), and thereafter ends this file read processing (SP56).

Contrarily, when the CPU 11 obtains a positive result in the determination at step SP54, it reads the pointer from the corresponding "LDEV cache management table record pointer" column 26B of the file descriptor management table 26 to the corresponding LDEV cache management table 24, and reads the pointer from the corresponding "LDEV mapping table record pointer" column 26C of the file descriptor management table 26 to the corresponding record in the LDEV mapping table 23 (SP57).

Subsequently, based on the pointer to the corresponding LDEV cache management table 24 read from the file descriptor management table 26 at step SP57, the CPU 11 specifies a record of the target file in the LDEV cache management table 24, and reads a file path to such target file from the corresponding "file path" column 24A of the LDEV cache management table 24 (SP58).

Further, based on the pointer to the corresponding record in the LDEV mapping table 23 read from the file descriptor management table 26 at step SP57, the CPU 11 specifies a record corresponding to the file system SS to which the target file in the LDEV mapping table 23 belongs, and reads a mount path to such file system FS from the corresponding "mount path" column 23A of the LDEV mapping table 23 (SP59).

The CPU 11 thereafter sends a cache read processing request concerning the target file to the cache control program 22 (SP60). In addition, the CPU 11 creates a full path up to the file by combining the mount path acquired at step SP59 and the file path acquired at step SP58, and notifies this full path to the cache control program 22 (SP61).

Thereby, as described later, under the control of the cache control program 22, data of the target file is read from the storage apparatus 4 and stored in the memory 3 (LDEV cache extent 28) of the file sharing server 3. In connection with this, the LDEV mapping table 23, the LDEV cache management table 24 and the LU allocation management table 25 are updated.

When the CPU 11 thereafter receives the processing result to the cache read processing request from the cache control program 22 (SP62), it refers to the LDEV cache management table 24, and reads the address in the LDEV cache extent 28 of the file sharing server 3 storing data of the target file from the corresponding "cache extent address" column 24E of the LDEV cache management table 24. Further, the CPU 11 reads the file data stored in such address position in the LDEV cache extent 28 of the file sharing server 3 based on the address acquired as described above (SP63).

The CPU 11 thereafter sends the file data acquired as described above and information on the processing result (success or failure) of the sequential file read processing to the corresponding application program 20 (SP64), and then ends this file read processing.

(1-3-2-5) File Write Processing

Figure 15:
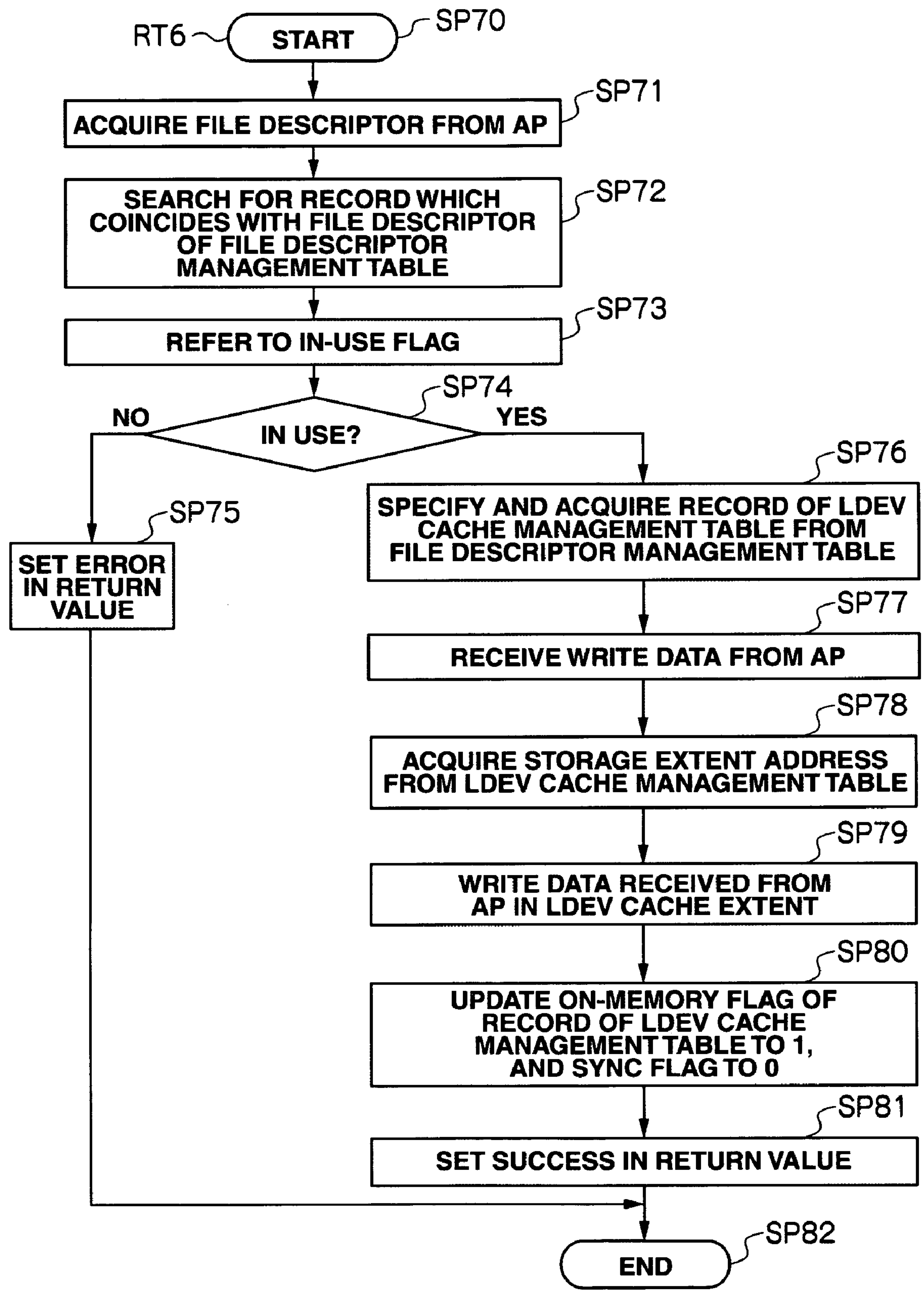
FIG. 15 is a flowchart explaining file write processing.

Meanwhile, FIG. 15 is a flowchart showing the specific processing contents of file write processing at step SP25 of the file access processing described above with reference to FIG. 12.

When the CPU 11 proceeds to step SP25 of the file access processing, it starts the file write processing, and processes step SP70 to step SP74 as with step SP50 to step SP54 of the file read processing.

When the CPU 11 obtains a negative result in the determination at step SP74, it sends a response notice in which an error is set in the return value to the application program 20 (SP75), and thereafter ends this file read processing (SP82).

Contrarily, when the CPU 11 obtains a positive result in the determination at step SP74, it refers to the "LDEV cache management table record pointer" column 26B of the corresponding record in the file descriptor management table 26 (FIG. 7), specifies the corresponding record in the corresponding LDEV cache management table 24 (FIG. 5), and reads the pointer to such record (SP76).

Subsequently, the CPU 11 receives data to be written that is sent from the application program 20 (SP77), and thereafter reads the address of the cache extent 28A (FIG. 3) for writing data of the target file in the LDEV cache extent 28 of the file sharing server 3 from the "cache extent address" column 24E of the record specified at step SP76 of the LDEV cache management table 24 (SP78).

The CPU 11 thereafter writes the data to be written received from the application program 20 at step SP77 in the cache extent 28A that acquired the address at step SP78 in the LDEV cache extent 28 of the file sharing server 3 (SP79).

Further, the CPU 11 updates the numerical value stored in the "ON memory flag" column 24B of the record specified at step SP76 of the LDEV cache management table 24 to "1", and updates the numerical value stored in the "Sync flag" column 24C of such record to "0" (SP80).

Subsequently, the CPU 11 sends a response notice in which "success" is set in the return value to the application program 20 (SP81), and thereafter ends this file read processing (SP81).

(1-3-2-6) File Close Processing

Figure 17:
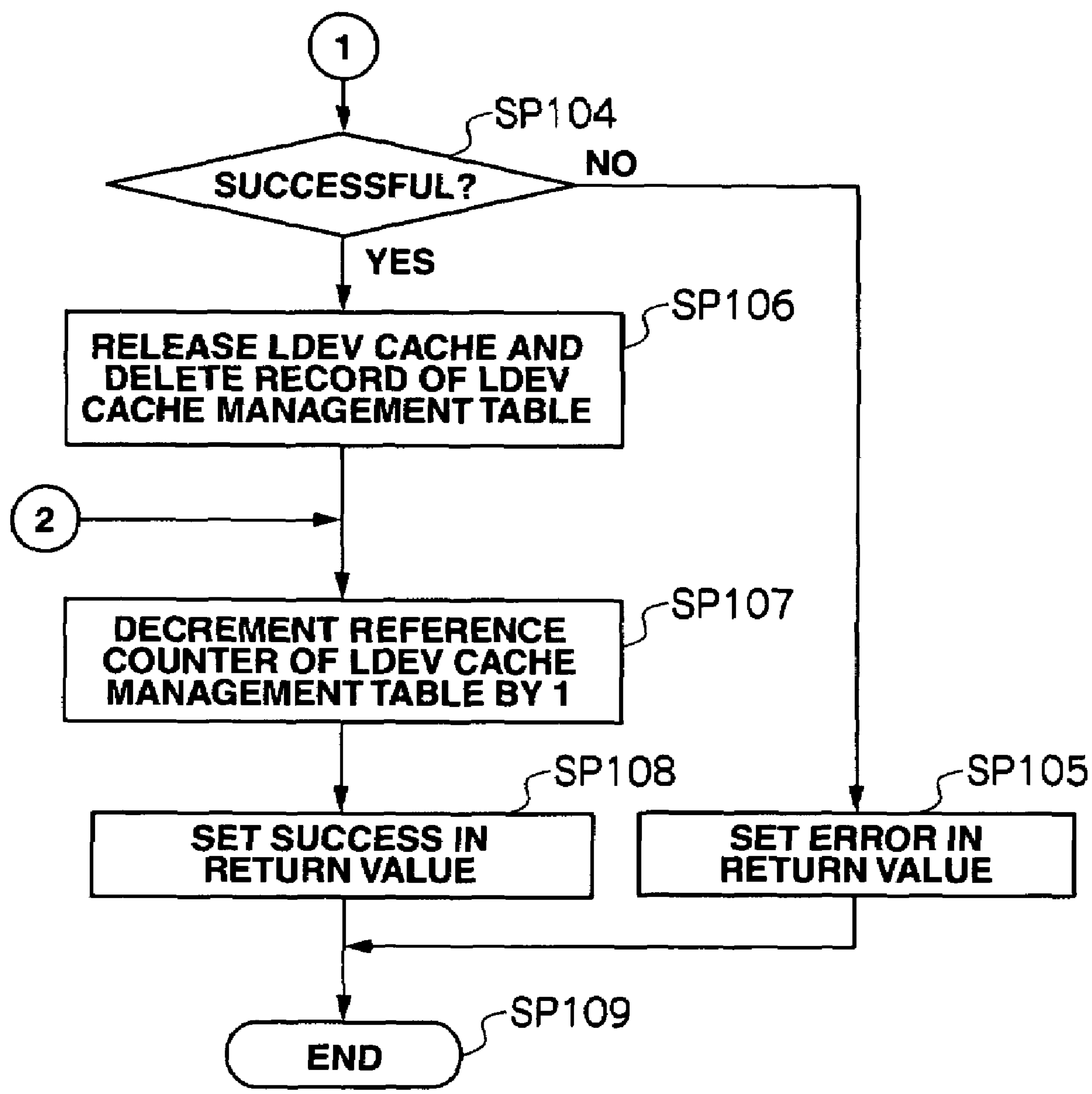
FIG. 17 is a flowchart explaining file close processing.

FIG. 16 and FIG. 17 are flowcharts showing the specific processing contents of file close processing at step SP26 of the file access processing described above with reference to FIG. 12.

When the CPU 11 proceeds to step SP26 of the file access processing, it starts the file close processing (SP90), and foremost processes step SP90 to step SP96 as with step SP50 to step SP56 of the file read processing described above with reference to FIG. 14.

When the CPU 11 obtains a negative result in the determination at step SP94, it sends a response notice in which an error is set in the return value to the application program 20 (SP95), and thereafter ends this file close processing (SP96).

Contrarily, when the CPU 11 obtains a positive result in the determination at step SP94, it specifies a point to the corresponding record in the LDEV mapping table 23 (FIG. 4) from the corresponding "LDEV cache management table record pointer" column 26B of the file descriptor management table 26 (FIG. 7) (SP97).

Subsequently, the CPU 11 reads the counter value stored in the "reference counter" column 24D of the record specified at step SP97 in the LDEV cache management table 24 (FIG. 5), and determines whether such value is "1", or "2 or greater" (SP98).

Here, when the value is "1", this means that the file access to the target file is only from the application program 20 that sent the file close request. Thereby, the CPU 11 executes processing for deleting data of such file from the LDEV cache extent 28 of the file sharing server 3 (step SP99 to step SP103).

Specifically, when the CPU 11 obtains a result that the value is "1" in the determination at step SP98, it reads a file path to the file associated with the record from the corresponding "file path" column 24A of the LDEV cache management table 24 (SP99).

Further, the CPU 11 refers to the corresponding "LDEV mapping table record pointer" column 26C of the file descriptor management table 26 and specifies the corresponding record in the LDEV mapping table 23, and reads the mount path to the file system FS to which the target file belongs from the "mount path" column 23A of such record in the LDEV mapping table 23 (SP100).

The CPU 11 thereafter makes a request (hereinafter referred to as a cache write processing request) to the cache control program 22 to execute cache read processing for reading data of the target file from the LDEV cache extent 28 of the file sharing server 3 and writing such data in the corresponding logical device 46 of the storage apparatus 4 (SP101).

In addition, the CPU 11 creates a full path to the target file by combining the file path of the file acquire at step SP99, and the mount path to the file system FS to which the file acquired at step SP100 belongs, and notifies the created full path to the cache control program 22 (SP102).

When the CPU 11 thereafter receives the processing result of the cache write processing from the cache control program 22 (SP103), it determines whether the cache write processing was successful (SP104). When the CPU 11 obtains a negative result in this determination, it sends a response notice in which an error is set in the return value to the application program 20 (SP105), and thereafter ends this file close processing (SP109).

Contrarily, when the CPU 11 obtains a positive result in this determination, it releases the cache extent 28A (FIG. 3) storing the data of such file in the LDEV cache extent 28 of the file sharing server 3, and deletes the record of such target file from the LDEV cache management table 24 (SP106).

The CPU 11 thereafter decrements the numerical value stored in the "reference counter" column 24D corresponding to the target file in the LDEV cache management table 24 by "1" (SP107). Further, the CPU 11 sends a response notice in which "success" is set in the return value to the application program 20 (SP108), and thereafter ends this file close processing (SP109).

Meanwhile, when the value is "2 or greater" at step SP98, this means that an application program 20 other than the application program 20 that sent the file close request is currently accessing the target file. Thereby, the CPU 11 executes processing for closing the target file without deleting the data of such target file from the LDEV cache extent 28 of the file sharing server 3.

Specifically, when the CPU 11 determines that the value is "2 or greater" in the determination at step SP98, it proceeds to step SP107, thereafter processes step SP107 and step SP108 as with the processing described above, and then ends this file close processing (SP109).

(1-3-3) Specific Processing Contents of CPU Based on Cache Control Program

Figure 18:
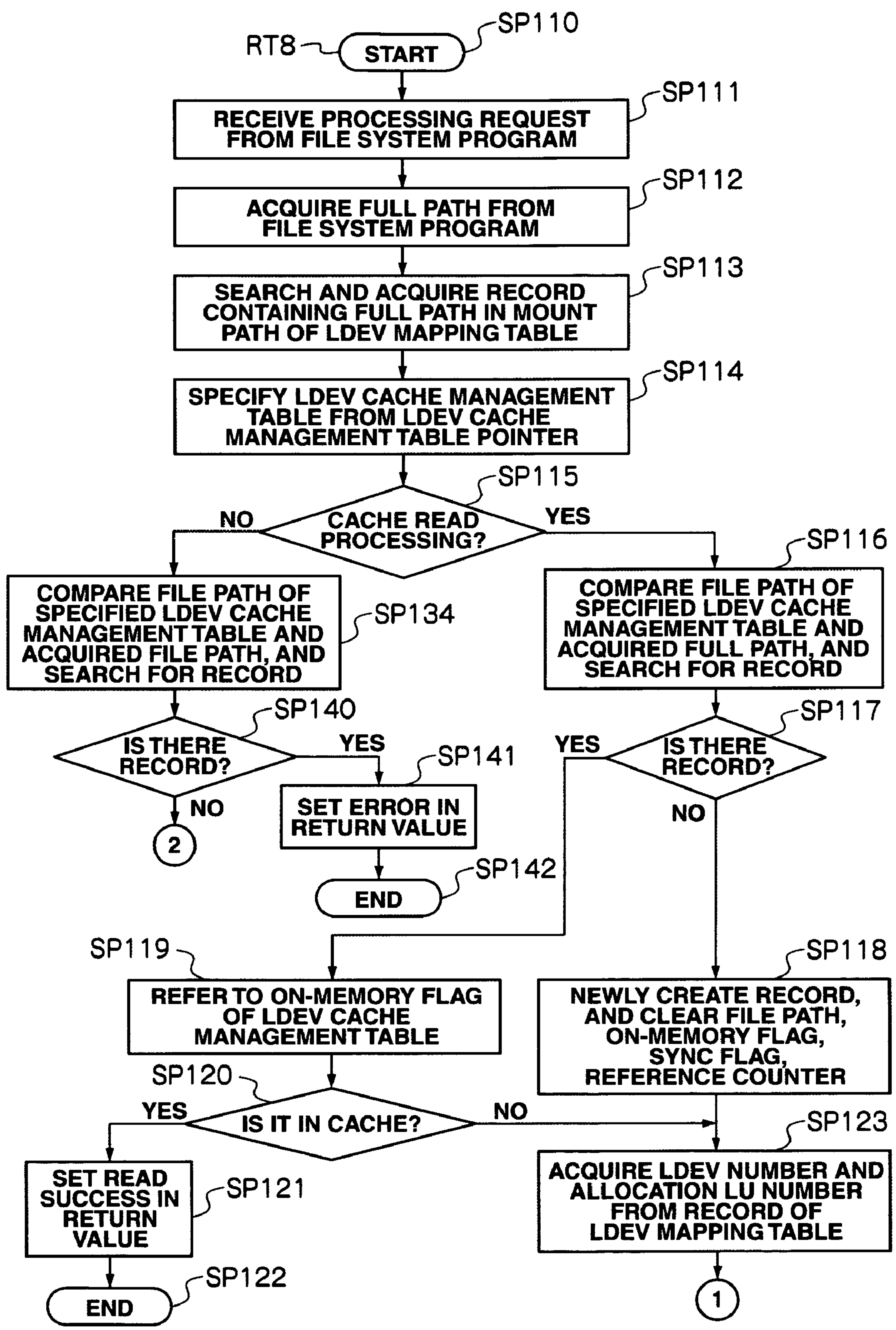
FIG. 18 is a flowchart explaining cache read/write processing.
Figure 19:
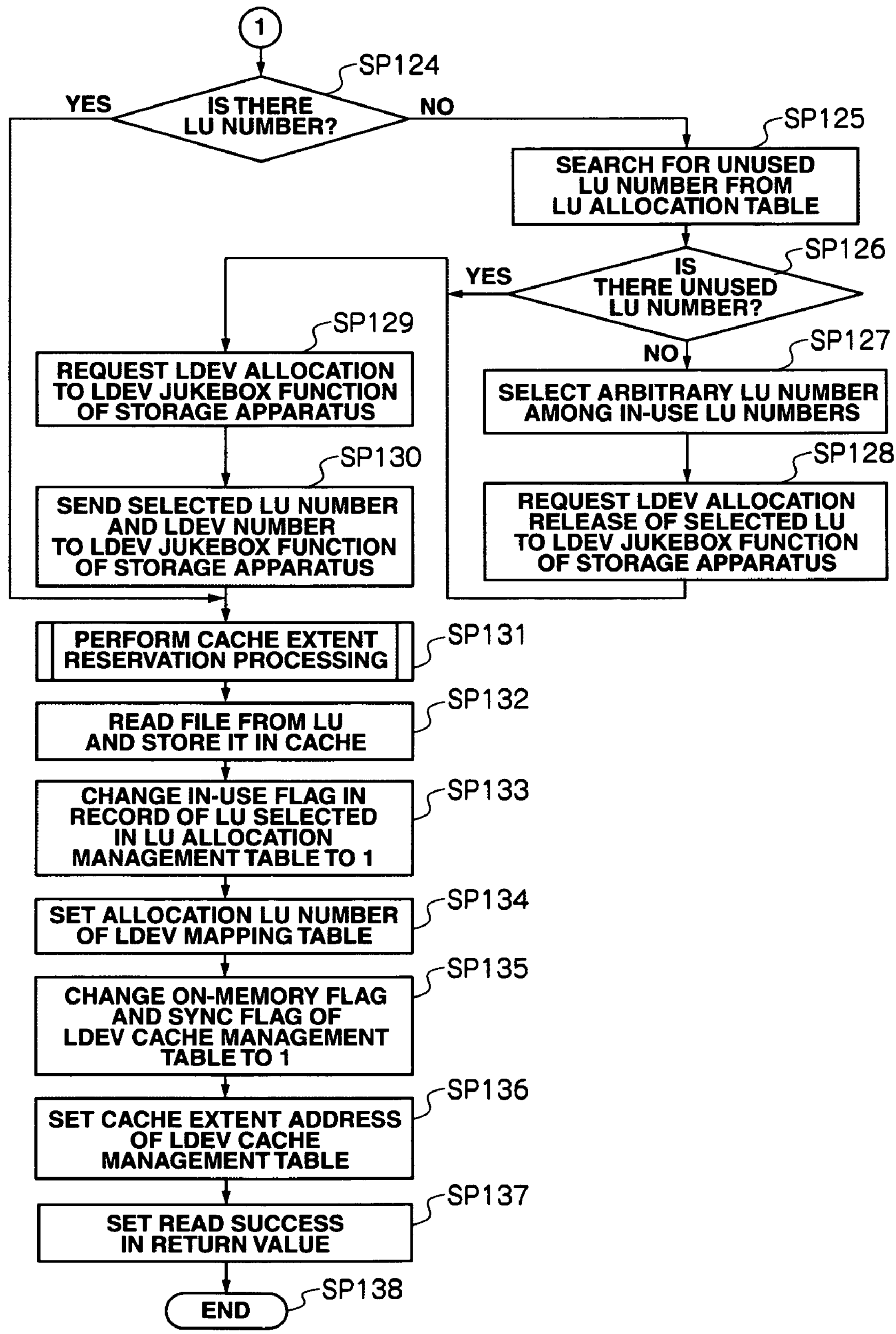
FIG. 19 is a flowchart explaining cache read/write processing.

FIG. 18 to FIG. 20 are flowcharts showing the specific contents of cache read/write processing to be executed by the CPU 11 based on the cache control program 22 according to the cache read processing request issued at step SP40 of the file open processing (FIG. 13) or step SP60 of the file read processing (FIG. 14), or the cache write processing request issued at step SP101 of the file close processing (FIG. 16).

When the cache read processing request or the cache write processing request is issued from the file system program 21 (FIG. 1), the CPU 11 starts the cache read/write processing shown in FIG. 18 to FIG. 20 (SP110), and foremost receives the cache read processing request or the cache write processing request (SP111). The CPU 11 thereafter receives the full path notified from the file system program 21 (SP112).

Then, the CPU 11 searches for a record among the records in the LDEV mapping table 23 in which a mount path that is the same as the mount path portion among the full paths acquired at step SP112 is stored in the "mount path" column 23A (SP113).

Subsequently, the CPU 11 specifies the corresponding LDEV cache management table 24 based on the pointer to the LDEV cache management table 24 stored in the "LDEV cache management table pointer" column 23D of the record detected at step SP113 in the LDEV mapping table 23 (SP114), and thereafter determines whether the processing request received at step SP111 is cache read processing (SP115).

When the CPU 11 obtains a positive result in this determination, it compares the file path stored in the "file path" column 24A of the respective records in the LDEV cache management table 24 specified at step SP114 and the full path to the target file acquired at step SP112, and searches for a record in which a file path that is the same as the file path portion of the full path is stored in the "file path" column 24A (SP116). The CPU 11 thereafter determines whether a record of such file path exists based on the search results (SP116).

Here, to obtain a negative result in this determination means that the data of the target file has never been read into the LDEV cache extent 28 of the file sharing server 3. Thereby, the CPU 11 newly creates a record of such target file in the LDEV cache management table 24. Thereupon, the CPU 11 also respectively stores an initial value ("0") in the "ON memory flag" column 24B, the "Sync flag" column 24C and the "reference counter" column 24D of such record (SP118). The CPU 11 then proceeds to step SP123.

Contrarily, to obtain a positive result in the determination at step SP117 means that the data of the target file has been previously read into the LDEV cache extent 28 of the file sharing server 3. Thereby, the CPU 11 refers to the corresponding "ON memory flag" column 24B of the LDEV cache management table 24, and determines whether such file data is still retained in the LDEV cache extent 28 (SP120).

When the CPU 11 obtains a positive result in this determination, it sends a response notice in which "success" is set in the return value to the application program 20 (SP121), and thereafter ends this cache read/write processing (SP122).

Contrarily, when the CPU 11 obtains a negative result in the determination at step SP120, it executes processing of respectively reading the LDEV number of the corresponding logical device 46 and the LU number of the logical unit 47 allocated with such logical device 46 from the "LDEV number" column 23B and the "allocation LU number" column 23C of the corresponding record of the LDEV mapping table 23 (FIG. 4) (SP123), and further determines whether it was possible to read the LU number of the logical unit 47 (SP124).

To obtain a negative result in this determination means that the logical device 46 storing the data of the target file is not mapped to any logical unit 47. Thereby, the CPU 11 refers to the LU allocation management table 25 (FIG. 6), and searches for an unused logical unit 47 (logical unit 47 in which "1" is not stored in the "in-use flag" column 25B) (SP125). Then the CPU 11 determines whether it was possible to detect an unused logical unit 47 (SP126).

When the CPU 11 obtains a positive result in this determination, it proceeds to step SP129. Contrarily, when the CPU 11 obtains a negative result in the determination at step SP126, it refers to the LU allocation management table 25 and selects an arbitrary logical unit 47 among the logical units 47 in use (SP127). Incidentally, as the method of selecting a logical unit 47 in the foregoing case, it is possible to adopt a method of selecting a logical unit 47 allocated with a logical device 46 storing data of a file system with the lowest access frequency or with the oldest time when it was last accessed.

The CPU 11 thereafter makes a request (hereinafter referred to as an allocation release request) to the foregoing jukebox control program 45 (FIG. 1) for providing a jukebox function in the storage apparatus 4 to release the allocation of the logical device 46 to the logical unit 47 selected at step SP127 (SP128). Thereby, the CPU 42 (FIG. 1) of the storage apparatus 4 will release the allocation of the logical device 46 to the designated logical unit 47 based on the jukebox control program 45 according to the allocation release request.

Subsequently, the CPU 11 requests the storage apparatus 4 to allocate the logical device 46 to the logical unit 47 (SP129). Further, the CPU 11 sends the LU number of an unused logical unit 47 detected in the search at step SP125 (when a positive result is obtained at step SP125) or the LU number of the logical unit 47 selected at step SP127 (when a negative result is obtained at step SP126) to the storage apparatus 4 as the LU number of the target logical unit 47, and further sends the LDEV number of the logical device 46 storing the data of the target file to the storage apparatus 4 as the LDEV number of the logical device 46 to be allocated to the logical unit 47 (SP130). Thereby, the CPU 42 of the storage apparatus 4 executes allocation processing for allocating the logical device 46 to the logical unit 47 based on the jukebox control program 45.

Subsequently, the CPU 11 executes cache extent reservation processing for reserving a cache extent 28A to read data of the target file in the LDEV cache extent 28 of the file sharing server 3 (SP131). By the CPU 11 thereafter accessing the storage apparatus 4, it reads the data of the target file from the corresponding logical device 46, and stores such file data in the cache extent 28A reserved at step SP131 (SP132).

Subsequently, the CPU 11 stores a flag representing that the logical unit 47 is in use in the "in-use flag" column 25B of the LU allocation management table 25 (FIG. 6) corresponding to the unused logical unit 47 that acquired a LU number at step SP125 (when a positive result is obtained at step SP126) or the logical unit 47 selected at step SP127 (when a negative result is obtained at step SP126) (SP133).

Further, the CPU 11 stores the LU number of the logical unit 47 allocated to the logical device 46 in the "allocation LU number" column 23C corresponding to the logical device 46 storing the data of the target file among the "allocation LU number" columns 23C of the LDEV mapping table 23 (FIG. 4) (SP134).

Further, the CPU 11 stores "1" respectively in the corresponding "ON memory flag" column 24B and the "Sync flag" column 24C in the LDEV cache management table 24 (FIG. 5) (SP135), and thereafter stores, in the corresponding "cache extent address" column 24E of the LDEV cache management table 24, the address of the cache extent 28A (FIG. 3) storing the data of the target file in the LDEV cache extent 28 of the file sharing server 3 (SP136).

Further, the CPU 11 sends a response notice in which "success" is set in the return value to the application program 20 (SP137), and thereafter ends this cache read/write processing.

Contrarily, when the CPU 11 obtains a negative result in the determination at step SP115 (FIG. 18), it compares the file path stored in the "file path" column 24A of the respective records in the LDEV cache management table 24 specified at step SP114 and the full path to the target file acquired at step SP112, and searches for a record in which the file path portions of such full path coincide (SP139). The CPU 11 thereafter determines whether there is a record in which the file path portions of such pull path coincide based on the search results (SP140).

When the CPU 11 obtains a negative result in this determination, it sends a response notice in which "error" is set in the return value to the application program 20 (SP141), and thereafter ends this cache read/write processing (SP142).

Contrarily, when the CPU 11 obtains a positive result in this determination, it refers to the "ON memory flag" column 24B corresponding to the logical device 46 storing the target file among the "ON memory flag" columns 24B in the LDEV cache management table 24 (FIG. 5) (SP143), and determines whether the data of such target file is stored in the LDEV cache extent 28 of the file sharing server 3 (SP144).

Here, to obtain a negative result in this determination means that the data of the target file does not exist in the LDEV cache extent 28 even though the data of the target file subject to file open processing has been read into the LDEV cache extent 28 of the file sharing server 3. Thereby, the CPU 11 sends a response notice in which "error" is set in the return value to the response notice (SP145), and thereafter ends this cache read/write processing (SP146).

Contrarily, when the CPU 11 obtains a positive result in this determination, it determines whether "1" is stored in the "Sync flag" column 24C corresponding to the target file in the LDEV cache management table 24 (FIG. 5) (SP147).

Here, to obtain a positive result in this determination means that the data of the target file stored in the LDEV cache extent 28 of the file sharing server 3 and the data of the target file stored in the corresponding logical device 46 of the storage apparatus 4 are the same; that is, the data of such target file has not been updated after the opening of the target file (refer to step SP80 of FIG. 15). Accordingly, in the foregoing case, upon subjecting the target file to close processing, it is not necessary to rewrite the data of the target file stored into the LDEV cache extent 28 in the corresponding storage apparatus 4. Thereby, the CPU 11 sends a response notice in which "success" is set in the return value to the application program 20 (SP148), and thereafter ends this cache read/write processing (SP149).

Contrarily, to obtain a negative result in this determination means that the data of the target file stored in the LDEV cache extent 28 and the data of the target file stored in the corresponding logical device 46 of the storage apparatus 4 are different; that is, the data of such target file has been updated after the opening of the target file (refer to step SP80 of FIG. 15). Accordingly, in the foregoing case, upon subjecting the target file to close processing, it is necessary to rewrite the data of the target file stored in the LDEV cache extent 28 into the corresponding logical device 46 of the storage apparatus 4. Thereby, the CPU 11 reads the LDEV number of the logical device 46 to rewrite the target file from the corresponding "LDEV number" column 23B and "allocation LU number" column 23C in the LDEV mapping table 23, and the LU number of the logical unit 47 allocated to such logical device 46 (SP150).

The CPU 11 thereafter determines whether it was possible to acquire the LU number of the corresponding logical unit 47 based on the processing at step SP150; that is, whether the LU number of any logical unit 47 is stored in the corresponding "allocation LU number" column 23C of the LDEV mapping table 23 (SP151).

To obtain a positive result in this determination means that one of the logical units 47 is allocated to the logical device 46 storing the data of the target file. Thereby, the CPU 11 proceeds to step SP158.

Contrarily, to obtain a negative result in this determination means that the logical device 46 storing the data of the target file is not allocated to any logical unit 47. Thereby, the CPU 11 executes processing for acquiring the LU number of an unused logical unit 47 from the LU allocation management table 25 (FIG. 6) (SP152), and thereafter determines whether the LU number of the unused logical unit 47 has been acquired at step SP152 (whether there is an unused logical unit 47) (SP153).

When the CPU 11 obtains a positive result in this determination, it proceeds to step SP156. When the CPU 11 obtains a negative result in this determination, it refers to the LU allocation management table 25 (FIG. 6), selects one logical unit 47 among the logical units 47 currently in use (SP154), and thereafter requests the storage apparatus 4 to release the allocation of the logical device 46 to the logical unit 47 (SP155).

Further, the CPU 11 requests the storage apparatus 4 to allocate the logical device 46 to the logical unit 47 (SP156). Moreover, the CPU 11 sends the LU number of the logical unit 47 acquired from the LU allocation management table 25 (when a positive result is obtained at step SP151) or selected at step SP154 (when a negative result is obtained at step SP151) and the LDEV number of the logical device 46 storing the data of the target file to the storage apparatus 4 (SP157). Thereby, the CPU 42 (FIG. 1) of the storage apparatus 4 executes switch processing of the logical device so as to allocate the logical unit 47 to the logical device 46 based on the jukebox control program 45.

The CPU 11 thereafter reads an address of the block storing the data of the target file in the LDEV cache extent 28 from the corresponding "cache extent address" column 24E of the LDEV cache management table 24 (FIG. 5) (SP158). Further, based on the address read as described above, the CPU 11 reads the data of the target file from the LDEV cache extent 28 and rewrites such data in the corresponding logical device 46 by transferring it to the storage apparatus 4 (SP159).

Subsequently, the CPU 11 sets "1" in the corresponding "Sync flag" column 24C of the LDEV cache management table 24 (SP159). The CPU 11 thereafter sends a response notice in which "success" is set in the return value to the application program 20 (SP160), and then ends this cache read/write processing (SP161).

Figure 21:
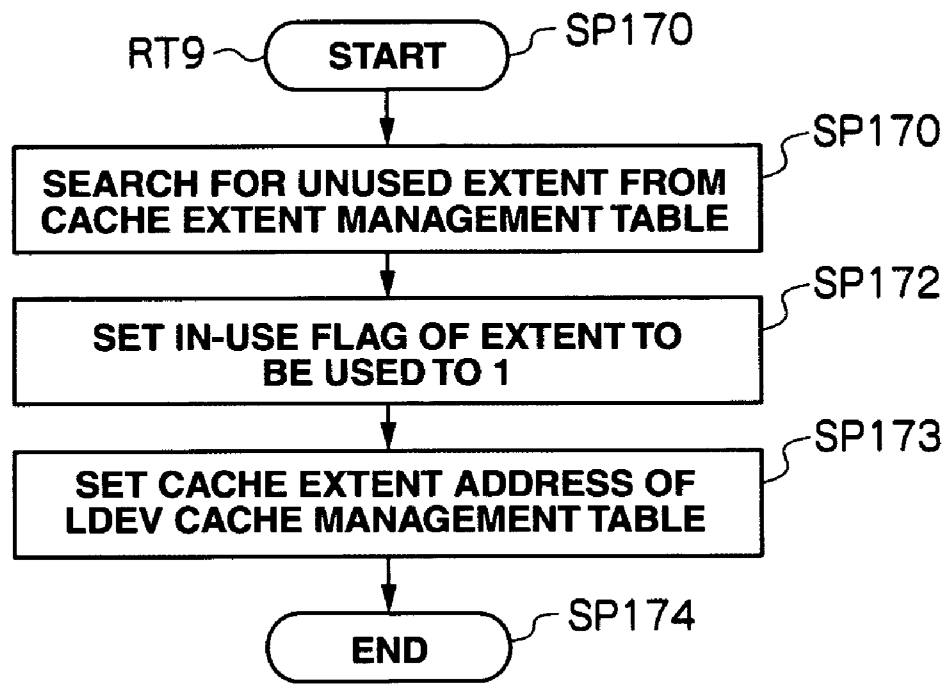
FIG. 21 is a flowchart explaining cache extent reservation processing.

Incidentally, FIG. 21 shows the specific contents of the cache extent reservation processing at step SP131 (FIG. 19) of the cache read/write processing.

When the CPU 11 proceeds to step SP131 of the cache read/write processing, it starts the cache extent reservation processing shown in FIG. 21, and foremost refers to the cache extent management table 27 (FIG. 8), and searches for and selects an unused block for storing the data of the target file (SP171).

Subsequently, the CPU 11 sets "1" in the "in-use flag" column of the unused block selected at step SP171 in the cache extent management table 27 (SP172).

Then, the CPU 11 stores the address of the block selected at step SP171 in the corresponding "cache extent address" column 24E of the LDEV cache management table 24 (FIG. 5) (SP173), and thereafter ends this cache extent reservation processing (SP174).

(1-4) Sequential Flow Concerning Opening of File

FIG. 22 shows the flow of sequential processing among the application program 20, the file system program 21, the cache control program 22 and the storage apparatus 3 during the various processing routines described above; in particular the file open processing in the file sharing server 3.

Foremost, when a processing request is given from the file access client 2 (FIG. 1) to the file sharing server 3, the corresponding application program 20 in the file sharing server 3 gives a corresponding file open request to the file system program 21 (SP180). In addition, the application program 20 gives the full path to the target file to be opened to the file system program 21 (SP181).

When the file system program 21 receives the file open request and the full path, it executes the file open processing for opening the designated file (target file), processing for searching the LDEV cache management table 24 and determining whether the data of such target file is retained in the LDEV cache extent 28 of the file sharing server 3, and so on (SP182). Further, the file system program 21 thereafter sends a cache read request to the cache control program 22 (SP183).

When the cache control program 22 receives a cache read request, it sends a LDEV switch request to the storage apparatus 4 so as to allocate any logical unit 47 to the logical device 46 if the data of the target file does not exist in the LDEV cache extent 28, and the logical unit 47 is not allocated to any logical device 46 storing the data of such target file (SP184).

When the storage apparatus 4 receives the LDEV switch request, it executes switch processing of the logical device 46 to be allocated to the logical unit 47 so that the designated logical device 46 is allocated to the logical unit 47 (SP185), and thereafter notifies the allocation result to the cache control program 22 (SP186).

The cache control program 22 that received the foregoing notice reads the data of the target file based on the notice into the LDEV cache extent 28 of the file sharing server 3 (SP187), and notifies the processing result of the cache read processing to the file system program 21 (SP188).

Further, the file system program 21 that received this notice updates each of the corresponding tables of the LDEV cache management table 24 based on the notice, numbers the file descriptor to the file (SP189), and sends the file descriptor to the corresponding application program 20 (SP190).

(1-5) Configuration Routine of User Concerning LDEV Switch Control Function

Figure 23:
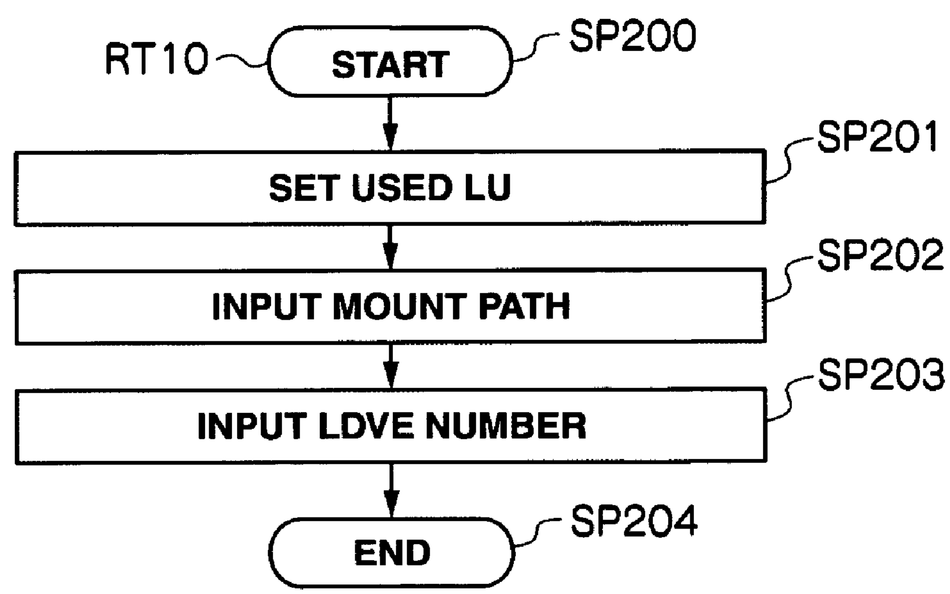
FIG. 23 is a flowchart showing the various settings to be performed by a system administrator concerning the LDEV switch control function.

FIG. 23 is a flowchart showing the routine of various settings to be performed by the system administrator using the management device 5 (FIG. 1) with respect to the LDEV switch control function according to the present invention as described above.

The system administrator foremost sets a logical unit 47 among the logical units 47 set in the storage apparatus 4 to be used in relation to the LDEV switch control function according to the present embodiment (SP201). Thereby, the LU allocation management table 25 described with reference to FIG. 6 is created based on this setting.

Subsequently, the system administrator respectively inputs the mount path to the file system FS to be mounted among the file systems FS created in the storage apparatus 4 (SP202). Thereby, the corresponding mount path is stored in the respective "mount path" columns 23A of the LDEV mapping table 23 described above with reference to FIG. 4 based on this input.

The system administrator thereafter inputs the identification number of the logical device 46 associated with the respective file systems in which the mount path was input at step SP202 (SP203). Thereby, the corresponding identification number is stored in the respective "LDEV number" columns 23B of the LDEV mapping table 23 described above with reference to FIG. 4 based on this input.

(1-6) Effect of Present Embodiment

As described above, with the computer system 1 according to the present embodiment, the target file is read into the LDEV cache extent 28 of the file sharing server 3 according to the file open request from the file access client 2, and access to the file is thereafter made to the data retained in the LDEV cache extent 28.

Accordingly, with this computer system 1, it is possible to reduce the number of switchings of the logical device 46 to be allocated to the logical unit 47 based on the LDEV jukebox function in the storage apparatus 4, and reduce the overhead during the switching of such logical device 46. It is thereby possible to prevent the deterioration in the reading/writing performance of data caused by the frequent occurrence of switch processing of the logical device 46.

Moreover, with the computer system 1 according to the present embodiment, since the switching of the logical device 46 to be allocated to the logical unit 47 is performed with the file system program 21, the application program 20 is able to access the file with the same access method as a standard file access without having to be aware of the switching of the logical device 46. It is thereby possible to apply a standard application program 20 instead of an exclusive program as the application program 20 to improve versatility.

(2) Second Embodiment (2-1) Configuration of Computer System in Present Embodiment FIG. 1 shows a computer 60 according to the second embodiment. The computer system 60 is configured the same as the computer system 1 according to the first embodiment other than that the timing of creating the LDEV cache extent 61 is different.

In other words, whereas the first embodiment created the LDEV cache extent 28 to be shared by all file systems FS during the activation of the file sharing server 3 (refer to FIG. 11), the present embodiment is characterized in that it creates or deletes the LDEV cache extent 61 for each file system FS in the timing of mounting or unmounting the file system FS on or from the file sharing server 3.

Accordingly, in the case of the present embodiment, the cache extent creation processing described above with reference to FIG. 11 is not performed at the activation of the file sharing server 3, and, instead, processing for creating a LDEV cache extent 61 exclusive to the file system FS in the memory 12 of the file sharing server or deleting the corresponding LDEV cache extent 61 created in the memory each time the file system FS is mounted on or unmounted from the file sharing server 3.

Figure 24:
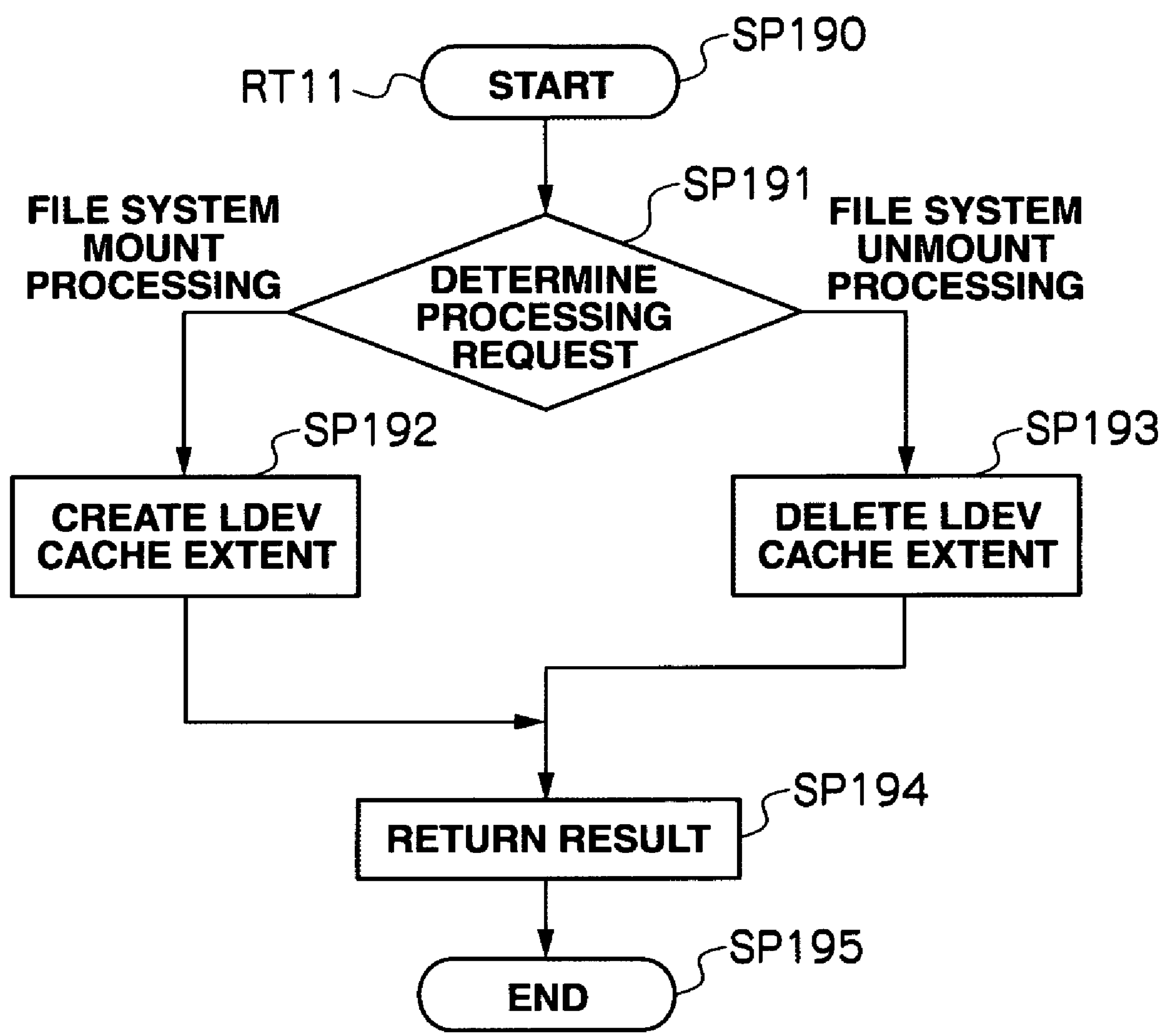
FIG. 24 is a flowchart showing the specific processing contents of LDEV cache extent create/delete processing according to another embodiment of the present invention.

FIG. 24 is a flowchart showing the specific processing contents of the LDEV cache extent create/delete processing according the second embodiment.

Each time the CPU 11 receives a processing request (hereinafter referred to as a file system mount/unmount processing request) for mounting or unmounting the file system FS input based on the operation of the management device 5, it executes the LDEV cache extent create/delete processing shown in FIG. 24 based on the file system program 62 (FIG. 1) according to the second embodiment stored in the memory 12.

In other words, when the CPU 11 receives the file system mount/unmount processing request, it starts the LDEV cache extent create/delete processing (SP190), and foremost determines whether the received file system mount/unmount processing request is for mount processing or unmount processing of the file system FS (SP191).

When the CPU 11 determines that the received file system mount/unmount processing request is a request for mount processing of the file system FS, it creates a LDEV cache extent 61 of a prescribed capacity exclusive to the file system FS in the memory 12 of the file sharing server 3, and creates a cache extent management table 27 (FIG. 8) exclusive to such file system FS (SP192). Accordingly, in the case of this second embodiment, a cache extent management table 27 is created for each file system FS (logical device 46). The CPU 11 thereafter sends a response notice to the effect that the LDEV cache extent 61 has been created to the application program 20 (SP194), and then ends this LDEV cache extent create/delete processing (SP1195).

Contrarily, when the CPU 11 determines that the received file system mount/unmount processing request is a request for unmount processing of the file system at step SP191, it abandons the LDEV cache extent 61 created exclusively for the file system FS to be unmounted in the memory 12 of the file sharing server 3, and abandons the cache extent management table 27 (FIG. 8) corresponding the LDEV cache extent 61 (SP193). The CPU 11 thereafter sends a response notice to the effect that the LDEV cache extent 61 has been abandoned to the application program 20 (SP194), and then ends this LDEV cache extent create/delete processing (SP195).

Figure 25:
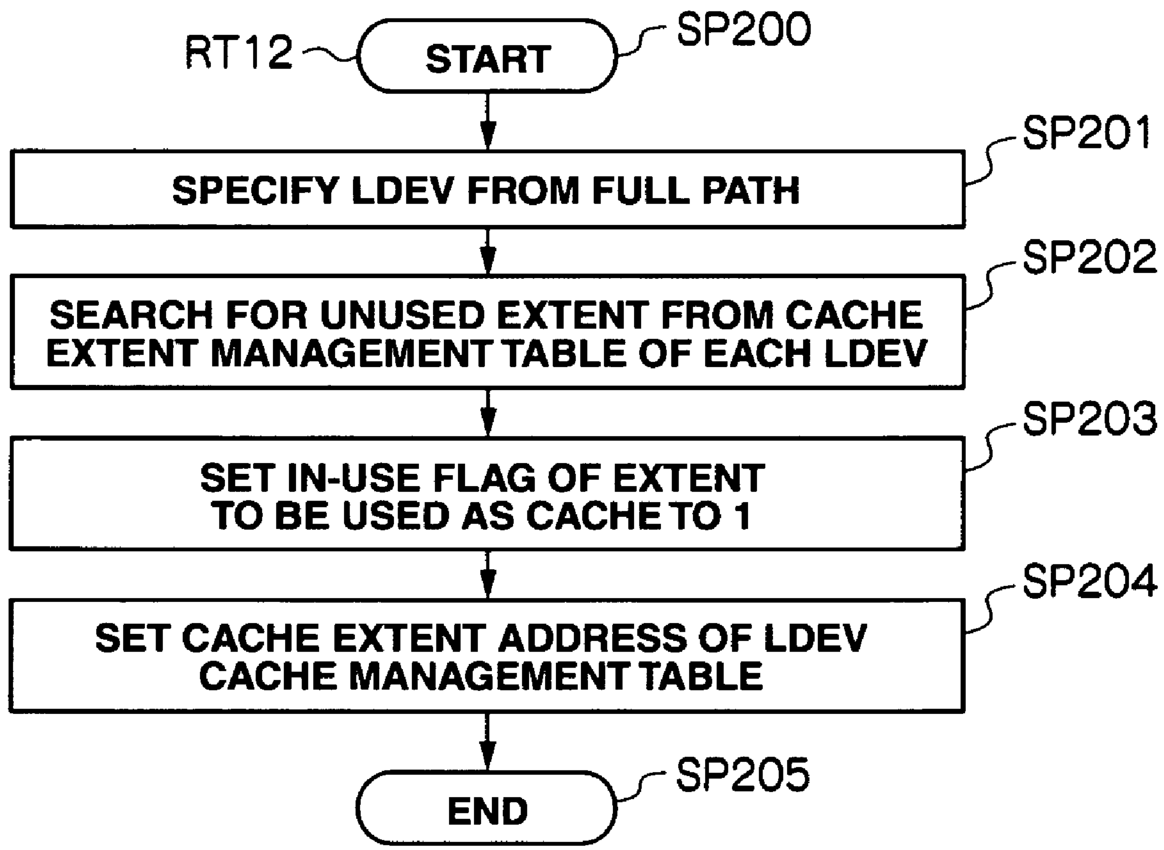
FIG. 25 is a flowchart explaining cache extent reservation processing according to another embodiment of the present invention.

Meanwhile, FIG. 25 is a flowchart showing the specific processing contents of cache extent reservation processing according to the second embodiment that is performed at step SP131 (FIG. 19) of the cache read/write processing described above with reference to FIG. 18 to FIG. 20 based on the file system program 62 according to the second embodiment in substitute for the cache extent reservation processing according to the first embodiment described above with reference to FIG. 21.

When the CPU 11 proceeds to step SP131 of the cache read/write processing, it starts the cache extent reservation processing shown in FIG. 25, foremost specifies the corresponding logical device 46 (file system FS) based on the full path to the target file acquired at step SP112 (FIG. 18) (SP201), thereafter refers to the cache extent management table 27 corresponding to the logical device 46 (file system FS), and searches and detects the unused cache extent (block) among the LDEV cache extents 61 allocated to the file system FS (SP202).

When the CPU 11 detects the unused cache extent, it stores "1" in the "in-use flag" column 27B corresponding to the cache extent in the cache extent management table 27 (SP203). Further, the CPU 11 stores the address of the cache extent storing "1" in the "in-use flag" column 27B at step SP203 in the corresponding "cache extent address" column 24E of the LDEV cache management table 24 (FIG. 5) corresponding to the logical device 46 (file system FS) (SP204), and thereafter ends this cache extent reservation processing (SP205).

(2-2) Effect of Present Embodiment

As described above, with the computer system 50 according to the present embodiment, the LDEV cache extent 61 for each file system FS is created or deleted in the timing of mounting or unmounting the file system FS on or from the file sharing server 3.

In the foregoing case, for instance, if the method of creating the LDEV cache extent 28 to be shared with all file systems FS in the memory 12 of the file sharing server 3 as in the first embodiment is adopted, when numerous access occurs in a certain file system FS, there is a possibility that the cache extent available to a separate file system FS will become tight and cause problems.

Nevertheless, according to the method of creating the LDEV cache extent 61 according to the present embodiment, since the respective file system FS will only use the LDEV cache extent 61 that is allocated to itself in advance, even when once file system FS is accessed frequently, other file systems FS will not be affected, and will be able to use the LDEV cache extent 61 allocated to itself. Thus, according to the present embodiment, since the respective file systems FS will use a LDEV cache extent 61 constantly of a given quantity, there is no fear of any problems occurring, and it is possible to create a highly reliable computer system.

(3) Third Embodiment (3-1) Configuration of Computer System in Present Embodiment FIG. 1 shows a computer system 65 according to the third embodiment. The computer system 65 is configured the same as the computer system 1 according to the first embodiment other than that all file data retained in the LDEV cache extent 28 provided in the memory 12 of the file sharing server 3 are written periodically in the storage apparatus 3.

In other words, whereas the first embodiment writes data of the respective files retained in the LDEV cache extent 28 into the storage apparatus 4 at the timing of file close processing (refer to SP159 of FIG. 20), the present embodiment is characterized in that data of all files retained in the LDEV cache extent 28 is periodically written into the corresponding logical device 46 of the storage apparatus 4 in addition to the foregoing timing.

Figure 26:
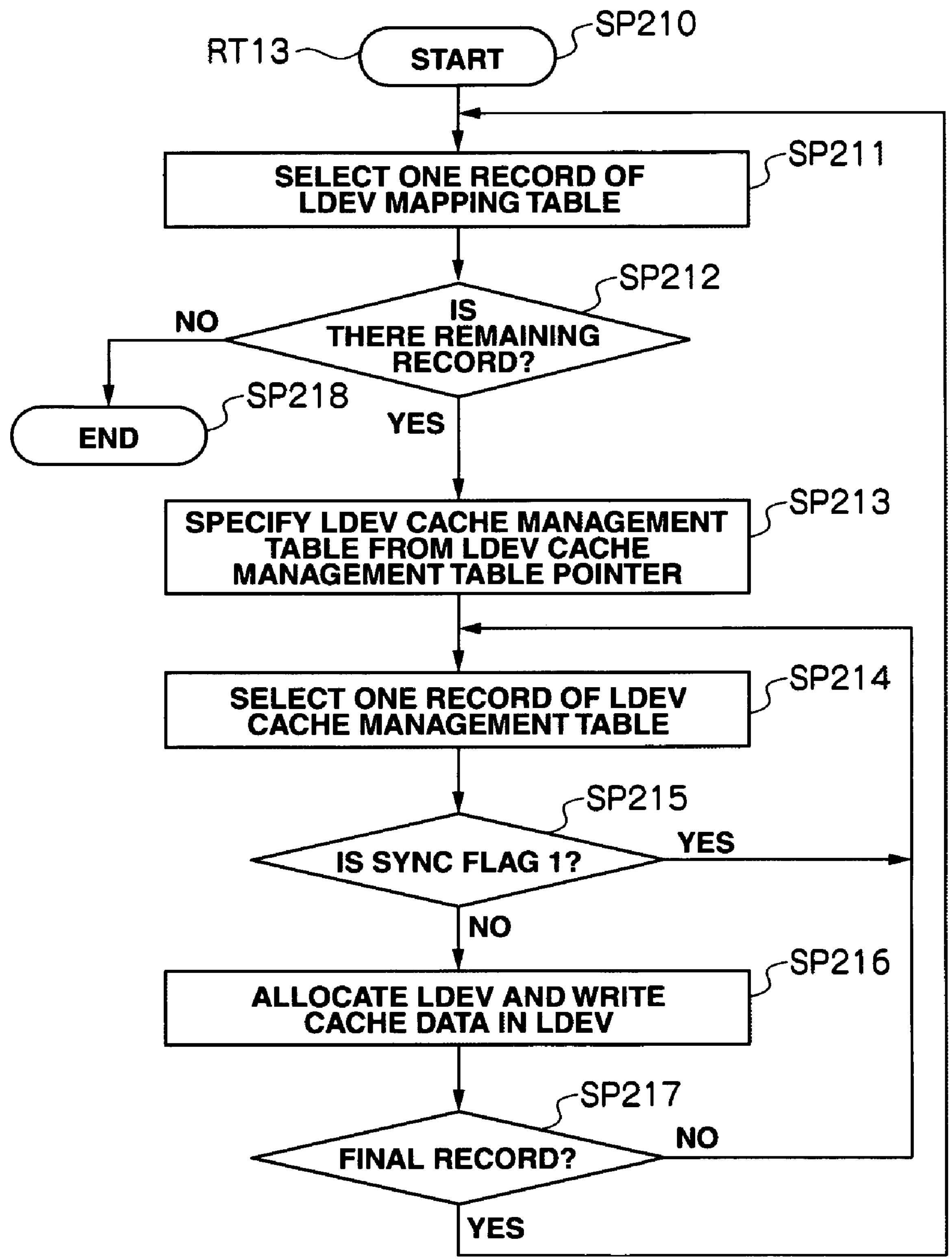
FIG. 26 is a flowchart explaining the entire cache data write processing.

FIG. 26 is a flowchart showing the specific processing contents of write processing (hereinafter referred to as entire cache data write processing) of writing file data retained in the LDEV cache extent 28 into the storage apparatus 4. The CPU 11, based on the cache control program 66 according to the second embodiment, executes the entire cache data write processing shown in FIG. 26 according to an interrupt signal that is given temporarily from a timer not shown in the file sharing server 3.

In other words, when the CPU 11 receives this interrupt signal, it starts the entire cache data write processing, and foremost selects one record of the LDEV mapping table 23 (FIG. 4) (SP211). Subsequently, the CPU 11 determines whether a record can be selected at step SP211 (SP212).

To obtain a positive result in this determination means that there is no record (file system FS) that has not been subject to the processing described later with reference to step SP213 to step SP217; that is, processing of step SP213 to step SP217 has been performed to all records of the LDEV mapping table 23. Thereby, the CPU 11 ends this entire cache data write processing (SP218).

Contrarily, when the CPU 11 obtains a negative result in this determination, it refers to the "LDEV cache management table pointer" column 23D of the record selected at step SP211 in the LDEV mapping table 23, specifies the LDEV cache management table 24 (FIG. 5) corresponding to the record (SP213), and thereafter selects one record among the records recorded in the LDEV cache management table 24 (SP214).

The CPU 11 thereafter refers to the "Sync flag" column 24C of the record selected at step SP214 in the LDEV cache management table 24, and determines whether "1" is stored in the "Sync flag" column 24C (SP215).

Here, to obtain a positive result in this determination means that the data of the file stored in the memory 12 of the file sharing server 3 and the data of the file stored in the corresponding logical device 46 of the storage apparatus 4 coincide (are in sync) in relation to the file corresponding to the target record. Thereby, the CPU 11 returns to step SP214 and selects a subsequent record from the same LDEV cache management table 24.

Contrarily, to obtain a negative result in the determination at step SP215 means that the data of the file stored in the memory 12 of the file sharing server 3 and the data of the file stored in the corresponding logical device 46 of the storage apparatus 4 do not coincide (are not in sync) in relation to the file corresponding to the target record. Thereby, the CPU 11 writes the data of the file stored in the LDEV cache extent 28 of the memory 12 with the same routine as the routine described above with reference to step SP150 to step SP159 of FIG. 20 in the corresponding logical device 46 of the storage apparatus 4 (SP216).

The CPU 11 thereafter determines whether the target record is the final record in the LDEV cache management table 24 specified at step SP217 (SP217). The CPU 11 returns to step SP124 upon obtaining a negative result in this determination and returns to step SP211 upon obtaining a positive result in this determination, and thereafter repeats the same processing until it obtains a negative result at step SP212.

(3-2) Effect of Present Embodiment

As described above, with the computer system 65 according to the present embodiment, since the data of the respective files retained in the LDEV cache extent 28 of the memory in the file sharing server 3 is periodically written in the corresponding logical device 46 of the storage apparatus 4 in addition to the timing of performing file close processing, it is possible to shorten the time that the file data stored in the LDEV cache extent 28 and the corresponding file data in the storage apparatus 4 are inconsistent, reduce the risk of data loss caused by a failure, and improve disaster tolerance.

(4) Fourth Embodiment (4-1) Configuration of Computer System in Fourth Embodiment FIG. 1 shows a computer system 70 according to the fourth embodiment. The computer system 70 is configured the same as the computer system 1 according to the first embodiment other than that it is able to handle the situation in a case when there is no available LDEV cache extent 28 that was reserved in the memory 12 of the file sharing server 3 upon the file write processing.

In other words, the first embodiment was based on a premise that the cache extent 28A (FIG. 3) for storing data of the file corresponding to the LDEV cache extent 28 could be definitely reserved in the LDEV cache extent 28 upon the file write processing.

Nevertheless, capacity of the memory 12 in the file sharing server 3 is limited. Thus, when numerous files are opened, the remaining capacity of the LDEV cache extent 28 will become tight, and there may be cases where, during the subsequent opening of a new file, it will not be possible to reserve the cache extent 28A for such new file (it will not be possible to allocate the cache extent 28A to such file) in the cache extent reservation processing described above with reference to FIG. 21.

Thus, with the computer system 70 according to the fourth embodiment, when the remaining capacity capable of allocating the cache extent 28A to the target file upon the file write processing does not exist in the LDEV cache extent 28, a cache extent 28A that is allocated to an unused file in the same file system FS is released, and data of the file to be written is stored in such cache extent 28A.

FIG. 27 is a flowchart showing the specific processing contents of file write processing in the computer system 70 according to the fourth embodiment. When the CPU 11 is given a file write request from the file system program 21, it writes data of the corresponding file in the LDEV cache extent 28 provided in the memory 12 of the file sharing server 3 according to the routine shown in FIG. 27 based on the cache control program 71 (FIG. 1) according to the fourth embodiment.

In other words, when the CPU 11 is given a file write request from the file system program 21, it starts the file write processing (SP220), and processes step SP221 to step SP228 as with step SP71 to step SP78 of the file write processing according to the first embodiment described above with reference to FIG. 15.

The CPU 11 thereafter determines whether it was possible to acquire an address from the corresponding "cache extent address" column 24E of the LDEV cache management table 24 at step SP228; that is, whether the cache extent 28A in the LDEV cache extent 28 is allocated to the file to be written (SP229), and proceeds to step SP232 upon obtaining a positive result. Then, the CPU 11 process step SP232 to step SP234 as with step SP79 to step SP81 of the file write processing of the first embodiment, and thereafter ends this file write processing (SP235).

Contrarily, when the CPU 11 obtains a negative result in the determination at step SP229, it executes cache extent reservation processing of releasing the cache extent 28A in the LDEV cache extent 28 allocated to an unused file in the same file system FS and reserving a cache extent 28A for the file to be written (SP230).

Subsequently, the CPU 11 reads data of the corresponding file from the corresponding logical device 46 of the storage apparatus 4 (SP231), then processes step SP232 to step SP234 as with step SP79 to step SP81 of the file write processing of the first embodiment, and thereafter ends this file write processing.

Figure 28:
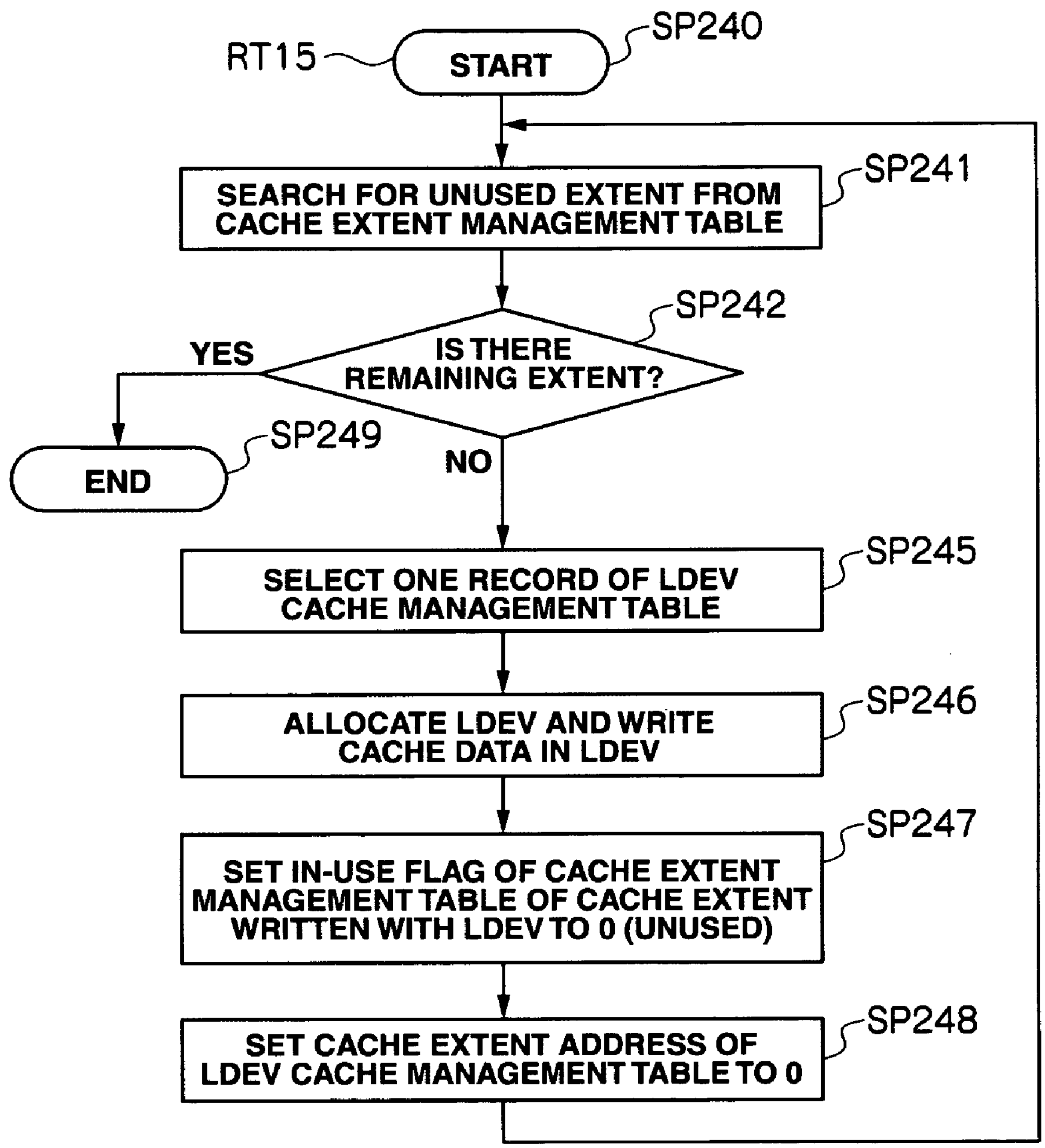
FIG. 28 is a flowchart explaining cache extent reservation processing according to another embodiment of the present invention.

Here, FIG. 28 is a flowchart showing the specific processing contents of step SP230 of the file write processing according to the fourth embodiment.

When the CPU 11 proceeds to step SP230 of the file write processing, it starts the cache extent reservation processing shown in FIG. 28, and foremost refers to the cache extent management table 27 (FIG. 8) and searches for an unused cache extent 28A (SP241).

When the CPU 11 is not able to detect an unused cache extent 28A in this search, it selects one record corresponding to a file with the lowest access frequency or a file with the oldest access time among the records of the LDEV cache management table 24 (FIG. 5) associated with the file system FS to which the file to be written belongs (SP245).

Subsequently, the CPU 11 writes data of the file corresponding to the record stored in the LDEV cache extent 28 into the corresponding logical device 46 in the storage apparatus 4 with the same routine as the routine described above with reference to step SP150 to step SP159 of FIG. 20 (SP246).

Further, the CPU 11 thereafter stores "0" in the "in-use flag" column 27B corresponding to the cache extent 28A (block) storing the data of the file in the cache extent management table 27 (FIG. 8) (SP247). Then, the CPU 11 stores "0" in the "cache extent address" column 24E of the record corresponding to the file in the corresponding LDEV cache management table 24 representing that there is no allocated cache extent 28A (SP248), and thereafter returns to step SP242.

Next, the CPU 11 repeats the processing of step S241P to step SP248 as necessary, and ends this cache extent reservation processing when it eventually obtains a positive result at step SP242.

(4-2) Effect of Present Embodiment

As described above, with the computer system 70 according to the present embodiment, when the remaining capacity capable of allocating the cache extent 28A to the target file upon the file write processing does not exist in the LDEV cache extent 28, the cache extent 28A allocated to an unused file is released, and data of the file to be written is stored in such cache extent 28A. Thus, it is possible to reliably prevent a situation where a cache extent 28A cannot be allocated upon the opening of a new file, and create a highly reliable computer system.

(5) Fifth Embodiment (5-1) Configuration of Computer System in Fifth Embodiment

FIG. 29 which has the same reference numerals for the components corresponding to those illustrated in FIG. 1 shows a computer system 80 according to the fifth embodiment. The computer system 80 is configured the same as the computer system 1 according to the first embodiment other than that the unit of file data retained in the LDEV cache extent 28 of the file sharing server configuring the storage system 86 is different.

In other words, whereas the computer system 1 according to the first embodiment adopted a method of retaining file data in the LDEV cache extent 28 of the file sharing server 3 in file units, the computer system 80 according to the present embodiment retains file data in the LDEV cache extent 28 of the file sharing server 81 in the foregoing block units, which is a management unit of the storage extent in the storage apparatus 4.

In the present embodiment, as means for managing the file data in the LDEV cache extent 28 of the file sharing server 81 in block units, a LDEV mapping table 23, a LDEV cache management table 82, a LU allocation management table 25, a file descriptor management table 83 and a cache extent management table 27 are stored in the memory 12 of the file sharing server 81.

Among the above, the LDEV mapping table 23, the LU allocation management table 25 and the cache extent management table 27 are the same as those described in the first embodiment, and the explanation thereof is omitted.

Meanwhile, the LDEV cache management table 82 is a table that is used for managing data stored in the corresponding logical device 46 of the storage apparatus 4 in block units as the basic unit of the storage extent provided by such logical device 46, and is created for each logical device 46 (for each file system FS).

The LDEV cache management table 82, as shown in FIG. 30, is configured from a "block number" column 82A, an "ON memory flag" column 82B, a "Sync flag" column 82C, a "reference counter" column 82D and a "cache extent address" column 82E. Among the above, the "ON memory flag" column 82B, the "Sync flag" column 82C and the "reference counter" column 82D store the same data as the data stored in the "ON memory flag" column 24B, the "Sync flag" column 24C and the "reference counter" column 24D of the LDEV cache management table 24 according to the first embodiment described above with reference to FIG. 5.

Further, the "block number" column 82A stores the block number of the respective blocks in each of the logical devices 46 corresponding to the record. Moreover, the "cache extent address" column 82E stores an address in the LDEV cache extent 28 of the file sharing server 81 storing data that is stored in the block. Incidentally, in the present embodiment, let it be assumed that the block as the fundamental unit of the storage extent provided by the logical device 46 and the block as the fundamental unit of the LDEV cache extent 28 are set to be the same size.

Accordingly, in the example shown in FIG. 30, among the storage extents provided by a certain logical device 46 in the storage apparatus 4, file data stored in the block having a block number of "1" is currently being read into the block where the address in the LDEV cache extent 28 is "0xF224", but the data stored in such block is not in sync with the data stored in the corresponding block of the logical device 46, and three application programs 20 are currently referring to the data stored in such block of the LDEV cache extent 28.

Meanwhile, the file descriptor management table 83 is a table to be created by the file system program 21 (FIG. 1) when the application program loaded in the file sharing server 81 is activated, and is used for managing the file descriptor (identification number) to be allocated by the file system program 21 upon the application program 20 opening the file.

The file descriptor management table 83, as shown in FIG. 31, is configured from a "file descriptor" column 83A, a "LDEV number" column 83B, a "used flag" column 83C and an "node pointer" column 84D. Among the above, the "LDEV" column 83B and the "used flag" column 83C store the same data as the data stored in the "file descriptor" column 26A and the "used flag" column 26D of the file descriptor management table 26 according to the first embodiment described above with reference to FIG. 26.

Further, the "LDEV number" column 83B stores an identification number (LDEV number) of the logical device 46 in the storage apparatus 4 storing the corresponding data, and the "inode pointer" column 83D stores a pointer to an inode of the corresponding file system FS read into the memory 12 of the file sharing server 81 as described later.

Figure 32:
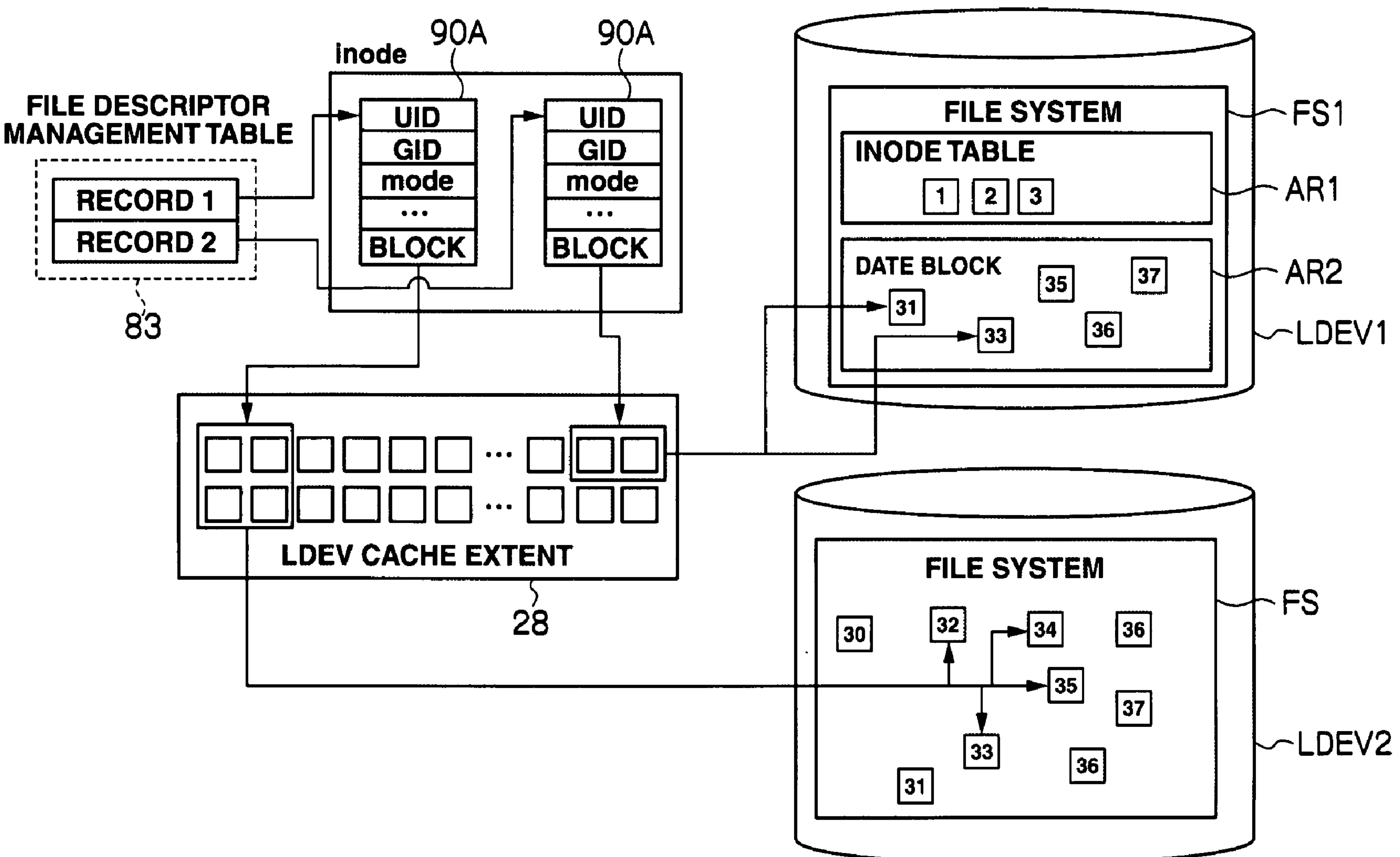
FIG. 32 is a conceptual diagram explaining an LDEV switch control function according to another embodiment of the present invention.

FIG. 32 shows the outline of the management method of file data in the computer system 80 according to the present embodiment. In the computer system 80, the respective records of the file descriptor management table 83 comprise a pointer to the corresponding inodes 90A, 90B.

Inodes 90A, 90B are management information of the file to be created for each file, and is configured from a user ID ("UID (User ID)") of a user in possession of such file, a group ID ("GID (Group ID)") of such file, a block address ("BLOCK") in the logical device 46 storing the file access mode ("mode") and the substance of such file (file data), as well as various information such as the file size, access authority, date and time of creation and so on.

The inodes 90A, 90B are stored in an area AR1 that is different from area AR2 that is usually storing the file data in the logical device 46. Nevertheless, in the present embodiment, the inodes 90A, 90B are used by being read into the memory 12 of the file sharing server 3 from the logical device 46.

In the present embodiment, the inodes 90A, 90B read into the memory 12 are referred to and file data stored in the logical device 46 is read into block units as necessary. In addition, a cache extent 28A corresponding to the block is reserved in the LDEV cache extent 28, and file data read from such block is stored in the cache extent 28A.

Figure 33:
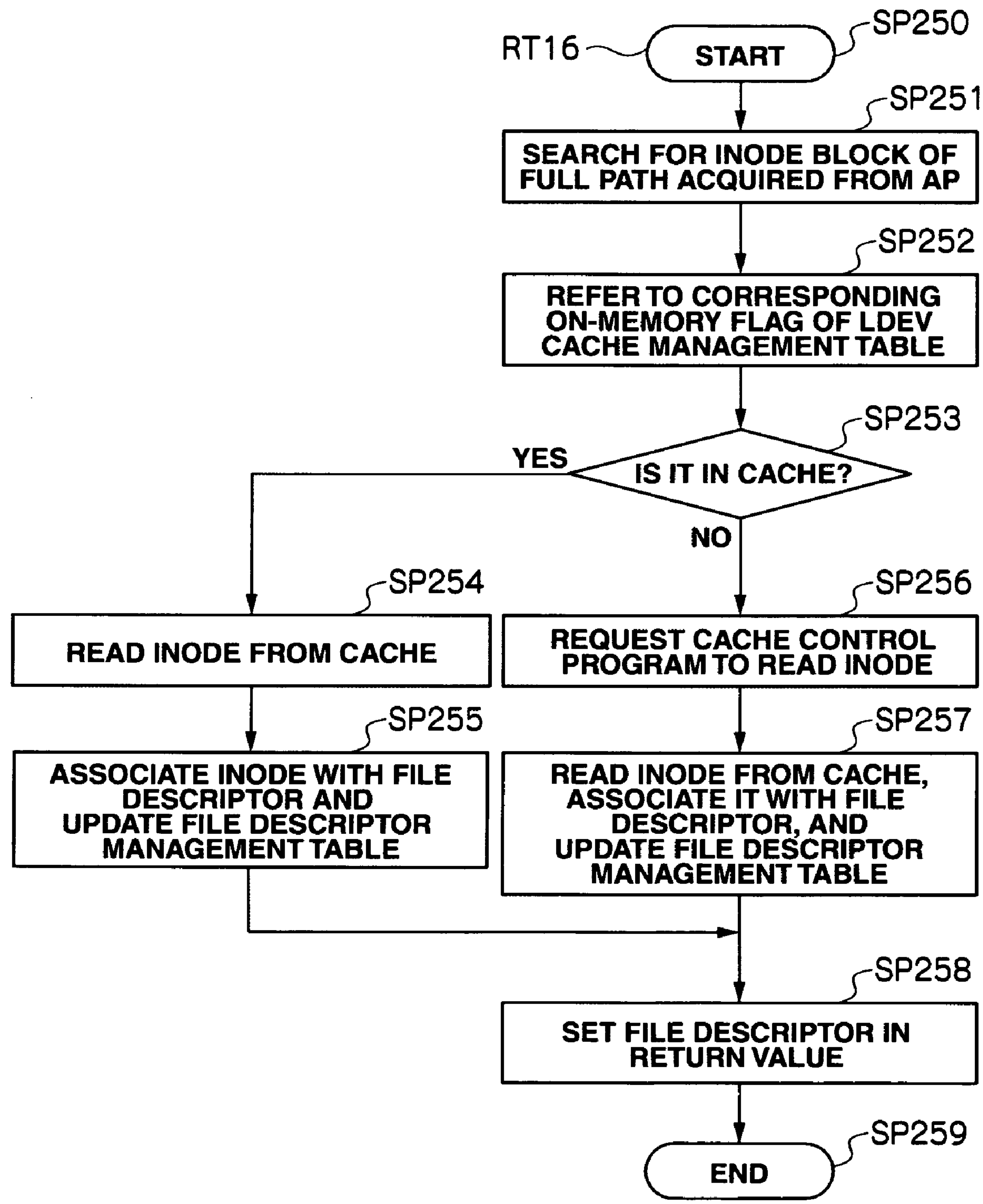
FIG. 33 is a flowchart explaining file open processing according to another embodiment of the present invention.

(5-2) Specific Processing Contents of CPU Concerning LDEV Switch Control Function in Present Embodiment (5-2-1) Specific Processing Contents of CPU based on File System Program (5-2-1-1) File Open Processing FIG. 33 is a flowchart showing the specific processing contents of file open processing according to the present embodiment to be executed by the CPU 11 of the file sharing server 81 based on the file system program 84 (FIG. 29) in substitute for the file open processing according to the first embodiment described above with reference to FIG. 13.

When the CPU 11 proceeds to step SP23 of the file access processing described above with reference to FIG. 12, it starts the file open processing (SP250), and foremost searches for the logical device 46 storing the data of the target file and a block in such logical device 46 based on a full path to the target file to be opened that was given from the application program 20 together with the file open request (SP251).

For example, when the given file path up to the target file is "/mut/fs1/aa.txt", the CPU 11 foremost searches for an inode corresponding to the initial "/". Subsequently, the CPU 11 specifies an inode corresponding to "mut" from the foregoing inode, thereafter acquires an inode corresponding to "fs1" from such inode, and further acquires an inode of "aa.txt" from such inode. Here, the inode of "aa.txt" stores the block number of the corresponding block in the corresponding logical device 46. Thereby, the CPU 11 acquires the block number of a desired block from the inode of "aa.txt".

Subsequently, the CPU 11 refers to the corresponding "ON memory flag" column 82B of the LDEV cache management table 82 (SP252), and determines whether the file data stored in the block of the block number acquired at step SP251 exists in the LDEV cache extent 28 of the file sharing server 81 (SP253).

When the CPU 11 obtains a positive result in this determination, it reads data of the corresponding inode from the LDEV cache extent 28 (SP254). Further, the CPU 11 numbers and associates an unused file descriptor to the target inode, and thereafter registers necessary information concerning the block in the file descriptor management table 83 (FIG. 31) (SP255).

Specifically, the CPU 11 stores the numbered file descriptor in the "file descriptor" column 83A of the file descriptor management table 83, and stores the identification number of the logical block 46 containing such block in the "LDEV number" column 83B of the same line as the "file descriptor" column 83A. Further, the CPU 11 stores "1" in the "used flag" column 83C of the same line as the "LDEV number" column 83B, and stores a pointer to the corresponding inode in the "node pointer" column 83D of the same line as the "used flag" column 83C. In other words, a recording concerning such block is created in the file descriptor management table 83.

Subsequently, the CPU 11 sends a response notice in which the file descriptor numbered at step SP255 is set in the return value to the application program 20 (SP258). Accordingly, the application program 20 will be able to thereafter use the file descriptor and access the block. The CPU 11 thereafter ends this file open processing (SP259).

Contrarily, when the CPU 11 obtains a negative result in the determination at step SP253, it requests the cache control program 85 (FIG. 29) to read the inode stored in the target block (SP256).

Further, the CPU 11 thereafter reads the data of the inode that was consequently read into the LDEV cache extent 28 of the file sharing server 81 from the LDEV cache extent 28 in the same manner as step SP254, and creates a record concerning the target block in the file descriptor management table 83 in the same manner as step SP255 (SP257).

Subsequently, the CPU 11 sends a response notice in which the file descriptor numbered at step SP257 is set in the return value to the application program 20 (SP258), and thereafter ends this file open processing (SP259).

(5-2-1-2) File Read Processing

Figure 34:
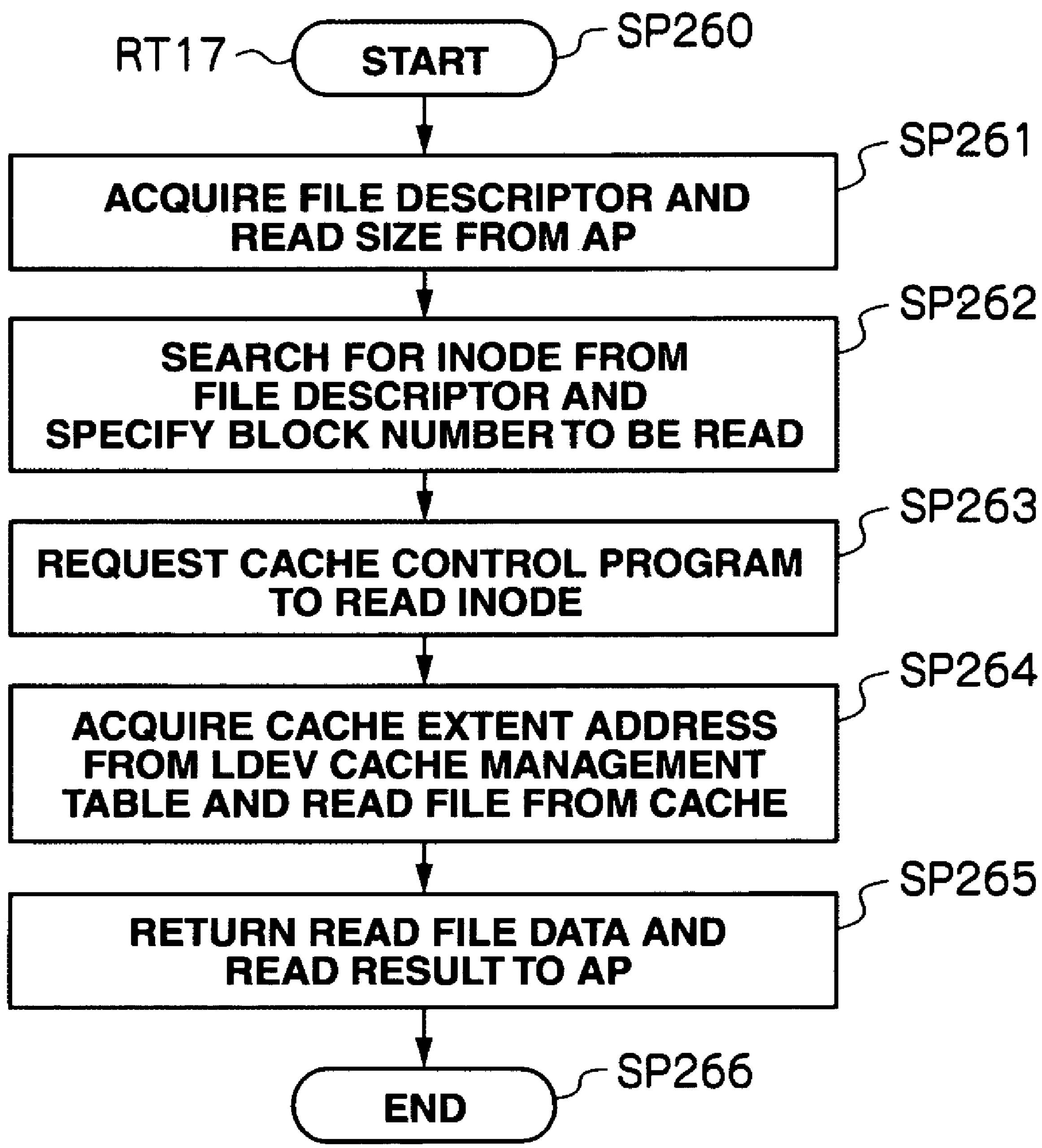
FIG. 34 is a flowchart explaining file read processing according to another embodiment of the present invention.

Meanwhile, FIG. 34 is a flowchart showing the specific processing contents of file read processing according to the present embodiment to be executed by the CPU 11 based on the file system program 84 (FIG. 29) in substitute for the file read processing according to the first embodiment described above with reference to FIG. 14.

When the CPU 11 proceeds to step SP24 of the file access processing described above with reference to FIG. 12, it starts the file read processing (SP260), and foremost acquires the file descriptor and size of the file to be read based on the file read request given from the application program 20 (SP261).

Subsequently, the CPU 11 refers to the file descriptor management table 83 (FIG. 31), specifies the inode corresponding to the file descriptor acquired at step SP261, and acquires the block number of the block storing the data of the target file based on such inode (SP262).

Then, the CPU 11 sends the identification number of the logical device 46 storing the target file and the block number acquired at step SP262, together with the file read request, to the cache control program 85 (FIG. 29) (SP263).

When the CPU 11 is thereafter given a response notice from the cache control program 85 in which "success" is set in the return value in response to the file read request, it reads the address of the LDEV cache extent 28 in the file sharing server 81 storing the data of target file from the corresponding "cache extent address" column 82E of the LDEV cache management table 82, and reads the data of the target file from the address position (SP264).

Further, the CPU 11 sends the file data and the read result to the corresponding application program 20 (SP265), and thereafter ends this file read processing (SP266).

(5-2-1-3) File Write Processing

Meanwhile, FIG. 35 is a flowchart showing the specific processing contents of file write processing according to the present embodiment to be executed by the CPU 11 of the file sharing server 81 based on the file system program 84 (FIG. 29) in substitute for the file write processing according to the first embodiment described above with reference to FIG. 15.

When the CPU 11 proceeds to step SP25 of the file access processing described above with reference to FIG. 12, it starts the file write processing (SP270), and processes step SP271 to step SP274 as with step SP71 to step SP74 of the file write processing according to the first embodiment described above with reference to FIG. 15.

When the CPU 11 obtains a negative result in the determination at step SP274, it sends a response notice in which an error is set in the return value to the application program 20 (SP275), and thereafter ends this file write processing (SP285).

Contrarily, when the CPU 11 obtains a positive result in the determination at step SP274, it refers to the file descriptor management table 83 (FIG. 31) and detects the pointer to the inode corresponding to the target file, and specifies the block number of the block storing the target file in the corresponding logical device 46 based on such inode (SP276).

Subsequently, the CPU 11 receives file data to be written from the application program 20 (SP277), and thereafter reads the address of the cache extent 28A to be written with data of the target file in the LDEV cache extent 28 of the file sharing server 81 from the "cache extent address" column 82E of the record in the LDEV cache management table 82 specified at step SP276 (SP278).

Then, the CPU 11 determines whether it was possible to read the address of the cache extent 28A to be written with data of the target file at step SP278; that is, whether data of such target file is retained in the LDEV cache extent 28 (SP279).

When the CPU 11 obtains a positive result in this determination, it writes the file data received from the application program at step SP277 in the address position read from the LDEV cache management table 82 at step SP278 in the LDEV cache extent 28 (SP282).

Contrarily, when the CPU 11 obtains a negative result in this determination, it reserves the cache extent 28A to read the data of such target file in the LDEV cache extent 28 by executing the cache extent reservation processing described above with reference to FIG. 25 (SP280).

Subsequently, the CPU 11 stores the address of the reserved cache extent 28A in the corresponding "cache extent address" column 82E in the LDEV cache management table 82 (FIG. 30) (SP281), and thereafter writes the file data received from the application program 20 at step SP277 in the "cache extent address" column 82E (SP282).

Further, the CPU 11 stores "1" in the "ON memory flag" column 82B of the record specified at step SP272 in the LDEV cache management table 82, and stores "0" in the "Sync flag" column 82C of such record (SP283).

Subsequently, the CPU 11 sends a response notice in which "success" is set in the return value to the application program 20 (SP284), and thereafter ends this file read processing (SP285).

(5-2-1-4) File Close Processing

Figure 37:
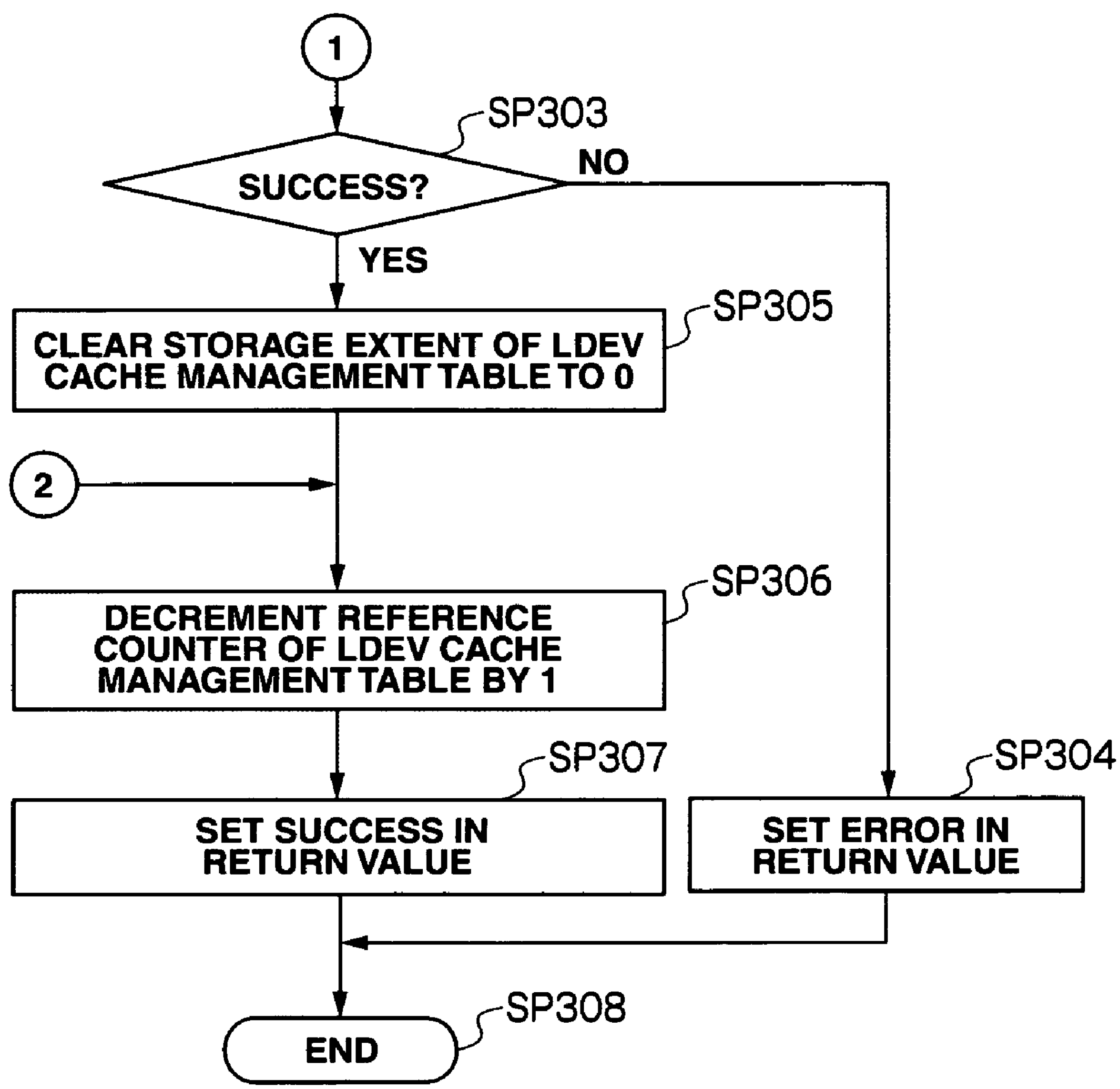
FIG. 37 is a flowchart explaining file close processing according to another embodiment of the present invention.

FIG. 36 and FIG. 37 are flowcharts showing the specific processing contents of file close processing according to the present embodiment to be executed by the CPU 11 based on the file system program 84 (FIG. 29) in substitute for the file close processing according to the first embodiment described above with reference to FIG. 16 and FIG. 17.

When the CPU 11 proceeds to step SP26 of the file access processing described above with reference to FIG. 12, it starts the file close processing (SP290), and foremost processes step SP291 to step SP294 as with step SP91 to step SP94 of the file close processing according to the first embodiment described above with reference to FIG. 16.

When the CPU 11 obtains a negative result in the determination at step SP294, it sends a response notice in which an error is set in the return value to the application program 20 (SP295), and thereafter ends this file write processing (SP296).

Contrarily, when the CPU 11 obtains a positive result in the determination at step SP294, it refers to the file descriptor management table 83 (FIG. 31) and specifies the inode number of the inode corresponding to the target file (SP297). Further, the CPU 11 specifies the block number of the block storing the target file in the corresponding logical device 46 based on the specified inode number, and specifies the record in the LDEV cache management table 82 (FIG. 30) corresponding to such block (SP298).

Subsequently, the CPU 11 reads the counter value stored in the "reference counter" column 82D of the specified record in the LDEV cache management table 82, and determines whether such value is "1" (SP299).

Here, to obtain a positive result in this determination means that the file access to the target file is only from the application program 20 that sent the file close request. Thereby, the CPU 11 reads the address of the LDEV cache extent 28 storing the data of the target file from the "cache extent address" column 82E of the corresponding record in the LDEV cache management table 82 (SP300).

Further, the CPU 11 thereafter requests the cache control program 85 to execute cache read processing for reading the data of the target file from the LDEV cache extent 28 of the file sharing server 81 and writing such data in the corresponding logical device 46 of the storage apparatus 4 (SP301).

When the CPU 11 thereafter receives the processing result of the cache write processing from the cache control program 85 (SP302), it determines whether the cache write processing was successful (SP303).

When the CPU 11 obtains a negative result in this determination, it sends a response notice in which an error is set in the return value to the application program 20 (SP304), and thereafter ends this file close processing (SP308).

Contrarily, when the CPU 11 obtains a positive result in this determination, it releases the cache extent 28A storing the file data in the LDEV cache extent 28 of the file sharing server 3, and deletes the record of such target file from the LDEV cache management table 82 (SP305).

The CPU 11 thereafter decrements the numerical value stored in the "reference counter" column 82D corresponding to the target file in the LDEV cache management table 82 by "1" (SP306). Further, the CPU 11 sends a response notice in which "success" is set in the return value to the application program 20 (SP307), and thereafter ends this file close processing (SP308).

Meanwhile, to obtain a negative result in the determination at step SP299 means that an application program 20 other than the application program 20 that sent the file close request is currently accessing the target file. Thereby, the CPU 11 executes processing for closing the target file without deleting the data of such target file from the LDEV cache extent 28 of the file sharing server 81.

Specifically, when the CPU 11 obtains a negative result in the determination at step SP299, it proceeds to step SP306, thereafter processes step SP306 and step SP307 as with the processing described above, and then ends this file close processing (SP308).

(5-2-2) Specific Processing Contents of CPU Based on Cache Control Program

Figure 38:
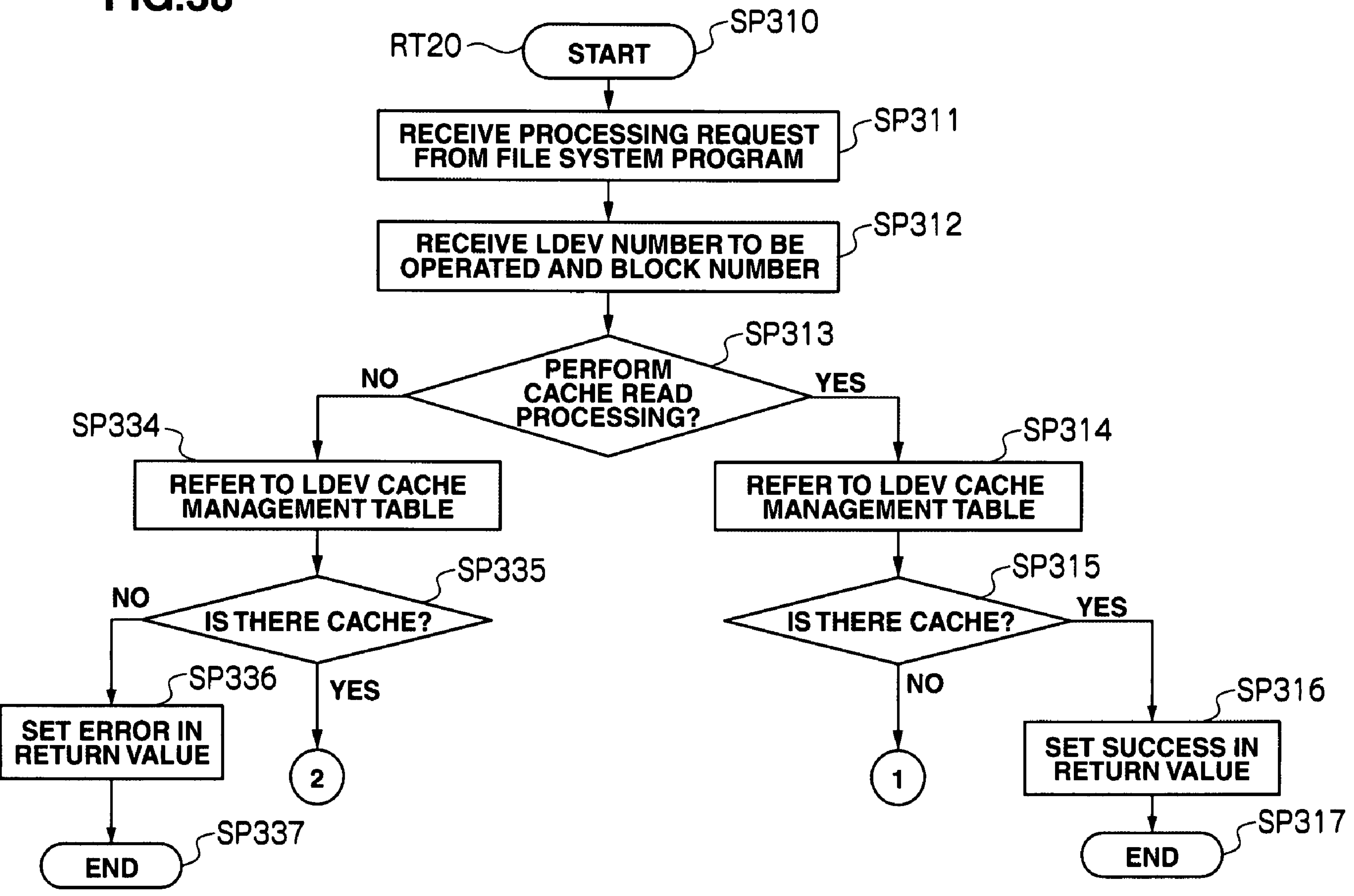
FIG. 38 is a flowchart explaining cache read/write processing according to another embodiment of the present invention.
Figure 40:
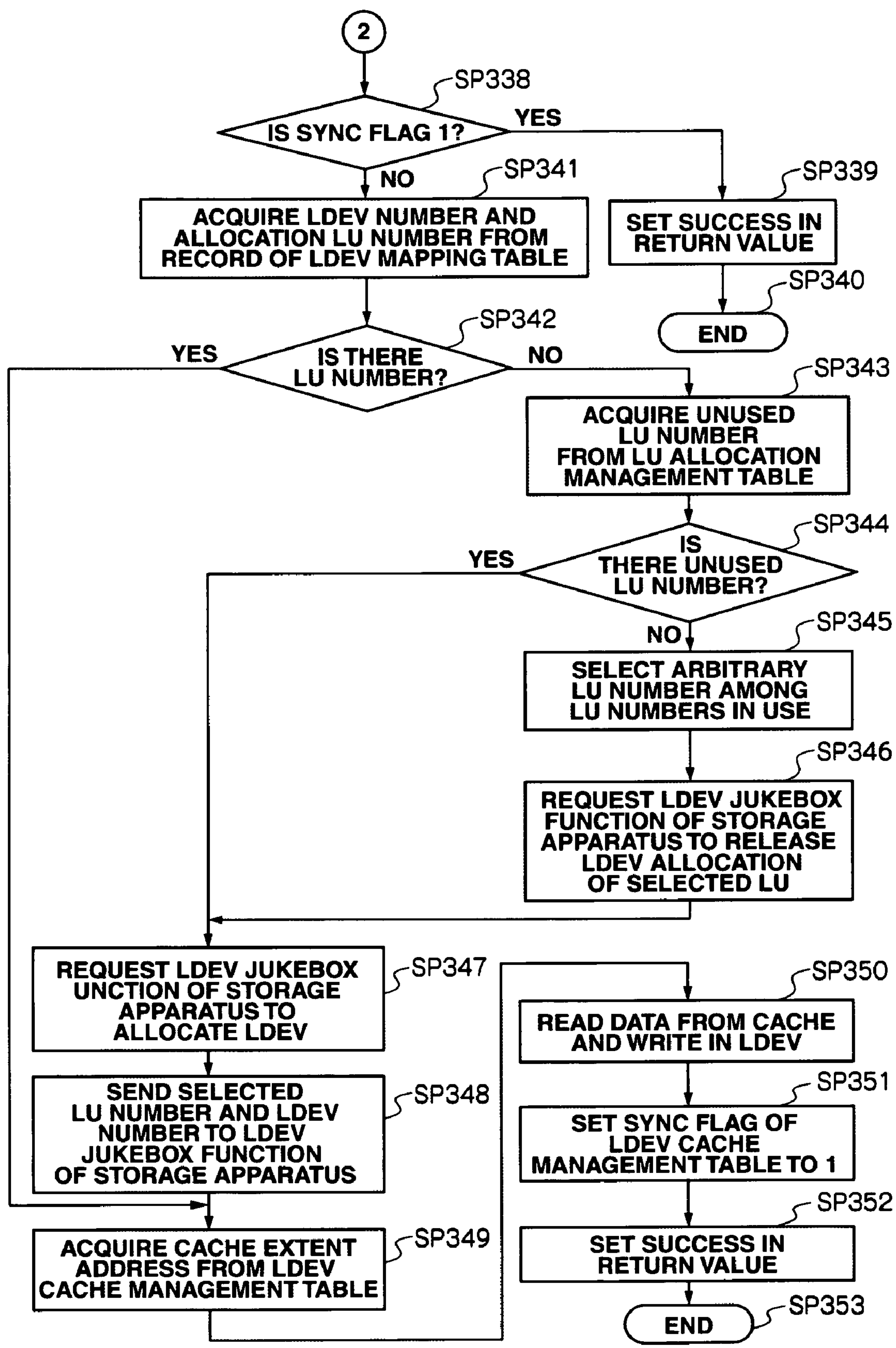
FIG. 40 is a flowchart explaining cache read/write processing according to another embodiment of the present invention.

FIG. 38 to FIG. 40 are flowcharts showing the specific contents of cache read/write processing to be executed by the CPU 11 based on the cache control program 85 (FIG. 29) according to the cache read processing request issued at step SP256 of the file open processing according to the fifth embodiment described above with reference to FIG. 33 or the cache read processing request issued at step SP263 of the file read processing according to the fifth embodiment described above with reference to FIG. 34 or the cache write processing request issued at step SP301 of the file close processing according to the fifth embodiment described above with reference to FIG. 36 and FIG. 37.

When the cache read processing request or the cache write processing request is sent from the file system program 84 (FIG. 29), the CPU 11 starts the cache read/write processing shown in FIG. 38 to FIG. 40 (SP310), and foremost receives the cache read request or the cache write request (SP311). Further, the CPU 11 receives the identification number of the target logical device 46 and the block number of the target block to be subsequently sent from the file system program 84 (SP312).

Subsequently, the CPU 11 determines whether the processing request received at step SP311 is for cache read processing (SP313). When the CPU 11 obtains a positive result in this determination, it refers to the corresponding "ON memory flag" column 82B of the LDEV cache management table 82 (FIG. 30) (SP314), and determines whether the data of the target block is stored in the LDEV cache extent 2 of the file sharing server 81 based on such referral result (SP315).

When the CPU 11 obtains a positive result in this determination, it sends a response notice in which a code representing "read success" is set in the return value to the application program 20 (SP316), and thereafter ends this cache read/write processing (SP317).

Contrarily, when the CPU 11 obtains a negative result in this determination, it refers to the corresponding record in the LDEV mapping table 23 (FIG. 29), and acquires the identification number of the logical device 46 storing the target block and the identification number of the logical unit 47 allocated to the logical device 46 (SP318). Further, the CPU 11 thereafter determines whether it was possible to acquire the identification number of the logical unit 47 (SP319).

To obtain a negative result in this determination means that the logical device 46 containing the target block is currently not associated with the logical unit 47. Thereby, the CPU 11 allocates the logical device 46 containing the target block to one of the logical units 47 by processing step SP320 to step SP325 as with step SP124 to step SP130 of the cache read/write processing according to the first embodiment described above with reference to FIG. 18 to FIG. 20.

Further, by thereafter executing the cache extent reservation processing in the same manner as the cache extent reservation processing described above with reference to FIG.

21, the CPU 11 reserves the cache extent 28A for reading the data of the target block in the LDEV cache extent 28 of the file sharing server 81 (SP326), and reads the data stored in the target block into the cache extent 28A (SP327).

Subsequently, the CPU 11 updates the LDEV mapping table 23 and the LDEV cache management table 82 by processing step SP328 to step SP332 as with step SP133 to step SP137 of the cache read/write processing according to the first embodiment described above, and thereafter ends this cache read/write processing (SP333).

Contrarily, to obtain a positive result in the determination at step SP319 means that the logical device 46 containing the target block is currently associated to one of the logical units 47. Thus, by processing step SP326 to step SP332 as with the processing described above, the CPU 11 reads the data stored in the target block into the LDEV cache extent 28 of the file sharing server 81, and further updates the LDEV mapping table 23 and the LDEV cache management table 82 accordingly. The CPU 11 thereafter ends this cache read/write processing (SP333).

Meanwhile, when the CPU 11 obtains a negative result in the determination at step SP313, it refers to the corresponding "ON memory flag" column 82B of the LDEV cache management table 82, and determines whether the data of the target block is retained in the LDEV cache extent 28 of the file sharing server 81 (SP335).

When the CPU 11 obtains a negative result in this determination, it sends a response notice in which a code representing an "error" is set in the return value to the application program 20 (SP336), and thereafter ends this cache read/write processing (SP337).

Contrarily, when the CPU 11 obtains a positive result in this determination, it determines whether "1" is stored in the "Sync flag" column 82C corresponding to the target block in the LDEV cache management table 82 (SP338).

Here, to obtain a positive result in this determination means that the data of the target block stored in the LDEV cache extent 28 of the file sharing server 81 and the data of the target block stored in the corresponding logical device 46 of the storage apparatus 4 are the same; that is, the data of such target file has not been updated after the opening of the target block. Accordingly, in the foregoing case, upon subjecting the target block to close processing, it is not necessary to rewrite the data of the target block stored in the LDEV cache extent 28 of the file sharing server 81 into the corresponding logical device 46 of the storage apparatus 4. Thereby, the CPU 11 sends a response notice in which "success" is set in the return value to the application program 20 (SP339), and thereafter ends this cache read/write processing (SP340).

Contrarily, to obtain a negative result in this determination means that the data of the target block stored in the LDEV cache extent 28 of the file sharing server 81 and the data of the target block stored in the corresponding logical device 46 of the storage apparatus 4 are different; that is, the data of such target block has been updated after the opening of the target block. Accordingly, in the foregoing case, upon subjecting the target block to close processing, it is necessary to rewrite the data of the target block stored in the LDEV cache extent 28 of the file sharing server 81 into the corresponding logical device 46 of the storage apparatus 4. Thereby, the CPU 11 reads the identification number of the logical device 46 to be written with the target block from the corresponding "LDEV number" column 23B and "allocation LU number" column 23C in the LDEV mapping table 23 (FIG. 29), and the identification number of the logical unit 47 allocated to such logical device 46 (SP341).

By thereafter processing step SP342 to step SP352 as with step SP151 to step SP160 of the first embodiment described above, the CPU 11 writes the data of the target block stored in the LDEV cache extent 28 of the file sharing server 81 into the corresponding logical device 46 of the storage apparatus 4, updates the LDEV cache management table 82 accordingly, and thereafter ends this cache read/write processing (SP353).

(5-3) Effect of Present Embodiment

As described above, with the computer system 80 according to the present embodiment, since file data is retained in the LDEV cache extent 28 provided in the memory 12 of the file sharing server 81 in block units as the management unit of the storage extent in the storage apparatus 4, data of blocks in the target file that do not need to be accessed will not be read into the LDEV cache extent 28, and it will be possible to effectively use the LDEV cache extent 28 thereby.

(6) Other Embodiments

Incidentally, although the foregoing first to fifth embodiments describe cases of applying the present invention to the computer systems 1, 60, 65, 70, 80 configured as illustrated in FIG. 1 or FIG. 29, this invention is not limited thereto. So as long as the computer system comprises a storage apparatus equipped with a function of dynamically switching the mapping of a virtual logical unit provided by the host system to a logical device storing data, the present invention can be broadly applied to computer systems of various configurations.

Further, although the foregoing first to fifth embodiments describe cases of applying a file sharing server as the information processing apparatus employing the LDEV switch control function according to the present invention, this invention is not limited thereto, and may be broadly applied to various other devices. For instance, the LDEV switch control function may be mounted on the storage apparatus 4.

Moreover, although the foregoing first to fifth embodiments describe cases of applying the memory 12 as the storage device for storing the file data read from the storage apparatus 4 in the file sharing server 3, this invention is not limited thereto, and a storage device other than the memory 12; for instance, a disk device such as a hard disk, may also be employed.

In addition, although the foregoing first to fifth embodiments describe cases of creating the LDEV cache extents 28, 51 for storing file data read from the storage apparatus 4 in the memory 12 storing various control programs and various management tables in the file sharing server 3, this invention is not limited thereto, and a special storage device may be provided separately from the memory 12, and the LDEV cache extents 28, 51 may be created on the storage extent provided by the storage device.

Further, although the foregoing first to fifth embodiments describe cases of configuring the processing unit for requesting the storage apparatus 4 to switch the mapping of the virtual logical unit 47 and the logical device 46 as necessary, reading data of a necessary file from the corresponding logical device 46 in the storage apparatus 4 and storing such data in the memory 12 of the file sharing server 3, and performing data I/O processing to the file data stored in the memory 23 according to the file access request to the file given from the file access client 2 with the file system programs 21, 52, 84 and the cache control programs 22, 61, 71, 85, and management tables such as the LDEV mapping table 23 and the LDEV cache management table 24, and the CPU 11, this invention is not limited thereto, and may be broadly applied to various other configurations. Here, a part of the processing to be performed by the processing unit may also be performed with a hardware configuration.

Moreover, although the foregoing third embodiment describes a case of periodically writing data of all files stored in the LDEV cache extent 28 of the memory 12 into the corresponding logical device 46 of the storage apparatus 4, this invention is not limited thereto, and, for instance, data of all files stored in the LDEV cache extent 28 of the memory 12 may be respectively written in the corresponding logical device 46 of the storage apparatus in a timing other than a periodical timing such in a timing of writing the data of any file stored in the LDEV cache extent 28 into the corresponding logical device 46 of the storage apparatus 4.

The present invention can be broadly applied to storage systems of various configurations comprising a storage apparatus equipped with a LDEV jukebox function as a storage.

What is claimed is:

1. An information processing system, comprising:

a storage apparatus comprising:

storage devices for providing logical devices to store data; and a first processing unit providing virtual logical units based on a mapping relation between the logical devices and the virtual logical units and being operative to switch the mapping relation dynamically according to an external request; and a file sharing server comprising;

a cache memory including cache extents; and a second processing unit operative to provide the virtual logical units of the storage apparatus to a host system by using said cache extents, and manage the mapping relationships between the logical devices and the virtual logical units;

wherein said second processing unit is operative to request a certain file from the storage apparatus, read data of the certain file from the corresponding logical device in said storage apparatus and store said data in one of the cache extents of the cache memory, and perform data I/O processing to data of said file stored in said cache extent according to a file access request given by said host system for accessing said file.

2. The information processing apparatus according to claim 1, wherein said processing unit reads the data of said file from the corresponding logical device in said storage apparatus and stores said data in said cache extent of said cache memory upon opening said file, and writes the data of said file stored in said cache extent in the corresponding logical device of said storage apparatus upon closing said file.

3. The information processing apparatus according to claim 1, wherein said processing unit performs data I/O processing according to said file processing request to said data stored in said cache extent when said file processing request is given for processing said file in which data is stored in said cache extent of said cache memory, and reads the data of said file from the corresponding logical device in said storage apparatus and stores said data in said cache extent when said file processing request is given for processing said file in which data is not stored in said cache memory.

4. The information processing apparatus according to claim 1, wherein said processing unit creates said cache extent exclusive to a file system in said cache memory for storing data of each of said files belonging to said file system upon subjecting said file system to mount processing, and deletes said cache extent upon subjecting said file system to unmount processing.

5. The information processing apparatus according to claim 1, wherein said processing unit writes the data of each of said files stored in said cache extent of said cache memory in each of the corresponding logical devices of said storage apparatus at a prescribed timing.

6. The information processing apparatus according to claim 1, wherein said processing unit writes the data of any one of said files stored in said storage device in the corresponding logical device of said storage apparatus according to the remaining capacity of said storage device, and reads data of a necessary file from the corresponding logical device in said storage apparatus and writes said data in said cache extent after releasing said cache extent that was storing the data of said file in said cache memory.

7. The information processing apparatus according to claim 1, wherein said processing unit reads the data of said file from said logical device in block units as a management unit of said storage devices in said storage apparatus and stores said data in said cache extent of said cache memory, and performs data I/O processing in said block units according to a file access request given from said host system for accessing said file.

8. An information processing method for an information storage system having a storage apparatus and a file sharing server, said storage apparatus comprising:

storage devices for providing logical devices to store data, and a first processing unit providing virtual logical units based on a mapping relationship between the logical devices and the virtual logical units and being adapted to switch to the mapping relation dynamically according to an external request; and said file sharing server comprising:

a cache memory including cache extents; and a second processing unit operative to provide the virtual logical units of the storage apparatus to a host system by using said cache extents, and manage mapping relationships between the logical devices and the virtual logical units;

said method comprising:

a first step of (1) requesting by said second processing unit a certain file from the storage apparatus; (2) reading data of the certain file from the corresponding logical device in said storage apparatus and storing said data in one of said cache extents of the cache memory; and (3) performing data I/O processing to data of said file stored in said cache extent according to a file access request given by said host system for accessing said file; and a second step of dynamically switching by said first processing unit the mapping relationship between the logical devices and the virtual logical units according to an external request.

9. The information processing method according to claim 8, wherein at said first step, the data of said file is read from the corresponding logical device in said storage apparatus and stored in said cache extent of said cache memory upon opening said file, and the data of said file stored in said cache extent is written in the corresponding logical device of said storage apparatus upon closing said file.

10. The information processing method according to claim 8, wherein at said first step, data I/O processing is performed according to said file processing request to said data stored in said cache extent when said file processing request is given for processing said file in which data is stored in said cache extent of said cache memory, and the data of said file is read from the corresponding logical device in said storage apparatus and stored in said cache extent when said file processing request is given for processing said file in which data is not stored in said cache memory.

11. The information processing method according to claim 8, wherein at said first step, said cache extent exclusive to a file system is created in said cache memory for storing data of each of said files belonging to said file system upon subjecting said file system to mount processing; and said method further comprises a third step of deleting said cache extent upon subjecting said file system to unmount processing.

12. The information processing method according to claim 8, wherein the data of each of said files stored in said cache extent of said cache memory is written in each of the corresponding logical devices of said storage apparatus at a prescribed timing.

13. The information processing method according to claim 8, wherein at said first step, the data of any one of said files stored in said storage device is written in the corresponding logical device of said storage apparatus according to the remaining capacity of said storage device, and data of a necessary file is read from the corresponding logical device in said storage apparatus and written in said cache extent after releasing said cache extent that was storing the data of said file in said cache memory.

14. The information processing method according to claim 8, wherein at said first step, the data of said file is read from said logical device in block units as a management unit of said storage devices in said storage apparatus and stored in said cache extent of said storage device; and data I/O processing is performed in said block units according to a file access request given from said host system for accessing said file.

15. A storage system, comprising:

a storage apparatus comprising storage devices for providing logical devices to store data and a first processing unit providing virtual logical units based on a mapping relationship between the logical devices and the virtual logical units and being adapted to switch to the mapping relation dynamically according to an external request; and a server system comprising a cache memory including cache extents and a second processing unit operative to provide the virtual logical units of the storage apparatus to a host system by using said cache extents, and manage mapping relationships between the logical devices and the virtual logical units, said server system being operative to request a certain file from the storage apparatus, read data of a necessary file from the corresponding logical device in said storage apparatus and store said data in one of said cache extents, and perform data I/O processing to data of said file stored in said cache extent according to a file access request given by said host system for accessing said file.

16. The storage system according to claim 15, wherein said sewer system reads the data of said file from the corresponding logical device in said storage apparatus and stores said data in said cache extent of said cache memory upon opening said file, and writes the data of said file stored in said cache extent in the corresponding logical device of said storage apparatus upon closing said file.

17. The storage system according to claim 15, wherein said server system creates said cache extent exclusive to a file system in said cache memory for storing data of each of said files belonging to said file system upon subjecting said file system to mount processing, and deletes said cache extent upon subjecting said file system to unmount processing.

18. The storage system according to claim 15, wherein said server system writes the data of each of said files stored in said cache extent of said cache memory in each of the corresponding logical devices of said storage apparatus at a prescribed timing.

19. The storage system according to claim 15, wherein said server system writes the data of any one of said files stored in said storage device in the corresponding logical device of said storage apparatus according to the remaining capacity of said storage device, and reads data of a necessary file from the corresponding logical device in said storage apparatus and writes said data in said cache extent after releasing said cache extent that was storing the data of said file in said cache memory.

20. The storage system according to claim 15, wherein said server system reads the data of said file from said logical device in block units as a management unit of said storage devices in said storage apparatus and stores said data in said cache extent of said cache memory, and performs data I/O processing in said block units according to a file access request given from said host system for accessing said file.

* * * * *